United States Patent
Tracy et al.

(10) Patent No.: US 6,993,448 B2
(45) Date of Patent: Jan. 31, 2006

(54) SYSTEM, METHOD AND MEDIUM FOR CERTIFYING AND ACCREDITING REQUIREMENTS COMPLIANCE

(75) Inventors: Richard P. Tracy, Ashburn, VA (US); Hugh Barrett, Centreville, VA (US); Lon J. Berman, Sterling, VA (US); Gary M. Catlin, Bricktown, NJ (US)

(73) Assignee: Telos Corporation, Ashburn, VA (US)

(*) Notice: Subject to any disclaimer, the term of this patent is extended or adjusted under 35 U.S.C. 154(b) by 391 days.

(21) Appl. No.: 09/822,868

(22) Filed: Apr. 2, 2001

(65) Prior Publication Data

US 2002/0042687 A1 Apr. 11, 2002

Related U.S. Application Data

(63) Continuation-in-part of application No. 09/794,386, filed on Feb. 28, 2001.
(60) Provisional application No. 60/223,982, filed on Aug. 9, 2000.

(51) Int. Cl.
*G06F 13/00* (2006.01)

(52) U.S. Cl. ...................... 702/119; 702/120; 702/121; 702/188; 702/189
(58) Field of Classification Search ......... 702/119–123, 702/186–189; 455/414; 709/225; 714/39, 714/89; 717/174
See application file for complete search history.

(56) References Cited

U.S. PATENT DOCUMENTS

| | | | |
|---|---|---|---|
| 5,032,979 A | 7/1991 | Hecht et al. | |
| 5,621,889 A | 4/1997 | Lermuzeaux et al. | 395/186 |
| 5,625,751 A | 4/1997 | Brandwajn et al. | 395/22 |
| 5,684,959 A | 11/1997 | Bhat et al. | 395/200.11 |
| 5,699,403 A | 12/1997 | Ronnen | 379/32 |
| 5,740,248 A | 4/1998 | Fieres et al. | 380/25 |

(Continued)

FOREIGN PATENT DOCUMENTS

| | | |
|---|---|---|
| EP | 0999489 | 5/2000 |
| WO | WO 00/70463 | 11/2000 |
| WO | WO 01/37511 | 5/2001 |
| WO | WO 01/59989 | 8/2001 |
| WO | WO 01/99349 | 12/2001 |
| WO | WO 02/061544 | 8/2002 |

OTHER PUBLICATIONS

Dec. 26, 1985. "Department of Defense Trusted Computer System Evaluation Criteria." DoD 5200.28–STD.
Jul. 31, 2000. "Department of Defense Information Technology Security Certification and Accreditation Process (DITSCAP): Application Manual." DoD 8510.1–M.
Jan. 23, 2003. International Search Report from PCT/US02/28179.
Apr. 11, 2003. International Preliminary Examination Report from PCT/US00/09842.

(Continued)

*Primary Examiner*—Donald E. McElheny, Jr.
*Assistant Examiner*—Felix Suarez

(57) ABSTRACT

A computer-implemented system, method and medium for assessing the risk of and/or determining the suitability of a system to comply with at least one predefined standard, regulation and/or requirement. In at least some embodiments of the present invention, the method comprises the steps of: 1) automatically or manually gathering information pertaining to the system, 2) selecting one or more requirements with which the system is to comply; 3) testing the system against the requirements; 4) performing risk assessment of the failed test procedures, and 5) generating certification documentation based on an assessment of the first four elements.

86 Claims, 46 Drawing Sheets

OTHER PUBLICATIONS

| | | | | |
|---|---|---|---|---|
| 5,796,942 | A | 8/1998 | Esbensen | 395/187.01 |
| 5,850,516 | A | 12/1998 | Schneier | 395/186 |
| 5,859,847 | A | 1/1999 | Dew et al. | 370/389 |
| 5,870,545 | A | 2/1999 | Davis et al. | 395/200.31 |
| 5,892,900 | A | 4/1999 | Ginter et al. | 395/186 |
| 5,892,903 | A | 4/1999 | Klaus | 395/187.01 |
| 5,931,946 | A | 8/1999 | Terada et al. | 713/201 |
| 6,006,328 | A | 12/1999 | Drake | 713/200 |
| 6,134,664 | A | 10/2000 | Walker | 713/201 |
| 6,148,401 | A | 11/2000 | Devanbu et al. | 713/170 |
| 6,151,599 | A | 11/2000 | Shrader et al. | 707/9 |
| 6,185,689 | B1 | 2/2001 | Todd, Sr. et al. | 713/201 |
| 6,205,407 | B1 * | 3/2001 | Testa et al. | 702/119 |
| 6,219,626 | B1 | 4/2001 | Steinmetz et al. | 702/183 |
| 6,219,628 | B1 * | 4/2001 | Kodosky et al. | 703/2 |
| 6,219,805 | B1 | 4/2001 | Jones et al. | 714/38 |
| 6,230,105 | B1 | 5/2001 | Harris et al. | |
| 6,256,773 | B1 | 7/2001 | Bowman-Amuah | 717/1 |
| 6,282,546 | B1 | 8/2001 | Gleichauf et al. | 707/102 |
| 6,298,445 | B1 | 10/2001 | Shostack et al. | 713/201 |
| 6,317,868 | B1 | 11/2001 | Grimm et al. | 717/2 |
| 6,324,647 | B1 | 11/2001 | Bowman-Amuah | 713/201 |
| 6,370,573 | B1 | 4/2002 | Bowman-Amuah | 709/223 |
| 6,389,402 | B1 * | 5/2002 | Ginter et al. | 705/51 |
| 6,401,073 | B1 | 6/2002 | Tokuda et al. | 705/8 |
| 6,405,364 | B1 | 6/2002 | Bowman-Amuah | 717/101 |
| 6,408,391 | B1 | 6/2002 | Huff et al. | 713/201 |
| 6,473,794 | B1 | 10/2002 | Guheen et al. | 709/223 |
| 6,546,493 | B1 | 4/2003 | Magdych et al. | |
| 2001/0027389 | A1 | 10/2001 | Beverina et al. | 703/22 |
| 2001/0034847 | A1 | 10/2001 | Gaul, Jr. | 713/201 |
| 2002/0042687 | A1 | 4/2002 | Tracy et al. | |
| 2002/0069035 | A1 | 6/2002 | Tracy et al. | |
| 2002/0104014 | A1 | 8/2002 | Zobel et al. | 713/200 |
| 2002/0198750 | A1 | 12/2002 | Innes et al. | |
| 2002/0199122 | A1 | 12/2002 | Davis et al. | |
| 2003/0046128 | A1 | 3/2003 | Heinrich | |
| 2003/0064717 | A1 | 4/2003 | Rajaram | |
| 2003/0065793 | A1 | 4/2003 | Kouznetsov et al. | |
| 2003/0159063 | A1 | 8/2003 | Apfelbaum et al. | |
| 2003/0163728 | A1 | 8/2003 | Shaw | |
| 2003/0172166 | A1 | 9/2003 | Judge et al. | |
| 2004/0010709 | A1 | 1/2004 | Baudoin et al. | |
| 2004/0025015 | A1 | 2/2004 | Satterlee et al. | |
| 2004/0049698 | A1 | 3/2004 | Ott et al. | |

OTHER PUBLICATIONS

Dennis Szerszen, "Secure Strategies—A Year–Long Series on the Fundamentals of Information Systems Security—Extending your business to the Web requires a firm understanding of directories, what they offer and the challenges you'll face in deploying them," Apr. 2000, Part 1, from http://infosecuritymag.techtarget.com/articles/april00/features4.shtml.

"DOD Information Technology Security Certification and Accreditation Process (DITSCAP)," Lesson 11, Aug. 29, 2000, from http://atzhssweb.gordon.army.rail/otd/c2protect/isso/item17.html, pp. 1–25.

The Mitre Corporation, "The Key to Information Sharing—Common Vulnerabilities & Exposures," Aug. 17, 2000, from http://www.cve.mitre.org/about/introduction.html.

Al Berg, "Secure Strategies—A Year–Long Series on the Fundamentals of Information Systems Security—On the surface, all vulnerability assessment scanners perform essentially the same way. Here's how to decide which one–if any–is right for your requirements," Part 2, "Audits, Assessments & Tests (Oh, My)," from http://www.infosecuritymag.com/aug2000/securestrategies.htm, pp. 1–5.

Dan Swanson, "Secure Strategies—A Year–Long Series on the Fundamentals of Information Systems Security—Avoiding IS Icebergs," Part 4, "Audits, Assessments & Tests (Oh, My)," from http://www.infosecuritymag.com/oct2000/icebergs.htm, pp. 1–4.

George Kurtz and Chris Prosise, "Secure Strategies—Penetration Testing Exposed," Part 3, "Audits, Assessments & Tests (Oh, My)," from http://www.infosecuritymag.com/sep2000/securestrategies.htm, pp. 1–5.

Polk, W. T. Dec. 1992. "Automated Tools for testing computer system vulnerability (Abstract)." National Institute of Standards & Technology. Washington, DC.

U.S. Appl. No. 09/794,386, filed Feb. 28, 2001, Tracy et al.

Hochberg, Judith, Kathleen Jackson, Cathy Stallings, J.F. McClary, David Dubois, and Josephine Ford. May 3, 1993. "NADIR: An automated system for detecting network intrusion and misuse (Abstract)." Computers & Security, vol. 12, No. 3, pp. 235–248.

Baskerville, Richard. Dec. 4, 1993. "Information Systems Security Design Methods: Implications for Information Systems Development." ACM Computing Surveys, vol. 25, No. 4, pp. 375–414.

Zhou, Qin, J. Davidson, and A.A. Fouad. Feb. 1994. "Application of artificial neural networks in power system security and vulnerability assessment (Abstract)." IEEE Transactions on Power Systems, vol. 9, No. 1, pp. 525–532.

Jackson, K. A., J. G. Hochberg, S. K. Wilhelmy, J. F. McClary, and G. G. Christoph. May 3–5, 1994. "Management issues in automated audit analysis (Abstract)." Los Alamos National Lab, Department of Energy computer security group training conference. Denver, Colorado.

Jackson, K. A., M. C. Neuman, D. D. Simmonds, C. A. Stallings, and J. L. Thompson. May 1–4, 1995. "Misuse and intrusion detection at Los Alamos National Laboratory (Abstract)." Department of Energy computer security group training conference ($17^{th}$). Milwaukee, Wisconsin.

Casella, K. A. Sep. 17–22, 1995. "Security administration in an open networking environment (Abstract)." Proceedings of the Ninth Systems Administration Conference, pp. 67–73. Monterey, California.

Doty, T. Fall 1995. "Test Driving SATAN (Abstract)." Computer Security Journal, vol. 11, No. 2, pp. 9–14.

Karygiannis, T. Mar. 23–25, 1998. "Network security testing using mobile agents (Abstract)." Proceedings of the Third International Conference on the Practical Application of Intelligent Agents and a Multi-Agent Technology, pp. 625–626. London, United Kingdom.

Gimble, T. F., M. F. Ugone, C. A. Miggins, D. L. Dixon, and K. Fitzpatrick. Jun. 3, 1998. "Information Assurance for the Defense Civilian Personnel Data System—Washington, Headquarters Services (Abstract)." Audit Report, Department of Defense, Office of the Inspector General. Washington, DC.

Swiler, L. P. and C. Phillips. Jun. 30, 1998. "Graph–based system for network–vulnerability analysis (Abstract)." USDOE Office of Financial Management and Controller. Washington DC.

Rudd, Alan, Joel McFarland, and Scott Olsen. Aug. 1998. "Managing security vulnerabilities in a networked world (Abstract)." Journal of Digital Imaging, vol. 11, No. 3, Suppl. 1, pp. 216–218.

Mar. 1999. "DoD Information Technology Security Certificate and Accreditation Process (DITSCAP) (on CD–ROM) (Abstract)." Defense Information Systems Agency. Arlington, Virginia.

Levine, Diane E. May 24, 1999. "CyberCop Patrols on Linux: Network Associates Scanner Detects Security, System Vulnerabilities." InformationWeek.

Jun. 1999. "Intrusion detection [market survey] (Abstract)." Secure Computing (International Edition), pp. 58–60, 62, 64, 66, 68. United Kingdom.

Rogers, Amy. Jul. 9, 1999. "Testing For Network Vulnerabilities: VARs Can Build Lucrative Practices Around Emerging Products." ChannelWEB.

Mixer, R. A. Jul. 26, 1999. "Common Database Format for Network Security Data (Master's Thesis) (Abstract)." Air Force Institute of Technology, Wright Patterson AFB, Ohio.

Apr. 2000. "Secure Strategies: A Year Long Series On The Fundamentals of Information Systems Security." www.infosecuritymag.com/articles/april00/features4.shtml.

Mayer, A., A. Wool, and E. Ziskind. May 14–17, 2000. "Fang: A firewall analysis engine (Abstract)." Proceeding 2000 IEEE Symposium on Security and Privacy, pp. 177–187. Berkeley, California.

Korzeniowski, Paul. Aug. 2000. "Audit and Assessment: Ironclad Security." www.infosecuritymag.com/articles/august00/columns6.shtml.

Nov. 8, 2000. "BMC Software Automates Security Management for E–businesses; Provides Customers with Automated Access Management and E–business Information Security (Abstract)." Business Wire, p. 084. Houston, Texas.

Mendelson, Edward. Dec. 5, 2000. "The Danger Within." PC Magazine.

Dec. 18, 2000. "TruSecure Adopts Sanctum Inc.'s Web Application Security Audit Solution; Sanctum's Powerful Web Application Security Audit Software Complements TruSecure's Security Program (Abstract)." Business Wire, p. 0121. Santa Clara, California.

Shipley, G. Jan. 8, 2001. "Vulnerability assessment scanners (Abstract)." Network Computing, vol. 12, No. 1, pp. 51–65.

May 3, 2001. "Mixing Solutions to Garner Full Assessments: Vulnerability Assessment Tools." Channel WEB.

Mohamed, Baith. Jun. 19–22, 2001. "An effective modified security auditing tool (SAT) (Abstract)." Proceedings of the 23$^{rd}$ International Conference on Information Technology Interfaces, part vol. 1, pp. 37–41. Pula, Croatia.

Gilliam, D. P., J. C. Kelly, J. D. Powell, and M. Bishop. Jun. 20–22, 2001. "Development of a software security assessment instrument to reduce software security risk (Abstract)." Proceedings Tenth IEEE International Workshop on Enabling Technologies: Infrastructure for Collaborative Enterprises, pp. 144–149. Cambridge, Massachusetts.

Langa, Fred. Jun. 11, 2001. "Good and Bad Online Security Check–Ups." InformationWeek.com.

Chi, Sung–Do, Jong Sou Park, Ki–Chan Jung, and Jang–Se Lee. Jul. 2001. "Network security modeling and cyber attack simulation methodology (Abstract)." Information Security and Privacy. 6$^{th}$ Australasian Conference, ACISP 2001 Proceedings, pp. 320–333. Sidney, NSW, Australia.

Jul. 12, 2001. "Xacta Web C & A™ User Notification Setup For Work Product Manager User Guide." Xacta Corporation.

Aug. 22, 2001. "Xacta Detect Installation Guide." Xacta Corporation.

Aug. 29, 2001. "Xacta Web C & A™ 2001 System Administrator Guide." Xacta Corporation.

Aug. 29, 2001. "Xacta Web C & A™ 2001 Installation Guide." Xacta Corporation.

XACTA™ Corporation. Aug. 2001. Xacta Web C&A™ 2001 User Guide: DITSCAP/NIACAP. Ashburn, VA: Xacta Corporation.

Hulme, George V. Sep. 21, 2001. "Sanctum Adds Audit–Automation Tools to Security Software: Sanctum Introduces Enhanced Version of AppScan Software, Which Automates the Auditing of Web Applications for Holes that Hackers Could Use to Break Into Systems." InformationWeek.com.

Wang, Rong, Feiyi Wang, and G. T. Byrd. Oct. 15–17, 2001. "Design and implementation of acceptance monitor for building scalable intrusion tolerant system (Abstract)." Proceedings Tenth Annual International Conference on Computer Communications and Networks, pp. 200–205. Scottsdale, Arizona.

Fisher, Dennis. Oct. 29, 2001. "HP Expands Security Practice." EWEEK.

Sidel, Scott and Andy Briney. Feb. 2002. "Patching Across the Enterprise" www.infosecuritymag.com/2002/feb/features_sidebar1.shtml.

Hulme, George V. Mar. 14, 2002. "Hercules' Strength is Security Automation: Citadel's New Tool Gathers Info from Software–Vulnerability Scanners and Downloads Available Patches." InformationWeek.com.

Hulme, George V. Mar. 18, 2002. "Herculean Help For Patching: Tool Collates Vulnerabilities and Aids with Patch Deployment." InformationWeek.com.

Sturdevant, Cameron. Apr. 8, 2002. "Top Layer Testing." EWEEK.

Machrone, Bill. Apr. 22, 2002. "Syscheck: System Tests and Port Scanners." ExtremeTech.

Machrone, Bill. Apr. 22, 2002. "Syscheck: Network Tests." ExtremeTech.

Fisher, Dennis. May 20, 2002. "Enforcer Keeps Far–flung Systems in Check." EWEEK.

Dyck, Timothy. May 20, 2002. "App Scanning Helps Secure Weak Spots." EWEEK.

Rapoza, Jim. May 20, 2002. "Foundscan Roots Out Problems." EWEEK.

Musich, Paula. May 28, 2002. "Loudcloud Automates Patch Management." EWEEK.

Karagiannis, Konstantinos. Jun. 20, 2002. "Finding and Fixing Network Vulnerabilities." PC Magazine.

Jul. 29, 2002. "Best Practices and Beyond. (Industry Speaks)." Government Computer News, vol. 21, No. 21, p. S14(6).

James, Robert. Sep. 2002. "Hercules: Citadel provides some muscle to vulnerability scanners." www.infosecuritymag.com/2002/sep/testcenter.shtml.

Briney, Andrew. Oct. 2002. "Automating Policies: New Software Tools Relieve the Headache of Policy Management." www.infosecuritymag.com/2002/oct/policytools.shtml.

Wood, Lamont. Oct. 24, 2002. "Smart Security: Network Scanners." Tech Update.

Greenemeier, Larry. Nov. 4, 2002. "Certified Secure." InformationWeek.com.

Hulme, George V. Nov. 11, 2002. "Discover Security Threats Faster: E-Security's New Tool Helps Companies Quickly Identify Problems Before an Attack Occurs." InformationWeek.com.

Nov. 11, 2002. "Microsoft Gets Security Approval." *Federal Computer Week*.

2002. "ActiveSentry™ 3.0 (Security You Can See)." *Intranode Software Technologies*, pp. 1–19.

2002. "Managed Vulnerability Assessment: A Proactive Approach to Network Security." www.qualys.com.

2002. "SecureScan SP." www.vigilante.com.

2002. "Xacta Web C & A™ User Guide Version 3.3." Xacta Corporation.

Linger, Richard C. Nov. 2000. "Systematic Generation of Stochastic Diversity as an Intrusion Barrier in Survivable Systems Software." Carnegie Mellon University. http://www.sei.cmu.edu/programs/nss/stochastic-divers.html.

The Software Engineering Institute (SEI). Nov. 2000. "Operationally Critical Threat, Asset, and Vulnerability Evaluation (Octave) Framework. Version 1.0." Carnegie Mellon University. http://www.sei.cmu.edu/publications/documents/99.reports/99tr017/99tr017chap01.html.

The Software Engineering Institute (SEI). Nov. 2000. "Survivable Network Analysis." Carnegie Mellon University. http://www.sei.cmu.edu/organization/programs/nss/analysis-method.html.

XACTA™ Corporation. Sep. 2000. *Web C&A™*. Ashburn, VA: Xacta Corporation.

Winkler, Ira, Al Berg, George Kurtz, Chris Prosise, and Dan Swanson. Jul. 2000. "Audits, Assessments & Tests (Oh My)." http://www.infosecuritymag.com/july2000/audits.html.

Dorobek, Christopher J. May 2000. "Project Matrix Identifies How Systems Interact." *Government Computer News*. Post—Newsweek Tech Media Group, Inc. http://www.gcn.com/vol19_no11/news/1974-1.html.

Government Computer News. May 2000. "CIO Council Launches Security Best Practices Web Site." Post—Newsweek Tech Media Group, Inc. http://www.gcn.com/vol1_no1/daily-updates/2067-1.html.

Government Computer News. Aug. 1999. "Scanner Suite Increases its Risk Assessment Tool Features." Post—Newsweek Tech Media Group, Inc. http://www.gcn.com/vol18_no28/com/495-1.html.

FDIC. Jul. 1999. "Risk Assessment Tools and Practices for Information System Security." http://www.fdic.gov/news/financial/1999/FIL9968a.html.

Fisher, David A., and Howard F. Lipson. Jan. 1999. "Emergent Algorithms: A New Method for Enhancing Survivability in Unbounded Systems." *Proceedings of the Hawaii International Conference On System Sciences*. Maui, Hawaii: IEEE. http://www.sei.cmu.edu/organization/programs/nss/emergent-algor.html.

Ellison, R. J., R. C. Linger, T. Longstaff, and N. R. Mead. Sep. 1998. *A Case Study in Survivable Network System Analysis*. Pittsburgh, PA: Carnegie Mellon Software Engineering Institute.

Linger, R. C., N. R. Mead, and H. F. Lipson. 1998. "Requirements Definition for Survivable Network Systems." *IEEE*. http://www.sei.cmu.edu/programs/nss/icre.html.

Ellison, Robert J., David A. Fisher, Richard C. Linger, Howard F. Lipson, Thomas A. Longstaff, and Nancy R. Mead. 1998. "Survivability: Protecting Your Critical Systems." *Proceedings of the International Conference on Requirements Engineering*. Colorado Springs, CO: IEEE. http://www.sei.cmu.edu/programs/nss/project-critical-systems.html.

Valletta, Anthony M. Dec. 1997. "DoD Information Technology Security Certification and Accreditation Process (DITSCAP)." *Department of Defense INSTRUCTION*. Doc. No . 5200.40.

Bassham, Lawrence E., and Timothy Polk. "Threat Assessment of Malicious Code and Human Computer Threats." Oct. 1992. National Institute of Standards and Technology. http://www.it.kth.se/~cwe/wastebin/threat-assess.html.

"System Accreditation." http://bsp.cio.gov/getfile.cfm?messageid=000.

Ellison, Robert J., Richard C. Linger, Thomas Longstaff, and Nancy R. Mead. "Survivable Network System Analysis: A Case Study." Carnegie Mellon University.

International Search Report for PCT/US03/37603 dated Oct. 25, 2004.

\* cited by examiner

FIG. 4

802 — [Network]
802a — Name = Xacta

806 — [Segment]
807 — Name = Office

806a — Network = Xacta
806b — IPRange = 192.168.0.0-255
806c — ScanDate = 12-01-2000
806d — ScanDate = 12-15-2000

806

808 — [Host]
808a — IPAddress = 192.168.0.10
808b — MAC = 01 02 03 04 05 06
808c — Hostname = Banana
808d — OS = Windows 98
808e — Version = 2

810 — [Host]
810a — IPAddress = 192.168.0.20
810b — MAC = 01 02 03 08 00 09
810c — Hostname = Peach
810d — OS = Windows NT
810e — Version = 4.0
810f — Mfr = HP
810g — Model = Vectra XJ12
810h — CPU = Pentium II
810i — CPU Qty = 1
810j — CPU Speed = 400 MHz
810k — RAM = 128 MB
810l — Disk Space = 60 GB
810m — Software = Microsoft Office 8.0
810n — Software = Autocad 14.1
810o — Software = Adobe Acrobat 3.0
810p — Software = Roadhog 1.1

|    | THREAT CATEGORY | SUB-CATEGORY | SUB-SUB-CATEGORY |
|----|---|---|---|
| 1  | NATURAL DISASTER | FIRE | |
| 2  | | FLOOD | |
| 3  | | EARTHQUAKE | |
| 4  | | VOLCANO | |
| 5  | | TORNADO | |
| 6  | | LIGHTNING | |
| 7  | SYSTEM FAILURE | HARDWARE | |
| 8  | | POWER | |
| 9  | | COMMUNICATION LINK | |
| 10 | ENVIRONMENTAL FAILURE | TEMPERATURE | |
| 11 | | POWER | |
| 12 | | HUMIDITY | |
| 13 | | SAND/DUST | |
| 14 | | SHOCK/VIBRATION | |
| 15 | HUMAN UNINTENTIONAL | SOFTWARE DESIGN ERROR | |
| 16 | | SYSTEM DESIGN ERROR | |
| 17 | | OPERATOR ERROR | SYSTEM ADMINISTRATOR |
| 18 | | | REGULAR USER |
| 19 | | | MAINTENANCE PERSONNEL |
| 20 | HUMAN INTENTIONAL | AUTHORIZED PERSONNEL | SYSTEM ADMINISTRATORS |
| 21 | | | MAINTENANCE PERSONNEL |
| 22 | | | REGULAR USERS |
| 23 | | UNAUTHORIZED USERS | TERRORISTS |
| 24 | | | HACKERS |
| 25 | | | SABOTEURS |
| 26 | | | THIEVES |
| 27 | | | VANDALS |
| 28 | | PHYSICAL COMBAT | |
| 29 | | ELECTRONIC WARFARE | |

FIG. 22

| IF A CHARACTER POSITION IN THE PROJECT THREAT PROFILE STRING IS: | AND THE CORRESPONDING CHARACTER POSITION IN THE THREAT CORRELATION STRING IS: | THEN THE CORRESPONDING CHARACTER POSITION IN THE RISK PROFILE STRING IS: |
|---|---|---|
| N | ANYTHING | N |
| L | N | L |
| L | L | L |
| L | M | L |
| L | H | M |
| M | N | N |
| M | L | L |
| M | M | M |
| M | H | M |
| H | N | N |
| H | L | M |
| H | M | H |
| H | H | H |

FIG. 24

| WCA_DocEventSrc | |
|---|---|
| | applPubFormat |
| | documentEvent |

| WCA_LookupMgr | |
|---|---|
| PK | tableName |
| PK | columnName |
| | webCaLookupsID |
| | lkupDescription |
| | wiSize |

| | FIG. 34A | FIG. 34B |
|---|---|---|
| FIG. 34C | FIG. 34D | FIG. 34E | FIG. 34I |
| FIG. 34F | FIG. 34G | FIG. 34H | |
| FIG. 34J | FIG. 34K | FIG. 34L | FIG. 34M |

FIG. 34

| WCA_MLSecClass | |
|---|---|
| | ID |
| | maxDateClass |
| | minUserClear |
| | case1 |
| | case2 |
| | case3 |

| WCA_AppdxTTLSrc | |
|---|---|
| | document |
| | title |
| | letter |
| | applPubFormat |
| | appendixType |

| WCA_OSSource | |
|---|---|
| PK | osReferences |
| | osFamily |
| | osMfr |
| | osName |
| | osVersion |
| | osPatchLevel |

| WCA_InfoCategory | |
|---|---|
| PK | InfoCatID |
| | infoCatName |
| | infoCatValue |
| | rank |
| | weight |

| WCA_HelpExamplesSrc | |
|---|---|
| PK | ID |
| PK | applPubFormat |
| | page |
| | type |
| | title |
| | helptext |
| | height |
| | width |
| | seeAlso |
| | pageID |
| | heading |
| | sigID |

| WCA_ClassWeight | |
|---|---|
| PK | ID |
| | characteristic |
| | alternative |
| | weight |
| | applPubFormat |

| WCA_MarkerLookup | |
|---|---|
| | marker |
| | sqlStatement |
| | retrievalType |
| | errorMessageText |

| WCA_AuditLog | |
|---|---|
| PK | id |
| | PID |
| | ProjectName |
| | TableName |
| | KeyValues |
| | StageName |
| | ProcessStep |
| | PageID |
| | UserID |
| | IPAddress |
| | ActionDesc |
| | ActionStatus |
| | ActionTime |
| | EventType |
| | ErrorMessage |
| | UserName |

| WCA_ThreatCategory | |
|---|---|
| | categoryRank |
| | rank |
| | threatCategory |
| | threatElement |

| WCA_SysUserCategory | |
|---|---|
| PK | sysUserCategoryID |
| | category |
| | categoryType |

| WCA_TestProcSrc | |
|---|---|
| PK | templateID |
| | cat1 |
| | cat2 |
| | cat3 |
| | osType |
| | testText |
| | expectedResult |
| | testInstance |
| | testTitle |
| | certAnalysisLevel |
| | threat |
| | impactStatement |
| | interviewFlag |
| | observationFlag |
| | testFlag |
| | documentFlag |
| | testCategoryID |

WCA_HwFamilyLookup
- PK: hwID
- hwFamily
- rank
- type

WCA_SWSource
- PK: swReference
- swFamily
- swMfr
- swName
- swVersion
- swPatchLevel

WCA_SecReqCritQ
- secReqCritQID
- code
- message

WCA_DocTmplSrc
- PK: instance
- PK: document
- PK: paragraph
- PK: applPubFormat
- text
- notes

WCA_ProjDefinitions
- ID
- PID
- term
- definition

WCA_PublishFmt
- publishingCode
- pfDescription

WCA_SwFamilyLookup
- PK: swID
- swFamily
- rank
- type

WCA_ProjDocParaTTL
- PID
- document
- paragraph
- title

WCA_ApplicationID
- PK: applID
- applName

WCA_OsFamilyLookup
- PK: osID
- osFamily
- rank
- type

WCA_DocParaTTLSrc
- title
- paragraph
- document
- applPubFormat
- paragraphLevel
- paragraphType

WCA_MinSeCkListSrc
- PK: sectionName
- PK: question
- testText
- questionSort
- applPubFormat
- validQuestion

WCA_SSAAEventSrc
- applPubFormat
- SSAAEvent

WCA_ProjPublishedDoc
- PID
- document
- title
- filename
- contentType
- creationDate
- content

SYSTEM, METHOD AND MEDIUM FOR CERTIFYING AND ACCREDITING REQUIREMENTS COMPLIANCE

RELATED APPLICATIONS

This application is a Continuation-in-Part of application Ser. No. 09/794,386, filed Feb. 28, 2001, entitled "System, Method And Medium For Certifying And Accrediting Requirements Compliance", which in turn claims priority to application Ser. No. 60/223,982, filed Aug. 9, 2000, entitled "Web Certification and Accreditation System, Method and Medium", each of which is assigned to the assignee of this application and incorporated herein by reference.

BACKGROUND OF THE INVENTION

1. Field of the Invention

The present invention relates generally to the field of certifications and accreditation (C&A) and, more particularly, to a computer-implemented system, method and medium for C&A that automates target system configuration discovery and formats the network or other target system configuration data obtained for use with a C&A system that can utilize the data to assess the risk of and/or determine the suitability of the network or target system to comply with at least one predefined standard, regulation and/or requirement.

2. Background Description

The general purpose of C&A is to certify that automated information systems adequately protect information in accordance with data sensitivity and/or classification levels. In accordance with Department of Defense (DoD) Instruction 5200.40, dated Dec. 30, 1997, entitled *DoD Information Technology Security Certification and Accreditation Process* (*DITSCAP*), which is incorporated herein by reference in its entirety, certification can be defined as the comprehensive evaluation of the technical and non-technical features of an information technology (IT) system and other safeguards, made in support of the accreditation process, to establish the extent that a particular design and implementation meets a set of specified security requirements. Similarly, as used herein, accreditation can be defined as a formal declaration by a designated approving authority that an IT system is approved to operate in a particular security mode using a prescribed set of safeguards at an acceptable level of risk. In general, DISTSCAP is utilized by the DoD for identifying and documenting threats and vulnerabilities that pose risk to critical information systems. DITSCAP compliance generally means that security risk posture is considered acceptable and that potential liability for system "owners" is mitigated.

The C&A process typically involves a number of policies, regulations, guidelines, best practices, etc. that serve as C&A criteria. Conventionally, the C&A process is typically a labor intensive exercise that can require multiple skill sets over a period of time typically spanning 6–12 months. In particular, collecting data pertaining to a network configuration undergoing C&A is done manually by, for example, entering a system hardware configuration, operating system and/or application software package(s) associated with each node (e.g., IP address) on a network undergoing C&A. Several organizations and/or individuals may also be involved in the processes of selecting applicable standards, regulations and/or test procedures, and assembling test results and other information into a DITSCAP compliant package. There is therefore a need to substantially automate the network configuration data collection process, and format the data so that it can be used with, for example, a C&A system that substantially automates the process of performing security risk assessments, certification test procedure development, system configuration guidance, and residual risk acceptance.

SUMMARY OF THE INVENTION

The present invention provides a system, method and medium that substantially automates network configuration discovery and formats the network configuration data for use with an automated C&A system, where the C&A system assesses the risk of and/or determines the suitability of a target system (e.g., one or more devices) to comply with at least one predefined standard, regulation and/or requirement.

In an exemplary embodiment, the data collection process is automated and formatted in a manner that facilitates use with DoD's DITSCAP requirements. The present invention is not, however, limited to a DoD environment, and may also be used in non-DoD government as well as civilian/private sector organizations requiring risk management and guidance. For example, the system and method according to the present invention can also be used to automate the National Information Assurance Certification and Accreditation Process (NIACAP).

An exemplary embodiment according to the present invention contemplates a system, method and medium that automates the network configuration information gathering process, and maps the configuration to, for example, a database table format that can be used by a C&A system such as that originally disclosed in application Ser. No. 09/794,386. An exemplary embodiment according to the present invention also contemplates a browser based solution that automates the DITSCAP process. The browser is preferably directed to five primary elements: 1) gathering information, 2) analyzing requirements, 3) testing requirements, 4) performing risk assessment, and 5) generating certification documentation based on an assessment of the first four elements.

The information gathered primarily relates to a description of the system to be certified, and its respective components and operating environment (e.g., workstation manufacturer and model and/or other hardware characteristics/parameters, operating system and version, secret, or top secret operating environment, etc.). The requirements analysis generally involves selecting by the system, or optionally by the user, a list of standards and/or regulations that the system must or should comply with. Once system/network information is gathered and the requirements analysis is provided, the system can intelligently select a set of test procedures against which the system is tested. Upon completion of testing, the risk assessment provides as output an estimate of the risk level for each individual test failed. Each of the failed tests are also collectively considered and used to evaluate the risk level of the network undergoing C&A (i.e., target system). Then, documentation can be printed that includes information pertaining to the first four elements that would enable an accreditation decision to be made based on the inputs and outputs respectively provided and generated in the first four elements.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways.

BRIEF DESCRIPTION OF THE DRAWINGS

The Detailed Description including the description of a preferred structure as embodying features of the invention will be best understood when read in reference to the accompanying figures wherein:

FIG. 4 is an exemplary project definition screen shot;

FIG. 8 is an exemplary embodiment of a target system configuration file format;

FIG. 10 is an exemplary project hardware screen shot;

FIG. 15 is an exemplary screen shot showing how test plan information can be edited;

FIGS. 20A and 20B are exemplary screen shots that enable a user to enter test results;

FIG. 22 is a table showing three different levels of illustrative threat categories;

FIG. 24 is an exemplary scheme by which the risk of an individual test failure is assessed in accordance with at least some embodiments contemplated by the present invention;

DETAILED DESCRIPTION

Figure 1:
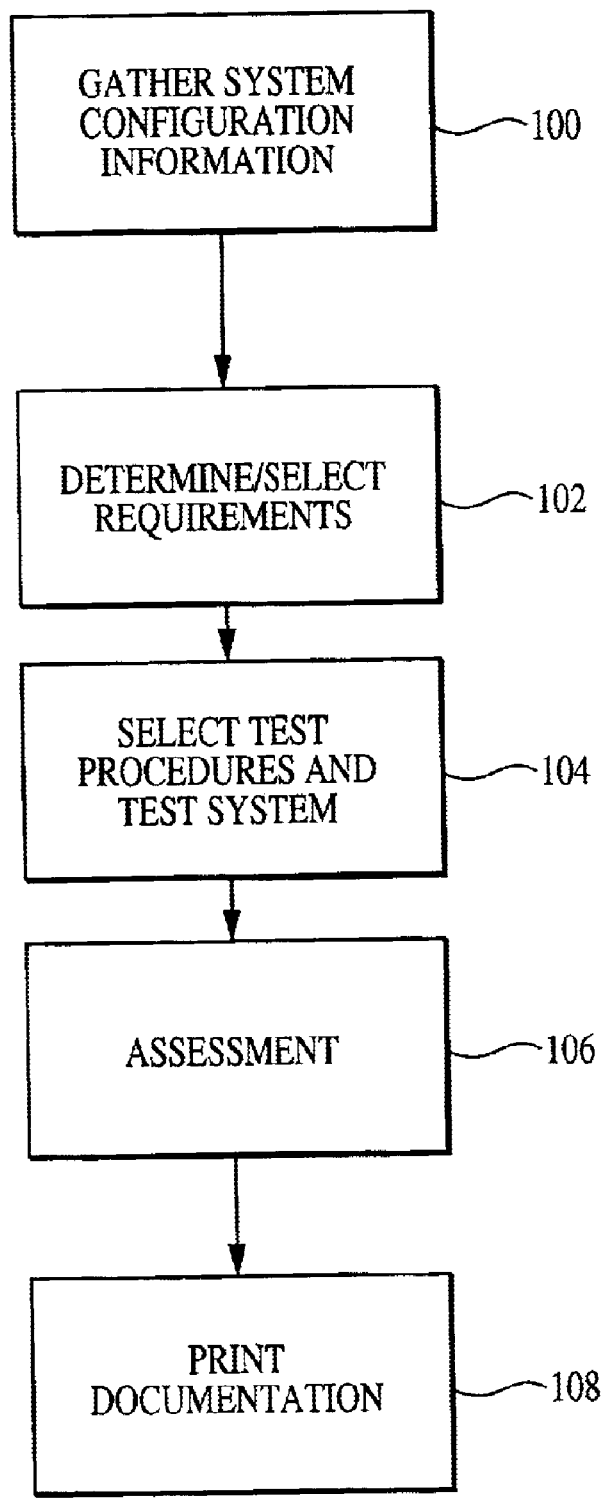
FIG. 1 is an exemplary high level flowchart of a method contemplated by at least some embodiments of the present invention.

Referring now to the drawings, and more particularly to FIG. 1, a high level flow diagram is shown that provides an overview of the method according to the present invention. In the first step, information is gathered pertaining to the system or network undergoing C&A. This is indicated by a block 100. The information gathered typically relates to a description of the system to be certified, and its respective components and operating environment (e.g., workstation manufacturer and model, operating system and version, secret, or top secret operating environment, etc.). As will be described in further detail herein, at least some embodiments of the present invention advantageously automate collection of certain information pertaining to the network undergoing C&A. Alternatively, the information pertaining to the network undergoing C&A can be manually entered.

As indicated above, aspects of at least some embodiments of the present invention are described in accordance with DoD's DITSCAP requirements. However, it should be understood that such description is only by way of example, and that the present invention contemplates use with regard to any number of types of requirements or environments. In addition, within its use with regard to DITSCAP requirements, it should be understood that many of the various aspects and selection options are also exemplary, as is the fact that information is shown as being entered via a web browser.

The requirements analysis generally involves selecting (by a human and/or some automated procedure) a list of standards and/or regulations that the system must, or should, comply with. This is indicated by a block 102. Optionally, selection of additional standards/regulations and/or requirements by a user is also contemplated. At least some embodiments of the present invention then contemplate automatically displaying/listing each requirement that comprises the current security requirements traceability matrix (SRTM), which is derived from the selected set of standards and/or regulations that the system must comply with. Additionally, the user will be able to customize the current SRTM by either adding, editing and/or deleting requirements. As known to those skilled in the art, a SRTM can be a table used to trace project lifecycle activities (e.g., testing requirements) and/or work products to the project requirements. The SRTM can be used to establish a thread that traces, for example, testing and/or compliance requirements from identification through implementation. A SRTM can thus be used to ensure that project objectives and/or requirements are satisfied and/or completed.

Once information is gathered 100 and the requirements analysis 102 is provided, the system intelligently selects a set of test procedures against which the system is tested, as indicated by block 104. The test procedures are selected in a manner so that successful completion of the test procedures will render the system undergoing C&A to satisfy the SRTM requirements.

Figure 2:
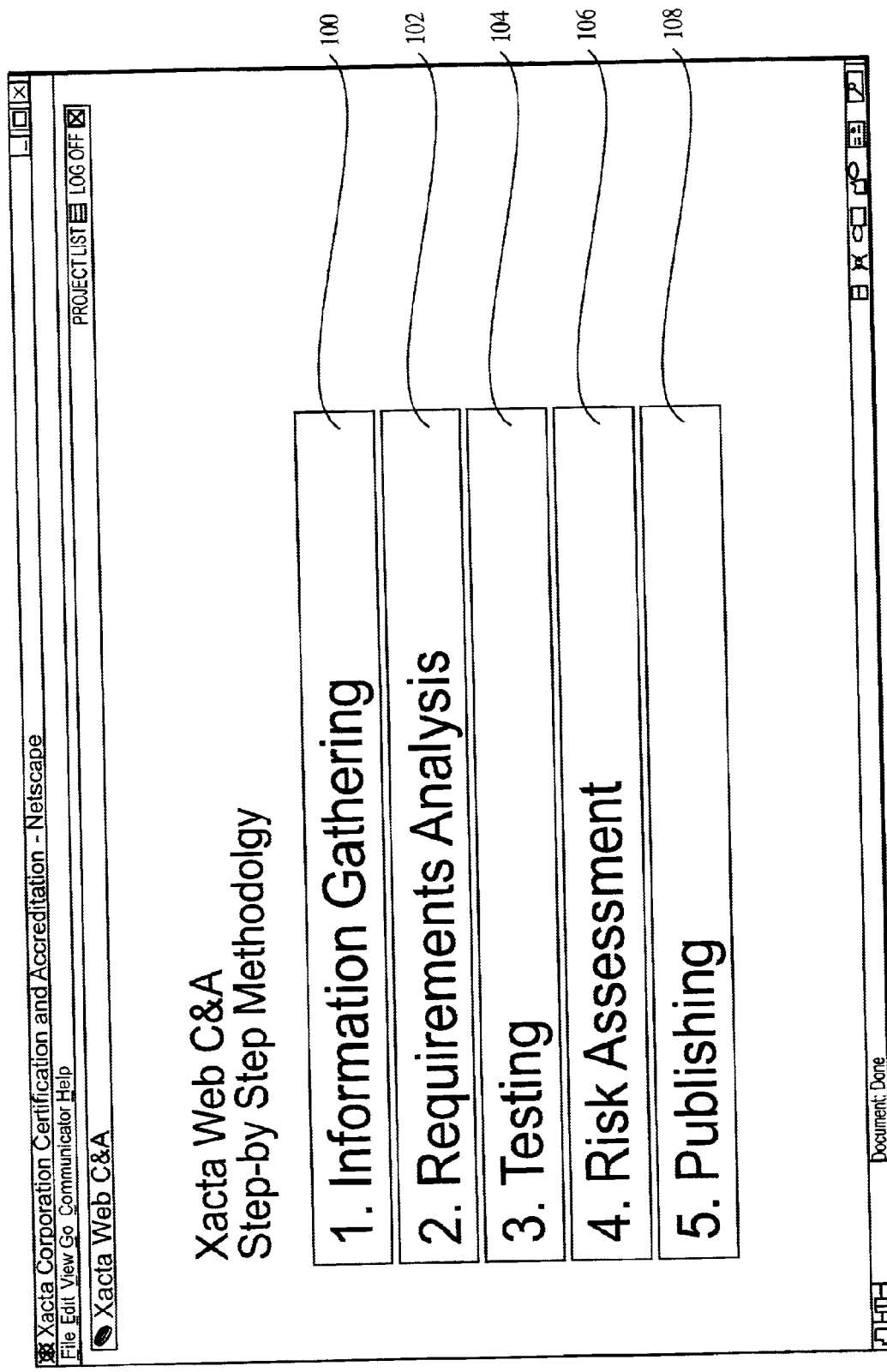
FIG. 2 is an exemplary introductory screen shot corresponding to the flow chart provided in FIG. 1.

Upon completion of testing 104, the risk assessment step (as indicated by a block 106) then involves assessing for each test failure (should any exist) the vulnerability of the system, as well as the level of the threat as determined by the information gathered. The risk assessment 106 provides as output an estimate of the risk level for each individual test failed. Each of the failed tests are also collectively considered and used to evaluate the risk level of the system as a whole. Then, documentation can be optionally printed 108 that includes information pertaining to the first four elements that would enable an accreditation decision to be made based on the inputs and outputs respectively provided and generated in the first four blocks (i.e., 100, 102, 104, 106). Each block shown in FIG. 1 (i.e., 100, 102, 104, 106 and 108) will be discussed in further detail herein. FIG. 2 is an exemplary screen shot corresponding to the blocks (100, 102, 104, 106, 108) provided in FIG. 1. Further information pertaining to the system and method according to the present invention can be found in the following document: WEB C&A™, dated 20 Sep. 2000, available from Xacta Corporation, Ashburn, Va. A copy of this document is incorporated herein by reference in its entirety.

Figure 3:
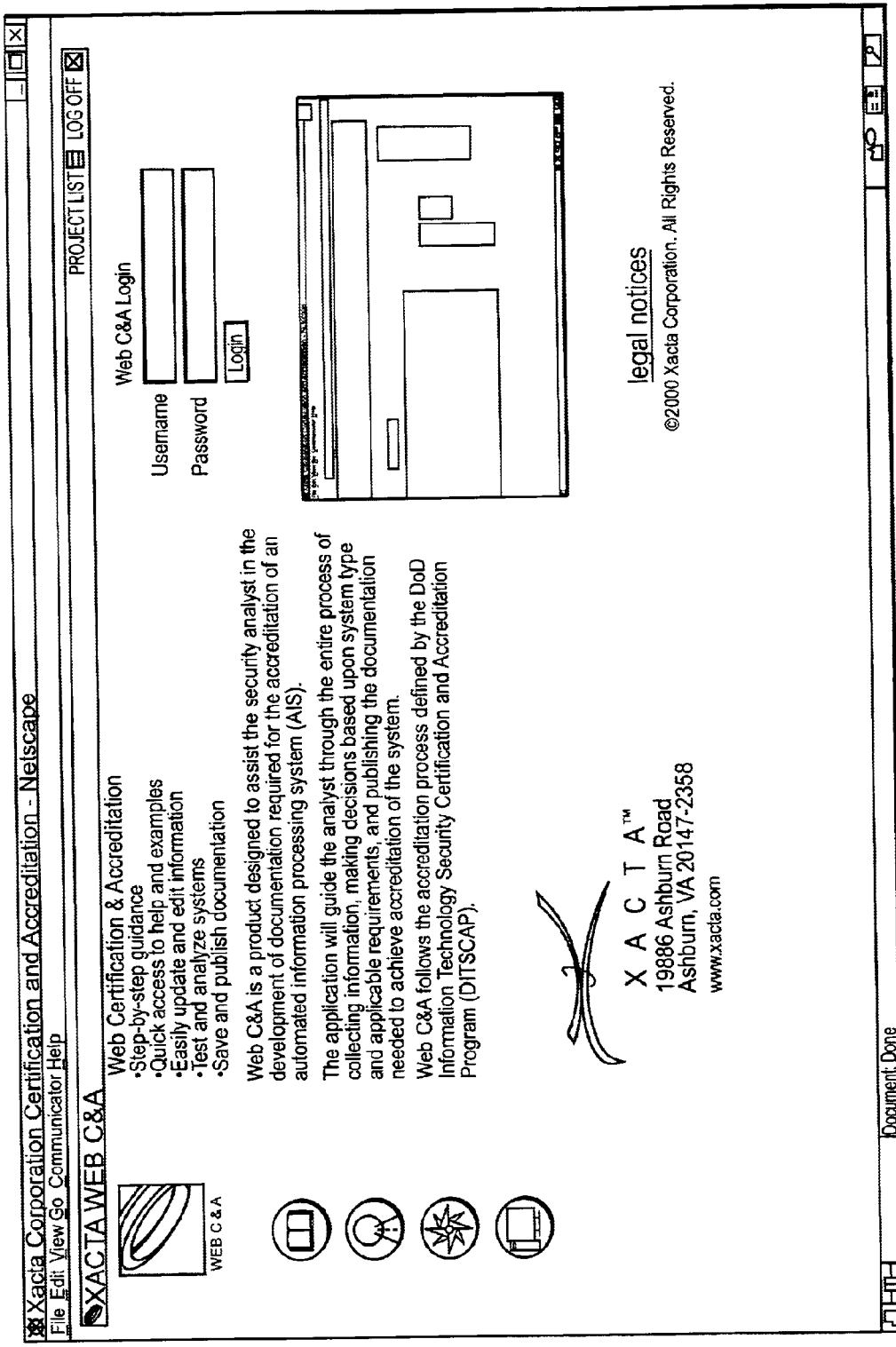
FIG. 3 is an exemplary user login screen shot.

FIG. 3 shows an exemplary access control screen shot (e.g., for access to some or all aspects of the present invention as indicated above). Each user can optionally be required to input a valid user name and password, which provides them with access to only the information for which they are responsible. The system can also optionally exclude the password and access feature, providing users access to a set of predetermined and/or default information.

Information Gathering

Figure 4:
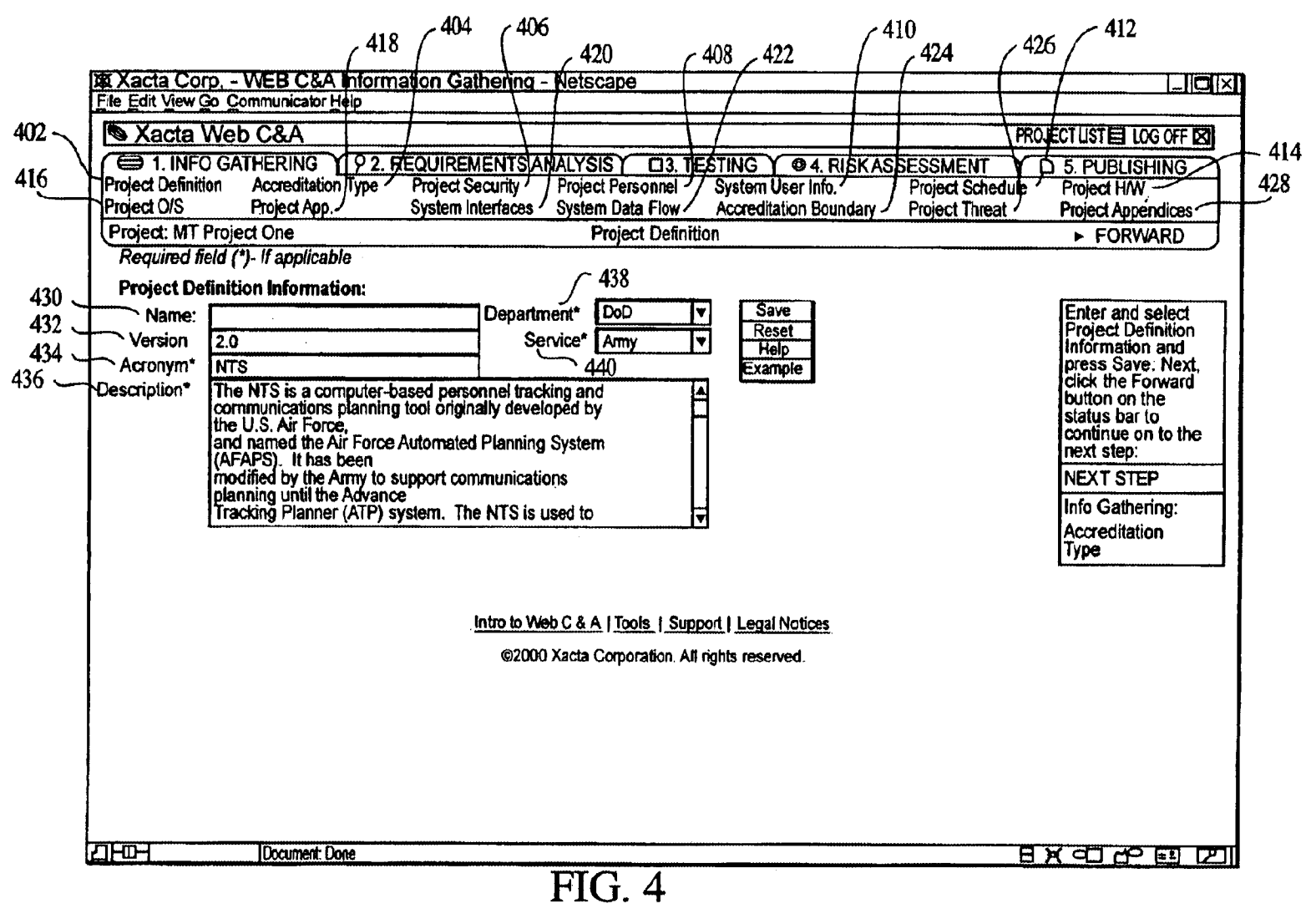
Figure 5:
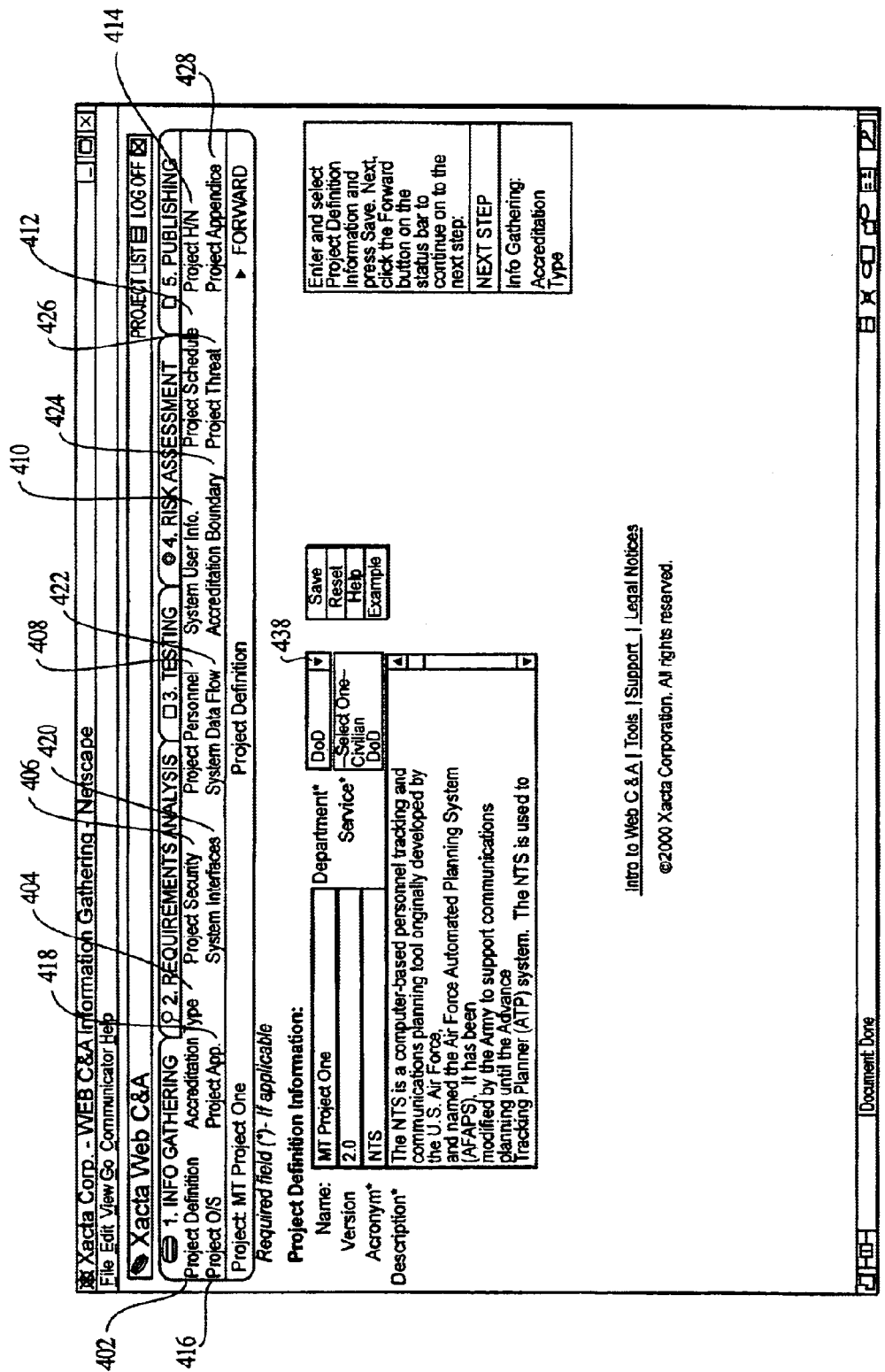
FIG. 5 is an exemplary project definition screen shot showing user selection of either civilian or Department of Defense applicability.

FIGS. 4–5 show selected exemplary screen shots of aspects of the information gathering 100 process. Specifically, FIG. 4 shows project definition information, which is assumed to have been selected by tab 402. Fields such as project name 430, project version 432, project acronym 434, project description 436, department 438, and service 440 can be provided as being part of the project definition. The project name 430 field is preferably a read-only field, provided for information only. The project version field 432 enables the numeric version of the system undergoing C&A to be entered, if applicable. The project acronym field 434 is optionally used to provide an acronym for the project. The project description field 436 can be used to provide a detailed description of the project (e.g., mission statement, function, features, and/or capabilities of the system being accredited). The department field 438 can be used to identify the Government (or civilian) department under which this system is being accredited. As shown, the current choice is DoD. The service field 440 is used to identify the Service/Agency under which this system is being accredited. As shown, the current choices are Army, Navy, Marine Corps, Air Force, OSD, and Other. Each of the above-identified fields can be tailored to suit a particular need and/or application.

FIG. 5 shows how a user can select, via a conventional pulldown menu, either civilian or DoD service from field 438. As disclosed in application Ser. No. 09/794,386, other menus can be provided that, for example, enable a user to select a military service branch (e.g., Army, Air Force, Marine Corps, OSD, or other), and to input Information Technology Security (ITSEC) parameters (that can pertain to, for example, interfacing mode, processing mode, attribution mode, mission-reliance factor, accessibility factor, accuracy factor, information categories, system class level, and certification analysis level, as explained in DoD Instruction 5200.40) of the system being accredited. In addition, as disclosed in application Ser. No. 09/794,386, menus can also be provided that allow a user to, for example, select a security level (e.g., secret, unclassified, sensitive, etc.) and related information, and/or provide context sensitive help.

Figure 6:
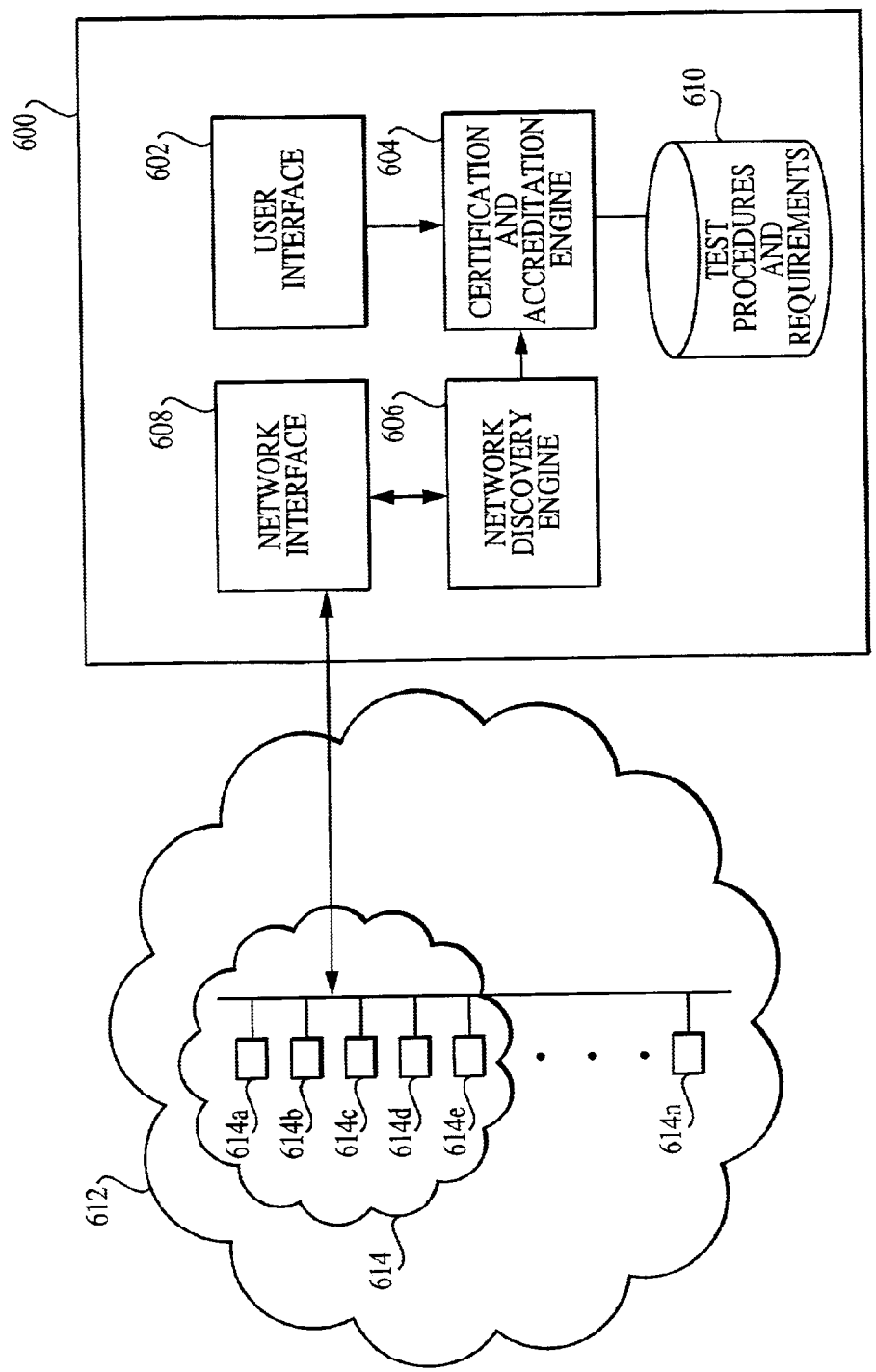
FIG. 6 is an exemplary block diagram of a certification and accreditation (C&A) system assessment aspect and an associated network and/or target system contemplated by at least some embodiments of the present invention.

FIG. 6, shows a high level system diagram that provides an overview of the target system assessment aspect 600 (hereinafter system 600) and an associated network or target system 612 according to at least some embodiments of the present invention. As used herein, a network can be defined as two or more objects that are directly or indirectly interconnected. Referring now to FIG. 6, a network interface 608 provides an interface to one or more networks 612 having one or more network devices 614a–n operatively connected thereto. The network interface 608 can be a conventional RJ-11 or other similar connection to a personal computer or other computer that facilitates electronic interchange with the network 612.

Network Discovery Engine

Figure 7:
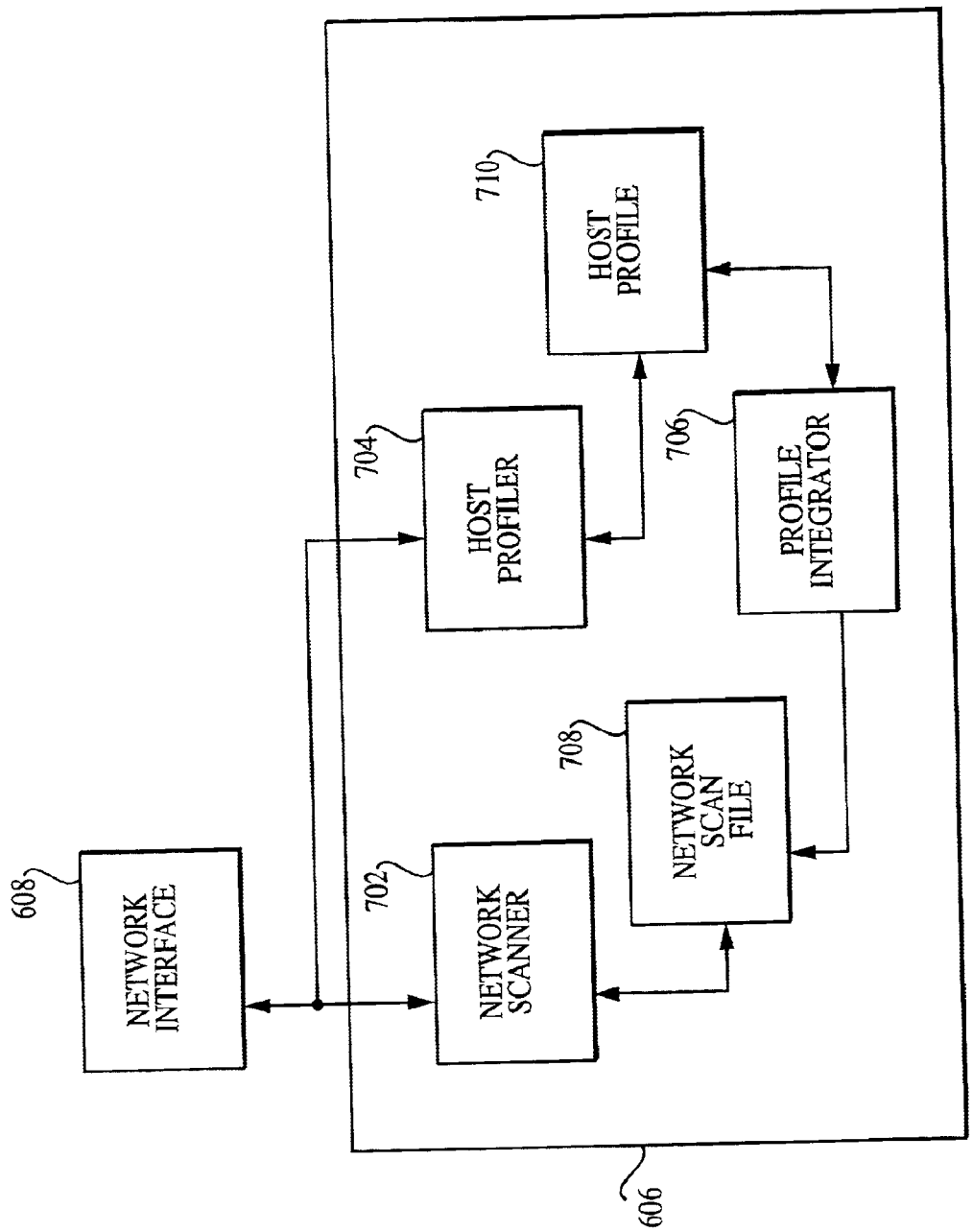
FIG. 7 is an exemplary block diagram of a target system discovery engine contemplated by at least some embodiments of the present invention.

As shown in FIG. 7, at least some embodiments of the present invention contemplate that the network discovery engine 606 comprises three separate modules: a network scanner 702, a host profiler 704, and a profile integrator 706. As will be discussed in further detail herein, the network discovery engine 606, via the network interface, collects information such as IP Address, hostname, media access control (MAC) address, operating system (OS), and OS version for one or more network devices (e.g., 614a–n).

Network Scanner

The network scanner 702 scans a network segment 614 (comprised of network devices 614a–n) and reports the results to a network scan file 708 (e.g., a text file). Network devices 614a–n can be any devices that, for example, have an Internet Protocol (IP) address associated therewith (or that have some other mechanism by which the devices/components can be identified). The network scanner 702 can scan through a specified range of IP addresses associated with each respective network device 614a–e within the network segment 614.

The network discovery engine 606 can utilize conventional network topology discovery techniques such as transmission control protocol (TCP)/user datagram protocol (UDP) port interrogation, and/or simple network management protocol (SNMP) queries, and receive network configuration information provided by such technique(s). Network topology information can optionally be manually added via the user interface 602. Upon entering or providing one or more IP address (e.g., a range of IP addresses), the host name of a network device 614a–n can be obtained by using, for example, a getHostName (or similarly named) function that will query a network device 614a–n for a host name. Functionally, the getHostName function can scan one or more domain naming service (DNS) servers internally and optionally over, for example, the World Wide Web to try and resolve the IP address (i.e., match the IP address with its respective host name). In the case of a MAC address, the initial sweep of, for example, a network segment 614 can have one or more Internet Control Message Protocol (ICMP) requests. One such request can be a "ping request." The packet returned from such a ping request can include, for example, the MAC address of the host device. Similarly, during a port sweep/interrogation, the OS family (e.g., Unix, Windows, etc.) and version can generally be determined. Regarding SNMP queries, if a queried network device 614a–n is SNMP enabled, additional information (e.g., device manufacturer, model, application software), etc. can generally be obtained. Finally, if a network device 614a–n utilizes (e.g., has installed thereon) an Enterprise Management (EM) software/system, the system 600 can scan the EM database (or an extract or portion thereof) associated with a particular network device 614a–n to obtain additional detailed information on each network device 614a–n in the IP range.

The network scanner 702 can obtain the following information relating to network devices 614a–e (which correspond to the network segment 614 under consideration): IP Address, hostname, media access control (MAC) address, operating system (OS), and OS version. This information can be written to a network scan text file 708. The MAC address, as used herein is a hardware address that uniquely identifies each node of a network. In IEEE 802 networks, for example, the Data Link Control (DLC) layer of the Open System Interconnection (OSI) Reference Model is divided into two sublayers: the Logical Link Control (LLC) layer and the Media Access Control (MAC) layer. The MAC layer interfaces directly with the network media. Consequently, each different type of network media requires a different MAC layer. On networks that do not conform to the IEEE 802 standards but do conform to the OSI Reference Model, the node address is called the Data Link Control (DLC) address.

Host Profiler

The host profiler 704 can produce a host profile file 710 (e.g., a text file) containing information such as hardware configuration, operating system and patch levels, installed software list, etc. Host profilers 704 can optionally be provided to accommodate different classes of hosts (e.g., Windows-based machines, UNIX-based machines, etc.). The host profile can be conventional enterprise management software developed by Tivoli Systems Inc., Austin Tex., or by Computer Associates International, Inc., Islandia, N.Y.

Using conventional system commands, operating system application program interface (API) calls, registry calls, etc., the host profiler 704 can determine information about the hardware configuration, operating system options, installed software, etc. of each network device 614a–e within a particular network segment 614. This information for each host 614a–e can be recorded in the host profile file 710. The data in the host profile file 710 can then be used to supplement the information about the respective host in the network scan file 708. A host profile text file 710 can contain information about more than one host.

Profile Integrator

The profile integrator 706 enables information from host profile file 710 to be added to an existing network scan file 708. The profile integrator 706 takes the data in one or more host profile text files 710 and integrates the data into an existing network scan text file 708.

Network Scan File

The network scan file 708 can utilize the conventional Microsoft .INI type file format. As will be appreciated by those skilled in the art, an .INI file is a file that contains startup information required to launch a program or operating system. In general, the network scan file 708, which can be an ASCII file, can identify particular network devices 614a–e by using the form <parameter>=<value>, where <parameter> is the name of the particular item of information, and <value> is the value of that item of information for the network device 614a–e under consideration. For example, as shown in FIG. 8 at 808a, the IP Address=192.168.0.10 indicates the identified host responded at the specified IP address.

As further shown in FIG. 8, the network scan file 708 can begin with a [Network] section 802 that describes the overall network being scanned. The network (e.g., network 612) name is Xacta, as indicated at 802a. Each network segment (e.g., 614) can be described by a [Segment] section 806. The network segment is called Office, as indicated at 807. At 806a, the network name Xacta is again provided. The Office segment has IP addresses in the 192.168.0.0-255 subnet, as indicated at 806b. The subnet was scanned twice: once on Dec. 1, 2000, and once on Dec. 15, 2000, as indicated at 806c and 806d, respectively.

A [Host] section 808, 810 can also be provided for each network device (e.g., 614a–e) within the network segment 614. The IP Address 808a, MAC 808b, Hostname 808c, OS 808d, and Version 808e are the basic information collected by the network scanner 702. At 810, the information collected by the host profiler 704, which has been integrated into the network scan file 708 by the profile integrator 706, includes: IP Address 810a, MAC 810b, Hostname 810c, OS 810d, and Version 810e, mfr 810f, model 810g, CPU 810h, CPU Qty 810i, CPU Speed 810j, RAM 810k, Disk Space 810l, and Software 810m–p. The host profile file 710 can use the same file format (e.g., .INI) as the network scan file 708. The profile integrator 706 can integrate one or more host profile files 710 with a network can file 708. Each [Host] sections (e.g., 810) can either have their own separate host profile files 710. Alternatively, two or more host sections 810 can be included in a host profile file.

Figure 9:
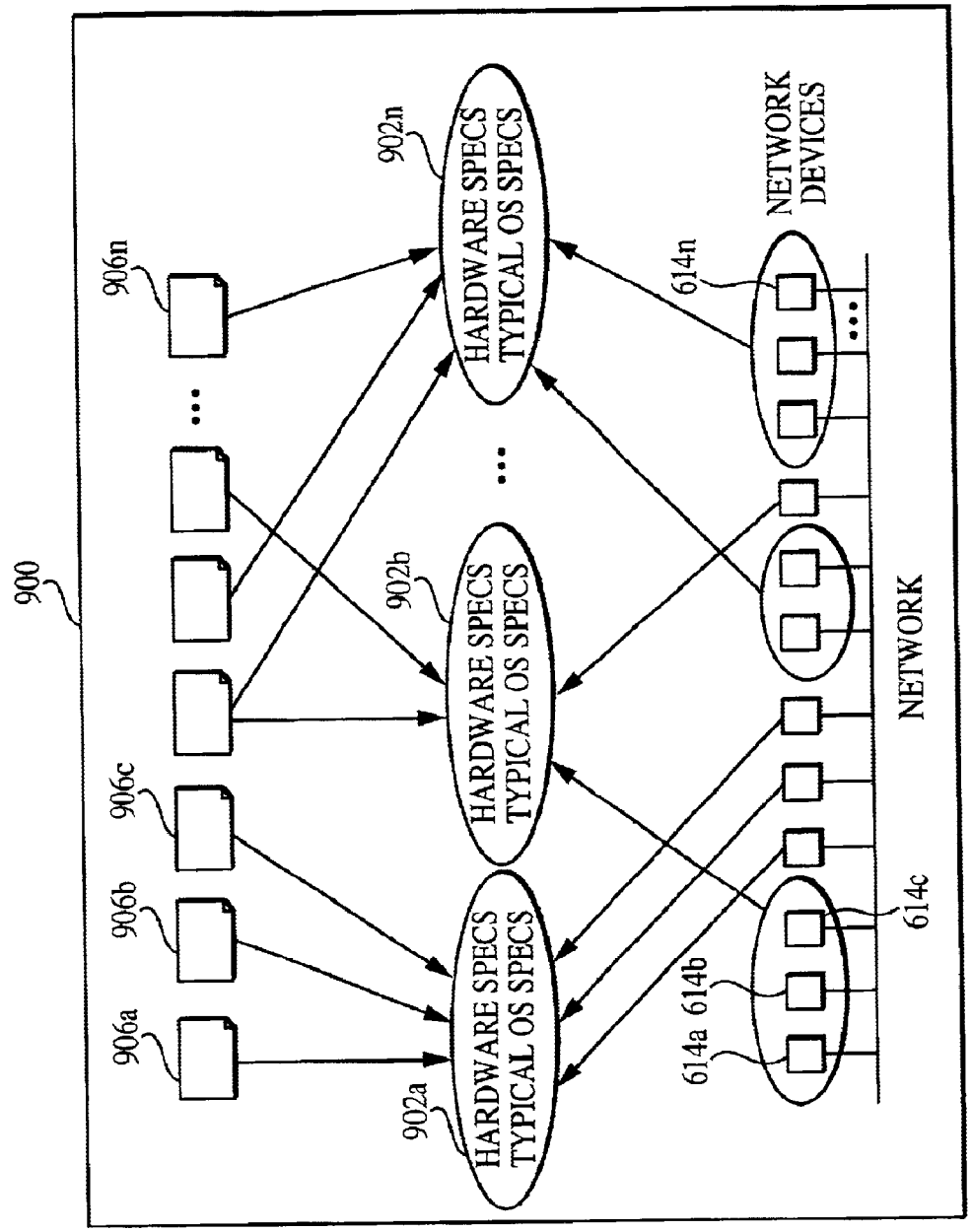
FIG. 9 is an exemplary illustration of the target system scanning and profiling relationships.

FIG. 9 illustrates an exemplary schema 900 that can be used in conjunction with network discovery. As shown, the schema 900 comprises: platform categories 902 (comprising categories 902a–n), network 612 (comprising network devices 614a–n), and software inventory 906 (comprising application software programs/packages 906a–n).

Platform category elements 902a–n represent generic categories of equipment that lie within the accreditation boundary (e.g., network segment 614) that includes the components (e.g., network devices 614a–e) that are associated with the network segment 614 being accredited. Representative platform categories can include desktop computer, laptop computer, mainframe computer, handheld device, hub, etc. Platform categories generally represent typical configuration(s) of the network devices 614a–n that belong to a particular platform category. As used herein, an accreditation boundary can be defined as the network devices (e.g., 614a–e) that comprise the network segment 614 (or target system) being accredited. There can also be one or more devices that are associated with the network segment 614 being accredited, but that are outside of the accreditation boundary and thus not included in the accreditation. Equipment outside the accreditation boundary can include equipment/services as a domain naming service (DNS) used to translate the host names to IP addresses.

With regard to platform category elements 902a–n, the typical office LAN might consist of the following platform categories: file server, mail server, network printer, router, switch, and workstation. Information about each platform category 902a–n can include hardware specifications (e.g., manufacturer, model, CPU, memory, etc.) and OS specifications (e.g., OS name, version, patches, etc.). Since the platform categories 902a–n are generic, and numerous actual network devices 614a–n generally exist, the hardware and OS specifications of a platform category 902a–n will represent the typical configuration expected of network devices that belong to a particular platform category (e.g., network devices 614a, 614b, 614c and 614i belong to equipment category 902b).

Network devices 614a–n represent actual pieces of equipment within the accreditation boundary. Each network device 614a–n belongs to one of the exemplary platform categories 902a–n, as discussed above. Upon assignment to a platform category 902a–n, each network device 614a–n can "inherit"(or is assumed to have) the generic information (e.g., hardware and OS specs) of its assigned category. A user, via user interface 602, can then optionally add, delete and/or edit information. Network devices 614a–n are assigned to a platform category (e.g., 902a) to facilitate test procedure generation, as will be discussed in further detail herein, particularly with regard to FIG. 17.

Software inventory elements 906a–n represent application programs (i.e., operating systems are not included). The system 600 can form an association between one or more software elements 906a–n and one or more platform category element 614a–n (e.g., an association is formed between software elements 906a, 906b, 906c and platform category 902a). When such an association is formed, the software is considered to be installed on all equipment in that platform category 902a–n. Similarly, the system 600 can form associations between a software element 906a–n and a network device 614a–n. Such an association indicates that the software is actually installed on the associated network device 614a–n, but that the software element is not necessarily installed on every network device in a given platform category 902a–n.

Figure 10:
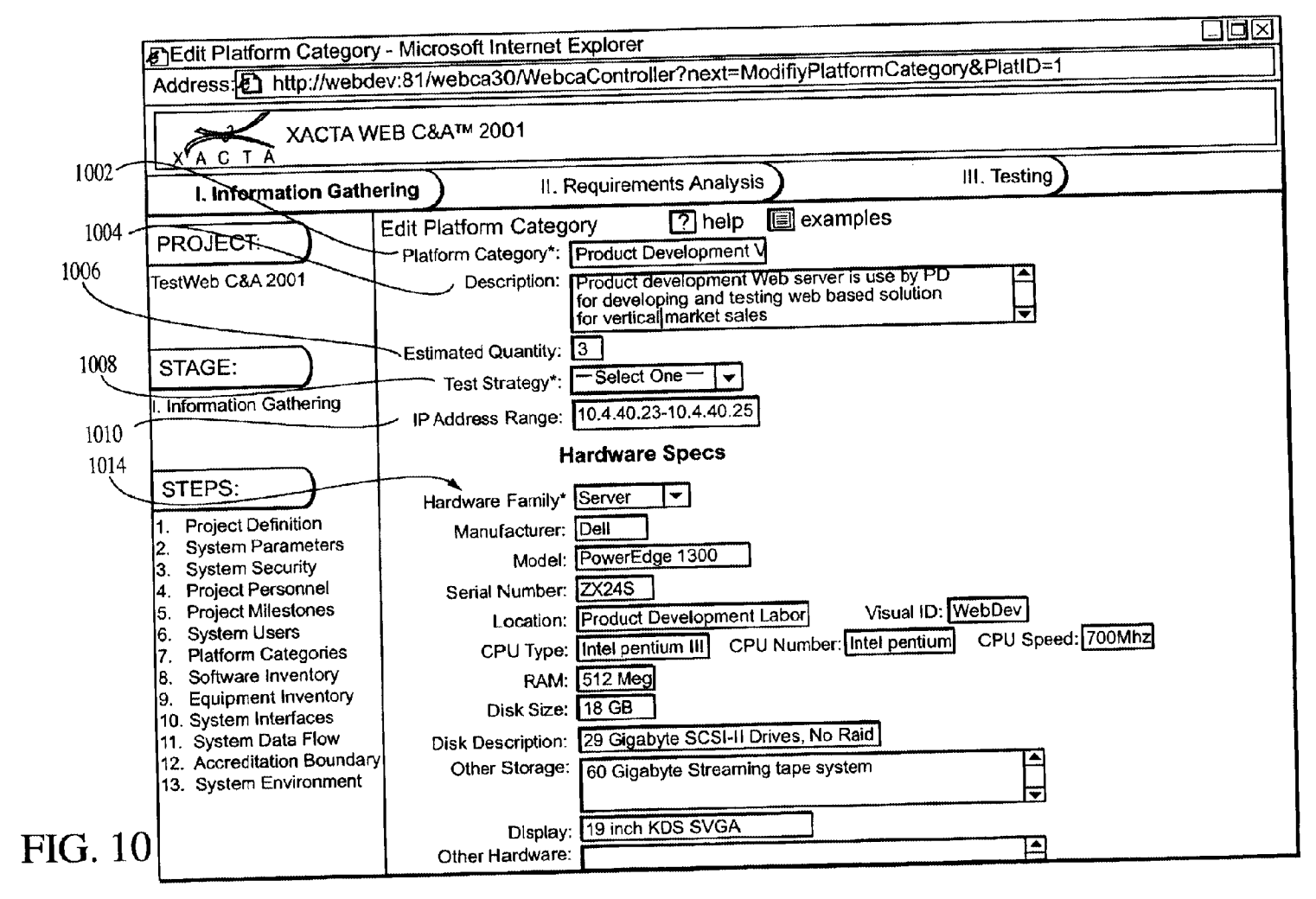

Network configuration information can also be manually entered into the system 600. For example, returning to FIG. 4, when project hardware tab 414 is activated, a menu as shown in FIG. 10 can be provided. The menu allows a user to, for example, Edit/Delete H/W 472, enter various Platform Information 474, CPU information 476, and/or Memory/Storage Information 478. This information can be modified to reflect changes in system configurations throughout the information gathering requirements analysis and testing phases.

Database Tables

At least some embodiments according to the present invention contemplate a database structure with at least the following tables that can be utilized to accommodate the network scanning and profiling features. The exemplary data dictionary disclosed herein provides additional details pertaining to the following tables.

WCA_ProjPlatCat Table—contains a row for each defined platform category.

WCA_ProjEquipInven Table—contains a row for each piece of equipment.

WCA_ProjSWInven Table—contains a row for each defined software element.

WCA_ProjPlatSW Table—contains a row for each defined association between a software inventory element and a platform category (for each project); each such association indicates that the software element is typically installed on members of the associated platform category.

WCA_ProjEquipSW Table—contains a row for each defined association between a software inventory element and an equipment inventory element (for each project); each such association indicates that the software element is actually installed on that particular piece of equipment.

WCA_OSSource Table—contains a row for each 'standard' operating system, including family (NT, UNIX, or Other), manufacturer, name, version, etc.

WCA_SWSource Table—contains a row for each 'standard' software application, including family (e.g. database, network OS, etc.), manufacturer, name, version, etc.

Certification and Accreditation Engine

As will be explained in further detail herein, once information has been collected (either manually or via an automated process, each as described above) pertaining to devices 614a–e belonging to the network segment 614, the certification and accreditation engine 614, can select compliance requirements/standards and test procedures applicable to the C&A under consideration. A user can also select requirements/standards and/or test procedures by using, for example, user interface 602.

Additional Information Gathering

Returning again to FIG. 4, when project personnel tab 408 is activated, a menu (not shown) can be provided that enables a user to enter information identifying all the project personnel associated with the accreditation effort. The personnel are preferably identified by the role, as discussed below, that they serve in the accreditation process. At least one entry for each role is preferably defined for the project.

For example, the following fields can be provided in a menu (not shown) subsequent to clicking the personnel tab 408:

Role Name—The role associated with the accreditation team member. The available choices can be:
Accreditation Team Lead—The person in charge of the accreditation effort, usually the Project Manager.
Accreditation Team Member—All the members of the accreditation team (analysts, testers, etc.).
Certification Authority (CA)—Person in charge of the system certification.
Certification Authority POC—Point of Contact (POC) to the CA.
DAA—Designated Approving Authority. Person ultimately responsible for the accreditation of the system.
DAA POC—Point of Contact (POC) to the DAA.
ISSO—Information System Security Officer. Person responsible for the security implementation of the system being accredited.
Organization Responsible—Organization responsible for the design and development of the system being accredited.
Organization Responsible POC—Point of Contact to the Organization responsible.

Program Manager—Program manager of the system being accredited.

User Representative—Representative from the user community.

Title—The title associated with the accreditation team member (Mr., Ms. or Dr., etc.)

First Name—The first, middle initial, and last name of the accreditation team member.

Office—The office (e.g., Office of the Assistant Deputy for Policy and Planning) of the accreditation team member.

Office Designation—The office designation of the accreditation team member. For example, if the office is the Office of the Assistant Deputy for Policy and Planning, then the office designation may be ADS-P.

Organization—An organization that is associated with the accreditation team member.

Work Address—A work address if applicable for the accreditation team member (include city, state and zip code).

Work Phone—A work phone number for the accreditation team member.

Work Fax—A work fax number if applicable for the accreditation team member.

Email Address—An email address if applicable for the accreditation team member.

When the project schedule tab 412 of FIG. 4 is activated, a screen can appear (not shown) that provides the capability to describe and store each project milestones for the system being accredited. Fields such as milestone title, milestone date, and milestone description can be provided.

When project hardware tab 414 is activated, a menu as shown in FIG. 10 can be provided. The menu allows a user to, for example, Edit/Delete H/W 472, enter various Platform Information 474, CPU information 476, and/or Memory/Storage Information 478. This information can be modified to reflect changes in system configurations throughout the information gathering requirements analysis and testing phases.

When project operating system 416 is activated, a menu (not shown) that enables a user to manually, in addition to or in lieu of the automated process heretofore, describe and store operating systems associated with the system hardware is provided. The ability to enter information pertaining to multiple operating systems (OS) on each hardware platform can be provided. Fields are provided to enable a user to enter information pertaining to the OS Name (e.g., Windows NT, AIX, HP UX, etc.), OS Type (e.g., NT, UNIX, etc.), OS Manufacturer (e.g., Microsoft, Hewlett Packard, IBM, etc.), OS Version (the numeric value of the operating system version), OS Options (a list of all OS options (if any) obtained for this platform), OS Patches (a list of OS patches (if any) that have been installed on the platform), OS Description (a detailed description of the operating system, possibly including the basic features, and any functions unique to the system being accredited).

When project application tab 418 is activated, a project application screen appears (not shown) that can provide the analyst with the ability to manually, in addition to or in lieu of the automated process described heretofore, describe and store applications associated with the system hardware/OS combinations. The following exemplary fields can be provided: Application Name (the name of the application), Application Type (the type of application on the system being accredited—e.g., database, office automation, e-mail server, etc.), Application Manufacturer (the name of the application manufacturer), Application Version (the numeric version of the application), Application Options (a list of the options associated with the application (if any)), Application Patches (a list of the patches associated with the application), and Application Description (a detailed description of the application).

When system interfaces tab 420 is activated, a menu (not shown) is provided that provides the user the ability to describe and store the flow of information into and out of the accredited system. The system interfaces entries can describe each of the internal and external interfaces identified for the system. The following exemplary fields can be provided: Interface Name (an internal or external name associated with the system interface), and Interface Description (a detailed description of the internal or external system interface, which preferably includes a statement of the significant features of the interface as it applies to the entire system, as well as a high level diagram of the communications links and encryption techniques connecting the components of the information system, associated data communications, and networks).

When system data flow tab 422 is activated, a menu (not shown) is provided that can provide the user the ability to describe and store the flow of information within the accredited system. System data flow entries can describe the flow of information to each of the external interfaces identified for the system. The following exemplary fields can be provided: Data Flow Short Name (a brief user-defined name associated with the system data flow), and Data Flow Description (a detailed description of the data flow associated with the external interface, which preferably includes a statement of the purpose of the external interface and the relationship between the interface and the system, as well as the type of data and the general method for data transmission, if applicable).

When accreditation boundary tab 424 is activated, a menu (not shown) that provides the user with the ability to describe and store the identification of components that are associated with the system being accredited, but are outside of the accreditation boundary (i.e., not included in the accreditation). This category might include such equipment/ services as, for example, a domain naming service (DNS) used to translate the host names to IP addresses. The DNS might not be part of the atomic system being accredited, but is required for most communication activities. The following exemplary fields can be provided: Accreditation Boundary Name (a name associated with the external system component), and Accreditation Boundary Description (a detailed description of the external system component, which preferably includes the function that this component/ service provides the system being accredited and its relationship to the system).

When project threat tab 426 is activated, a menu (not shown) appears that provides the user the ability to quantify the threat environment where the system is intended to operate. If the system is targeted to operate in multiple locations, the environmental condition that results in the higher or highest level of risk can be selected. The following exemplary fields can be provided: Location (CONUS (CONtinental US) or OCONUS (Outside CONtinenal US) as the primary operating location for the system), System Communications (the primary means of information transfer to external systems, such as No LAN, Local LAN Only, SIPRNET (SECRET Internet Protocol Router Network), NIPRNET (Unclassified but Sensitive Internet Protocol Router Network), Internet, etc.), Connection (the types of connection—e.g., wireless, dial-up, or protected distribution system (PDS), etc.), Training Competency Level (e.g., administrator, maintenance personnel, user, etc.), Installation Facility (the operating environment of the system at its intended end site), Natural Disaster Susceptibility (e.g., fire, flood, lightning, volcano, earthquake, tornado, etc.), and Custom Components.

When project appendices tab 428 is activated, a menu (not shown) that provides the user the ability to identify external documents that are associated with the C&A is provided. These appendices can optionally include references to other documents, or consist of the contents of other documents that are accessible via a computer-implemented embodiment of the present invention. Representative appendices that may be derived are: System Concept of Operations, Information Security Policy, System Rules of Behavior, Incident Response Plan, Contingency Plans, Personnel/Technical Security Controls, Memoranda of Agreement, Security, Education, Training and Awareness Plan, and Certification and Accreditation Statement.

Tabs 402–428 can be activated in any order, and do not need to be activated sequentially. Also, each tab can be optionally customized to contain different, fewer, or additional fields relative to the fields discussed above. Further, the tabs (402–428) can be arranged differently. Fewer or additional tabs can also be provided to suit a particular application or need.

Requirements Analysis

Figure 11:
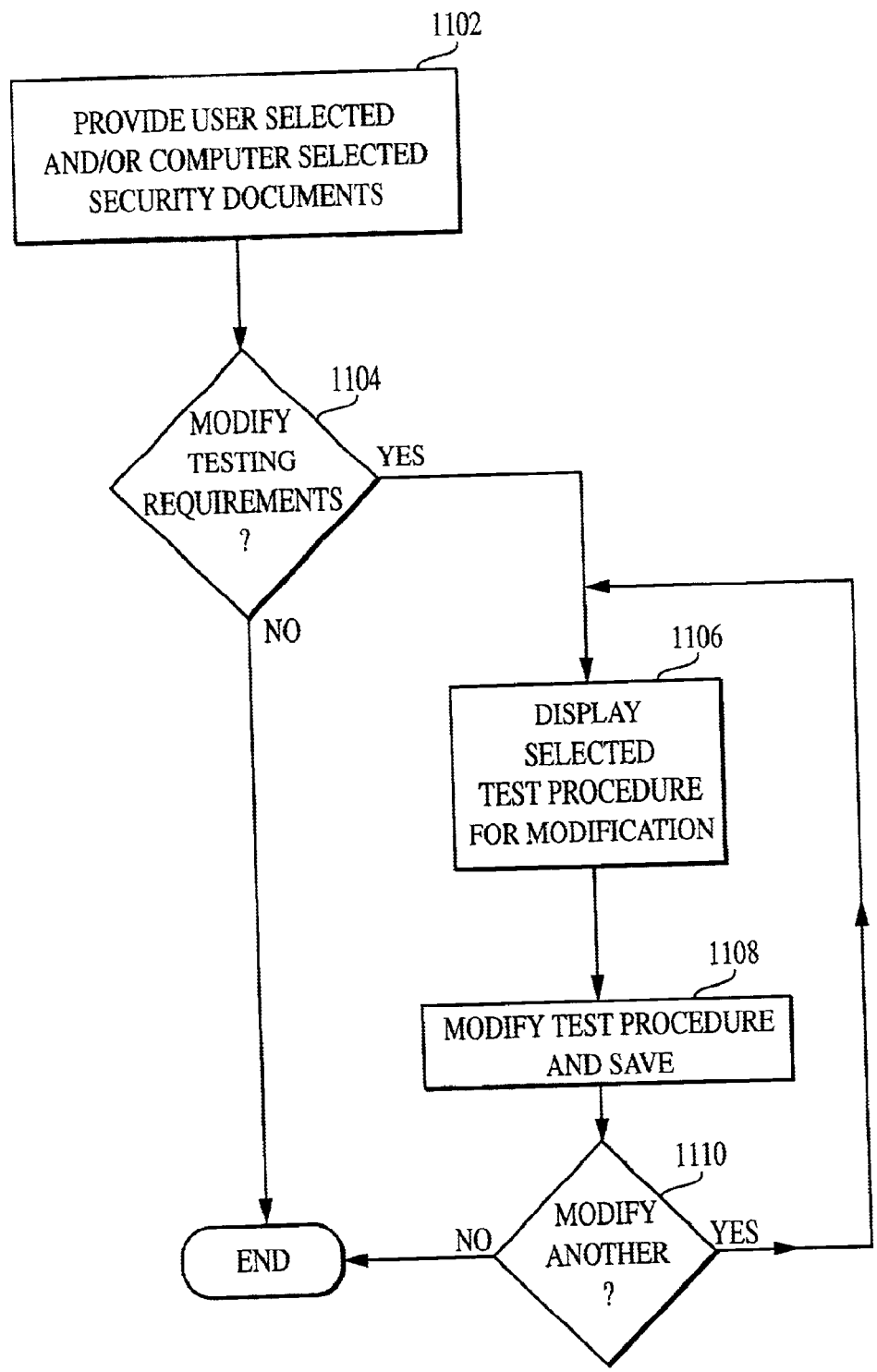
FIG. 11 is an exemplary flow chart of the requirements analysis process as contemplated by at least some embodiments of the present invention.

The system configuration captured in the step of block 100 of FIG. 1 is used as input for the determination of the requirements indicated by block 102. The process of editing and/or determining/selecting those requirements is shown in FIG. 11. In at least some embodiments contemplated by the present invention, the Requirements Analysis step is related to the Accreditation Type 404 and Project Security 406 information stored in the step indicated by block 100. In at least some embodiments, data is entered and saved in the Accreditation Type 404 and Project Security 406 fields provided before beginning the Requirements Analysis step indicated by block 102.

In an exemplary embodiment, a general purpose computer on which the present invention operates will have stored thereon or have access to a repository of security regulations and test procedures from various government and/or civilian departments, agencies, organizations, etc (e.g., such as those from DITSCAP). In step 1102 (FIG. 11a), and based at least in part on the information entered in step 100, pertinent regulations will be selected from this repository, upon which to build a security requirement traceability matrix (SRTM) for the C&A. The SRTM, as discussed above, can be a mapping of one or more test procedures to each individual requirement within a requirements document. Satisfactory completion of the respective one or more test procedures that can be mapped to each requirement is generally considered to render the requirement satisfied. However, the user has the flexibility to view and modify 1104 the SRTM as desired to meet the specific needs of the systems being accredited by, for example, adding and/or deleting one or more tests to/from the SRTM, and/or editing one or more of the test procedures to, for example, include additional testing requirements. If the user decides to modify a test procedure, the specified test procedure displayed 1106. The user can then modify and save the revised test procedure 1108. The user can then either end the editing process or continue to modify another security document 1110.

Figure 12:
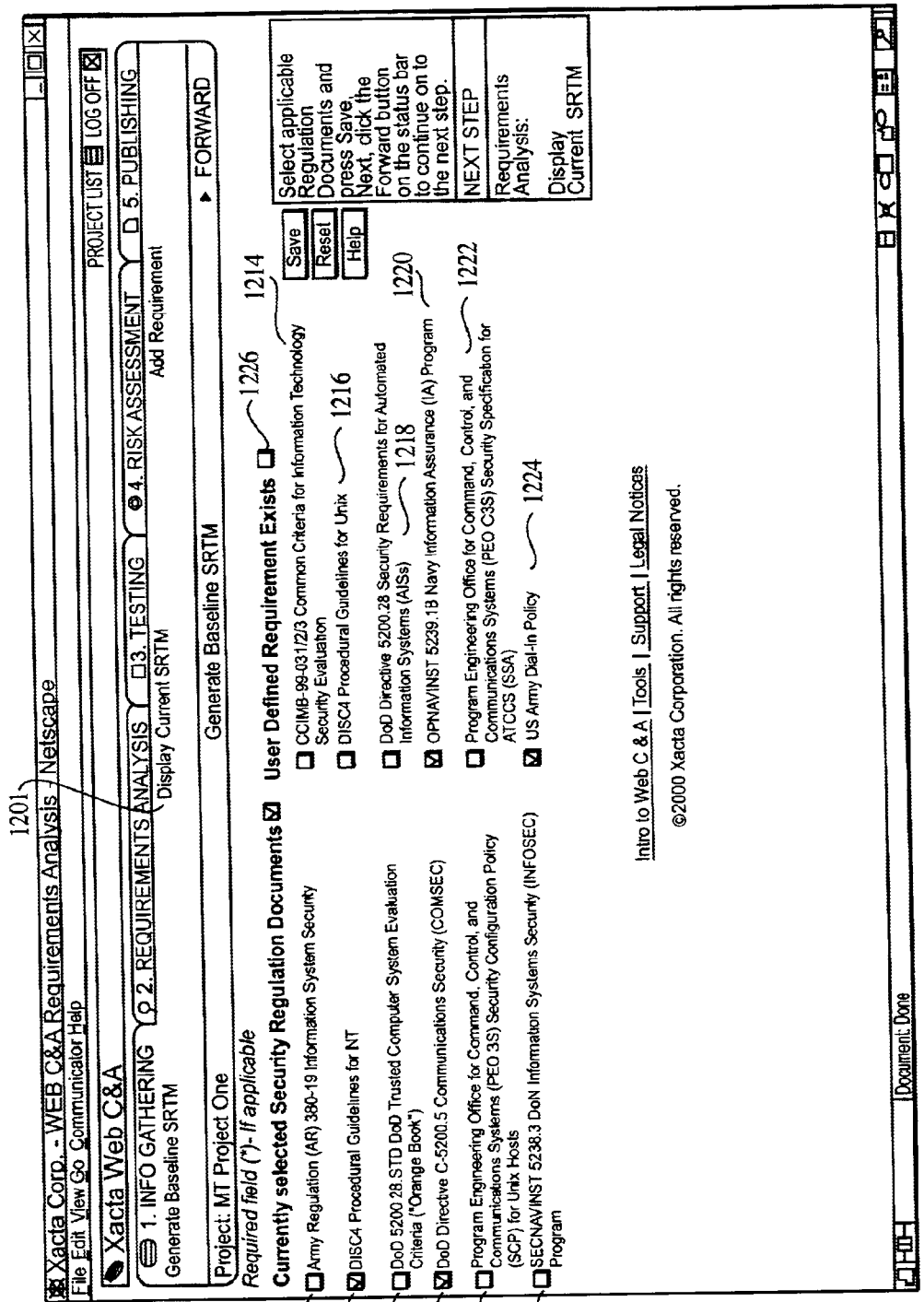
FIG. 12 is an exemplary screen shot used to generate a security requirements traceability matrix (SRTM)

FIG. 12 shows an exemplary Generate Baseline SRTM screen shot. In at least some embodiments of the present invention, clicking the Requirements Analysis tab 1201 from the application menu will switch control to the Generate Baseline SRTM screen. As shown, FIG. 12 provides a menu that provides a list of pre-packaged (i.e., shipped with the application) regulations documents (1202–1222) for the user to select. Each regulations document (1202–1222) contains specific requirements, one or more of which may be utilized when performing the C&A. All unmarked check boxes (e.g., check boxes associated with documents 1202, 1206, 1210, 1212, 1214, 1216, and 1218) represent unselected Regulations Documents, and thus do not factor into the requirements analysis step 102 for the particular project under consideration.

Figure 13:
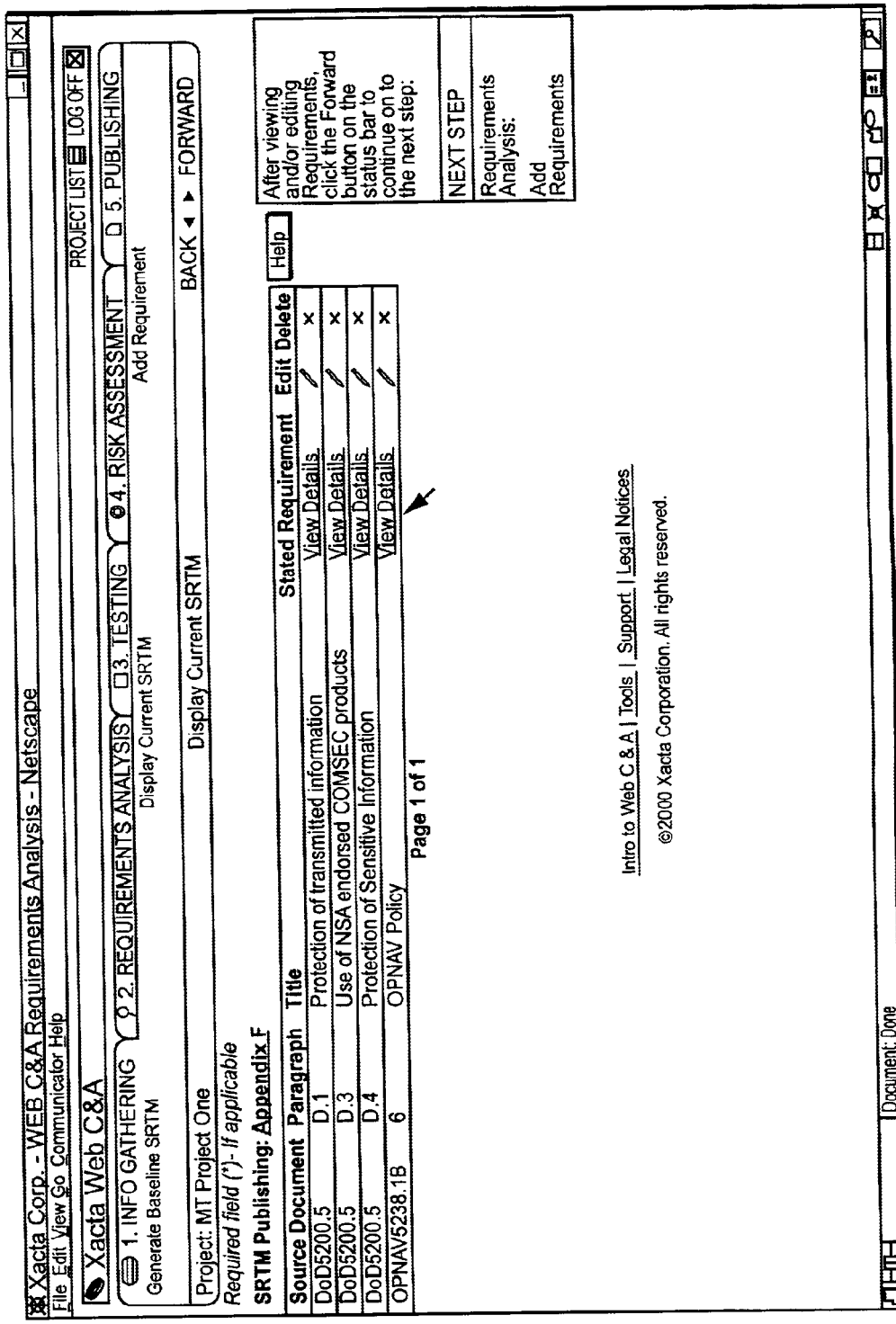
FIG. 13 is an exemplary screen shot showing a display of a SRTM.

After selections have been made, either by the user by, for example, clicking the appropriate boxes associated with documents (e.g., 1204, 1208, 1220 and 1224), and/or by the system, the application will provide a Display SRTM screen as shown in FIG. 13. Additionally, FIG. 13 may display any optional user-defined requirements as determined at FIG. 12, 1226. FIG. 13 particularly shows pertinent portions of DoD 5200.5, selected in FIG. 12 (1208), that are applicable to the C&A at hand.

Testing

Figure 14:
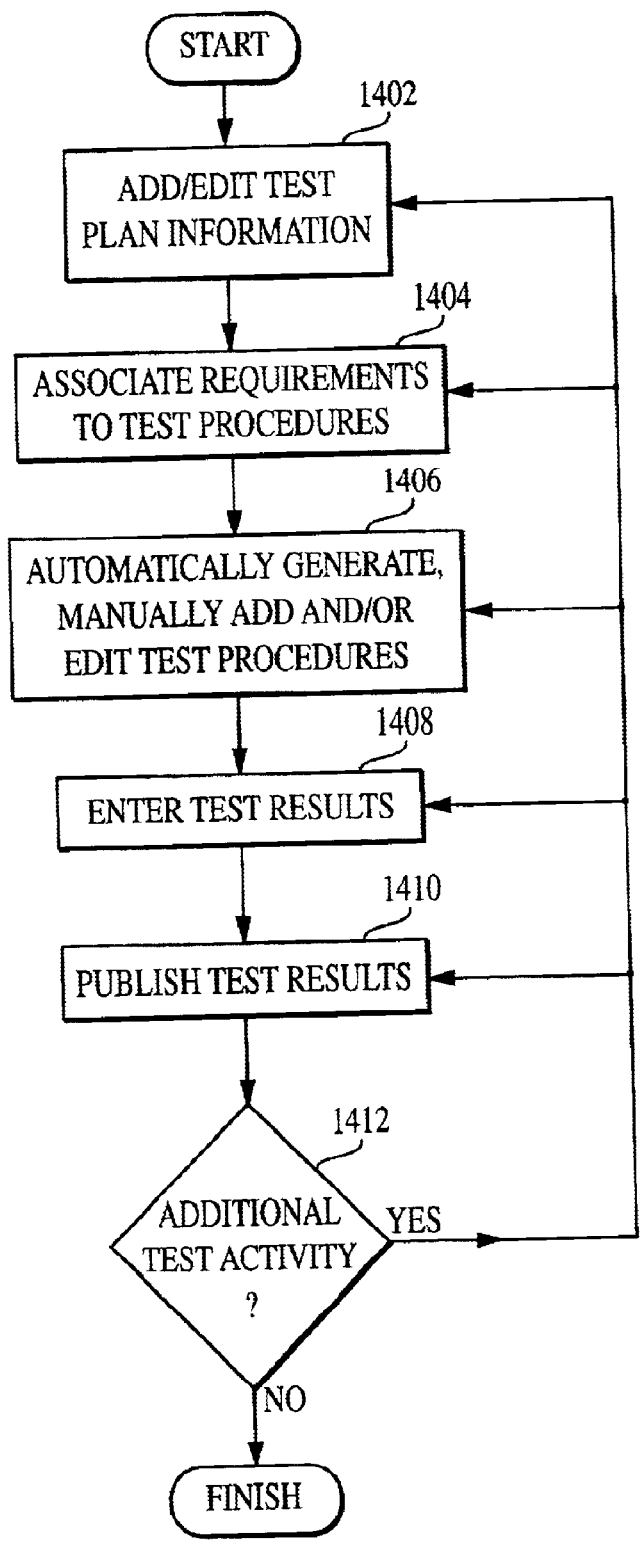
FIG. 14 is an exemplary flow chart illustrating the testing process as contemplated by at least some embodiments of the present invention.

With the security requirements traceability matrix in place (a portion of which is illustratively shown in FIG. 13), the user proceeds to the testing step 104. In at least some embodiments of the present invention, user interfaces will be provided, in accordance with the steps shown in FIG. 14, for the user to have the system 600 generate one or more test procedures, and/or add and/or edit test plan information 1402, associate all the requirements to test procedures 1404, add and/or edit test procedures 1406, enter test results 1408, and/or publish test results 1410. Any of the above steps can optionally be repeated as needed, as indicated in decision step 1412. Each of these steps will be discussed in further detail herein.

Figure 15:
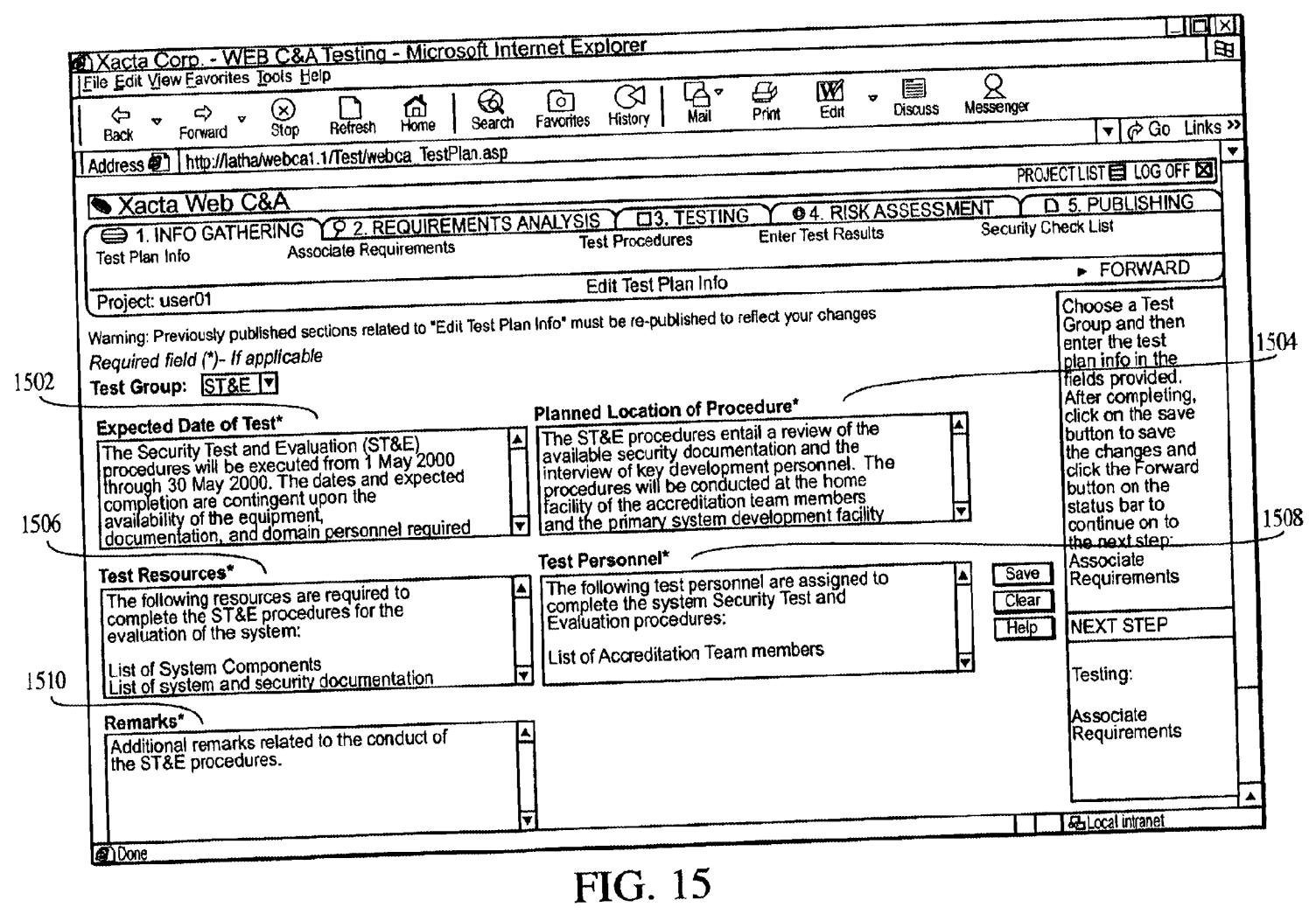

An Edit Test Plan Information screen, corresponding to step 1402, is shown in FIG. 15. The exemplary input fields on the screen are Expected Date of Test 1502, Planned Location of Procedure 1504, Test Resources 1506, Test Personnel 1508, and Remarks 1510.

Figure 16:
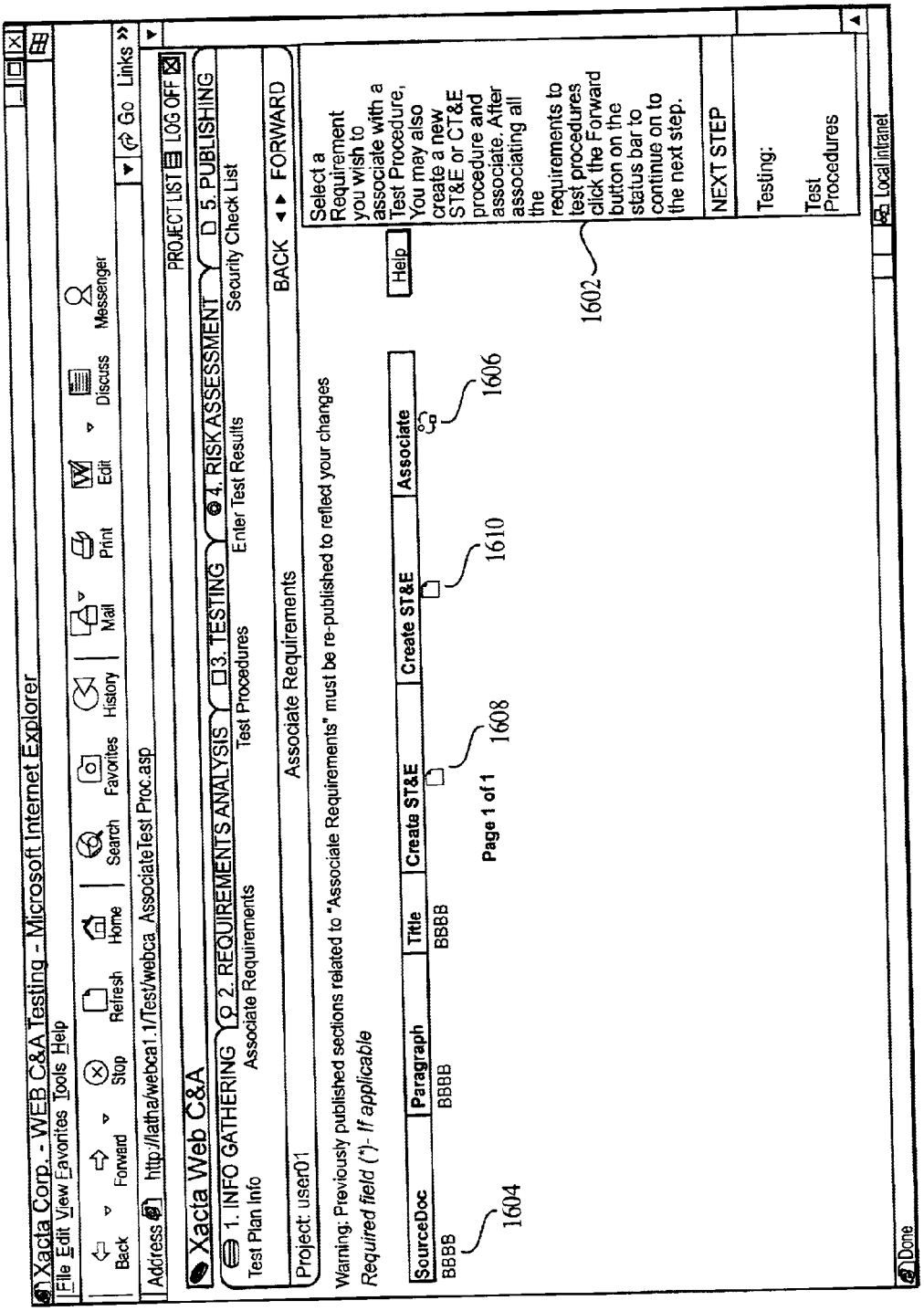
FIG. 16 is an exemplary screen shot illustrating how a user can select an existing test procedure and/or create a new test procedure and associate the test procedure(s) with one or more requirements.

FIG. 16 is an Associate Requirements screen, corresponding to step 1404, which illustrates how a user can manually select a test procedure to associate it with at least one requirement selected. As indicated in the descriptive text block 1602, a user can select a source requirements document 1604. Upon clicking on the associate icon 1606, a list of test procedures (not shown) can be displayed. The user can then select one or more of the test procedures within the test procedure database (as discussed above) and associate it/them with the selected source document 1604. A user can also create a new security test and evaluation procedure (ST&E) 1608 or certification test and evaluation (CT&E) procedure 1610, by clicking on the respective icon. After the user enters the respective CT&E and/or ST&E information into a form presented on a new menu (not shown), the user can save the procedure(s) and optionally associate the procedure(s) via the Associate icon, as described above. As discussed in application Ser. No. 09/794,386, the process described in FIG. 16 can also be automated.

Test Procedure Generation

Figure 17:
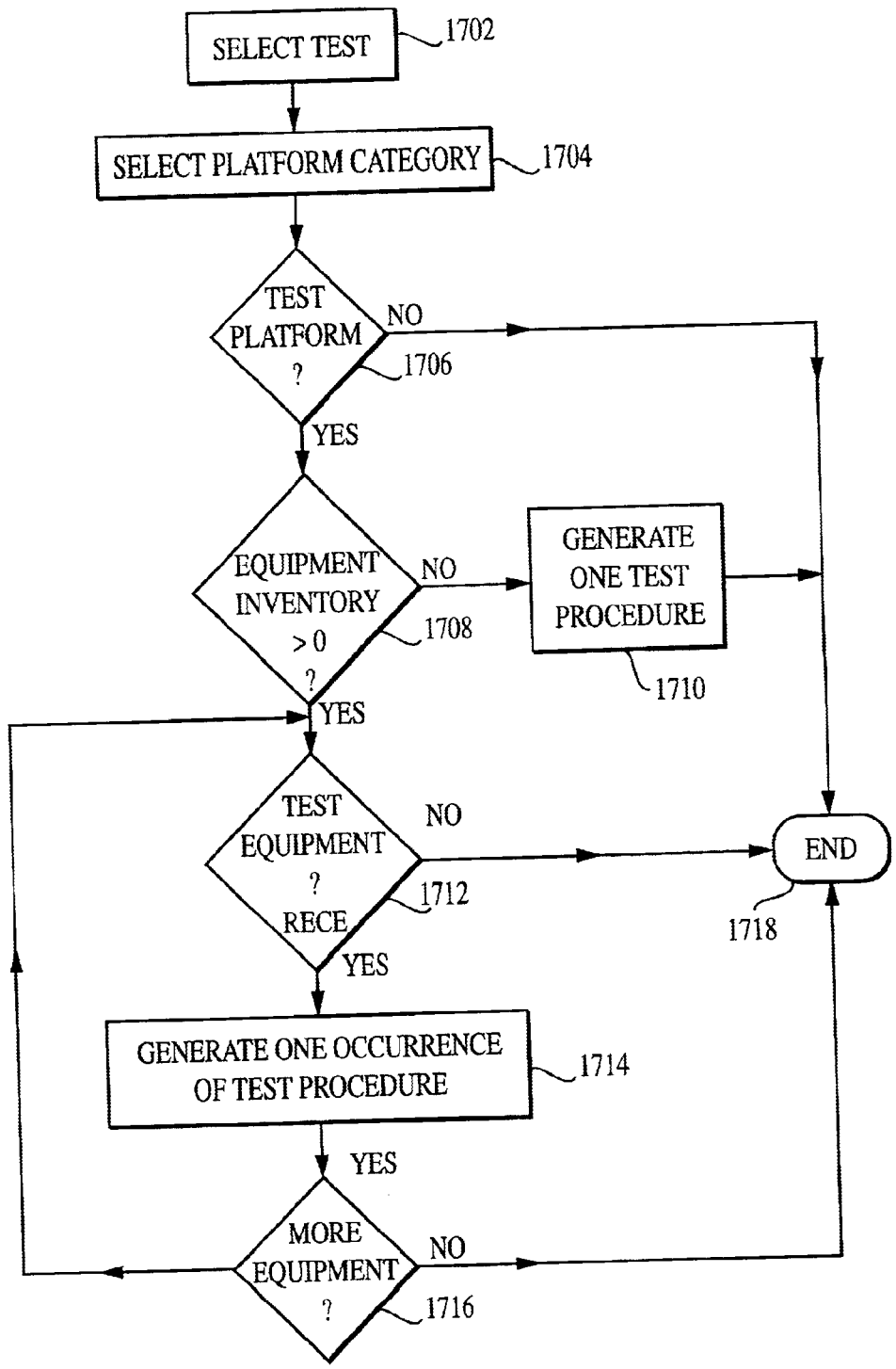
FIG. 17 is an exemplary flow diagram of a method for generating equipment tests contemplated by at least some embodiments of the present invention.

The certification and accreditation (C&A) engine 604 can generate test procedures, corresponding to step 1406, in accordance with the method shown in FIG. 17. In an exemplary embodiment of the system 600, the C&A engine 604 receives network configuration information from the network discovery engine 606 and compare the network configuration information with approved hardware and/or software standards, which can advantageously provide a substantially continuous and dynamic risk management process.

The system 600 can select one or more tests associated with each standard, regulation, etc. selected as discussed with regard to FIG. 12. For each selected test 1702 and for each platform category 1704, the C&A engine 604 can determine whether there is a test strategy associated therewith 1706. For each given platform category 902*a–n*, test strategies can include, for example, test one network device 614*a–n* associated with the platform category, test some network devices 614*a–n* associated with that category, or test all network devices 614*a–n* associated with the platform category.

If there is not a test strategy associated with the platform category 902*a–n* currently under consideration, the process terminates 1718 without generating an instance of the test 1702 currently under consideration. If there is a test strategy associated with the platform category 902*a–n* currently under consideration, then a determination is made 1708 as to whether there are any network devices 614*a–n* associated with the platform category 902*a–n* selected at block 1704. If there are no network devices 614*a–n* associated with the platform category selected at block 1704, then one test procedure can be generated 1710 for the test category. The test procedure generated can be a generic test procedure that would cover all or substantially all of any network devices 614*a–n* that may be added to the platform category in the future. If there is at least one network device 614*a–n* associated with the platform category selected at block 1704, a determination is made as to whether the network device is to be tested 1712. If no, the process ends 1718; if yes, a test procedure is generated for that equipment piece 1714. The test procedure that will be generated can depend upon the hardware configuration, operating system, and application programs for the particular network device 614*a–n*, as determined by business rules and/or decision logic within the certification and accreditation engine 604. Finally, a determination is made as to whether there is additional equipment 1716. If no, the process ends 1718; if yes, the process returns to decision step 1712.

Figure 18:
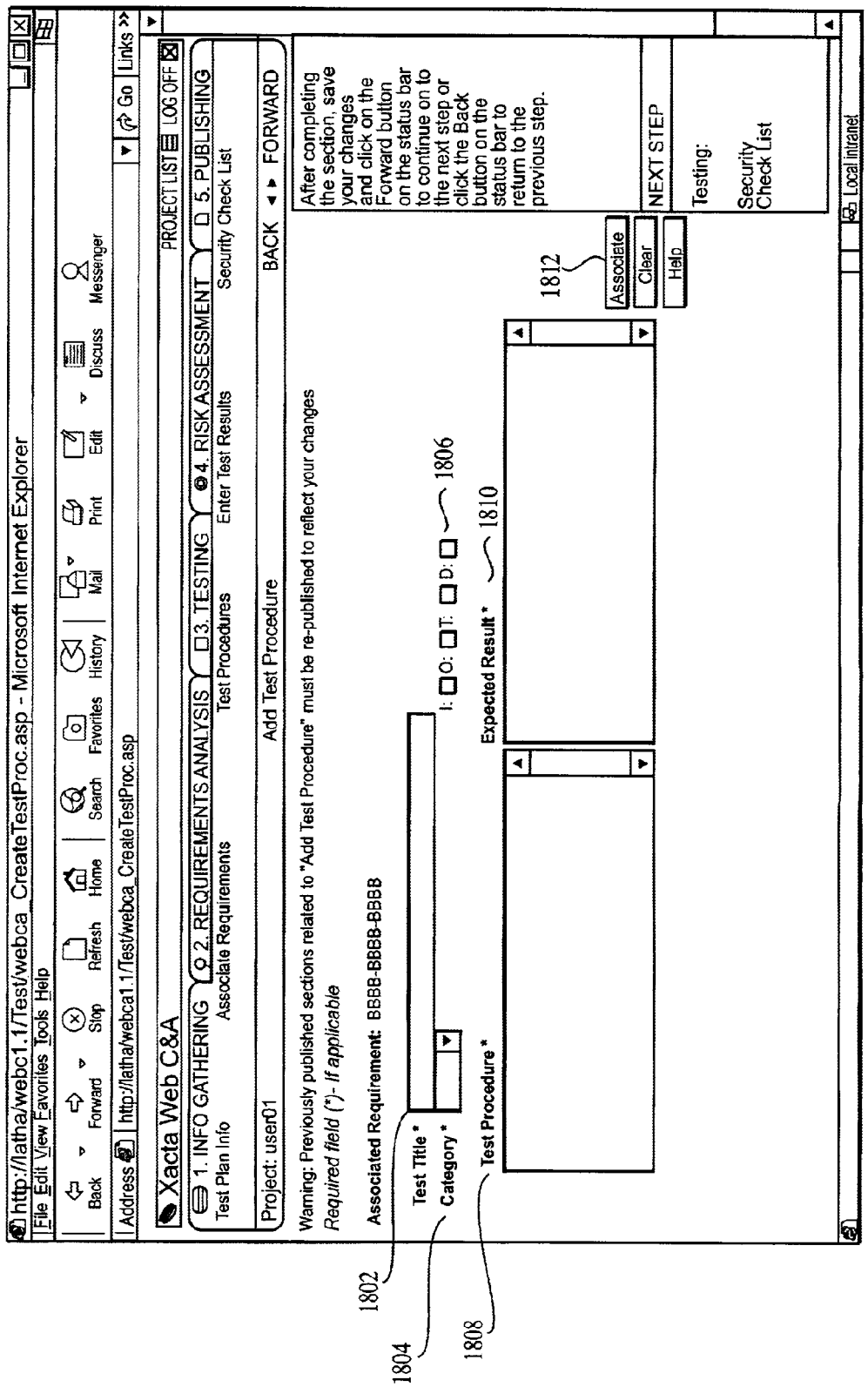
FIG. 18 is an exemplary screen shot showing how a user can add a test procedure.

FIG. 18 is a screen illustrating how a user can enter a new test procedure. As shown, the input fields on the screen are Test Title 1802, Category 1804, I, O, T, D (where I represents interview, O represents observation, T represents text, and D represents documentation review) 1806, Test Procedure 1808, and Expected Result 1810. If Associate 1812 is selected, then a new row is preferably created in the test procedure data base with the data entered in the input fields provided.

Figure 19:
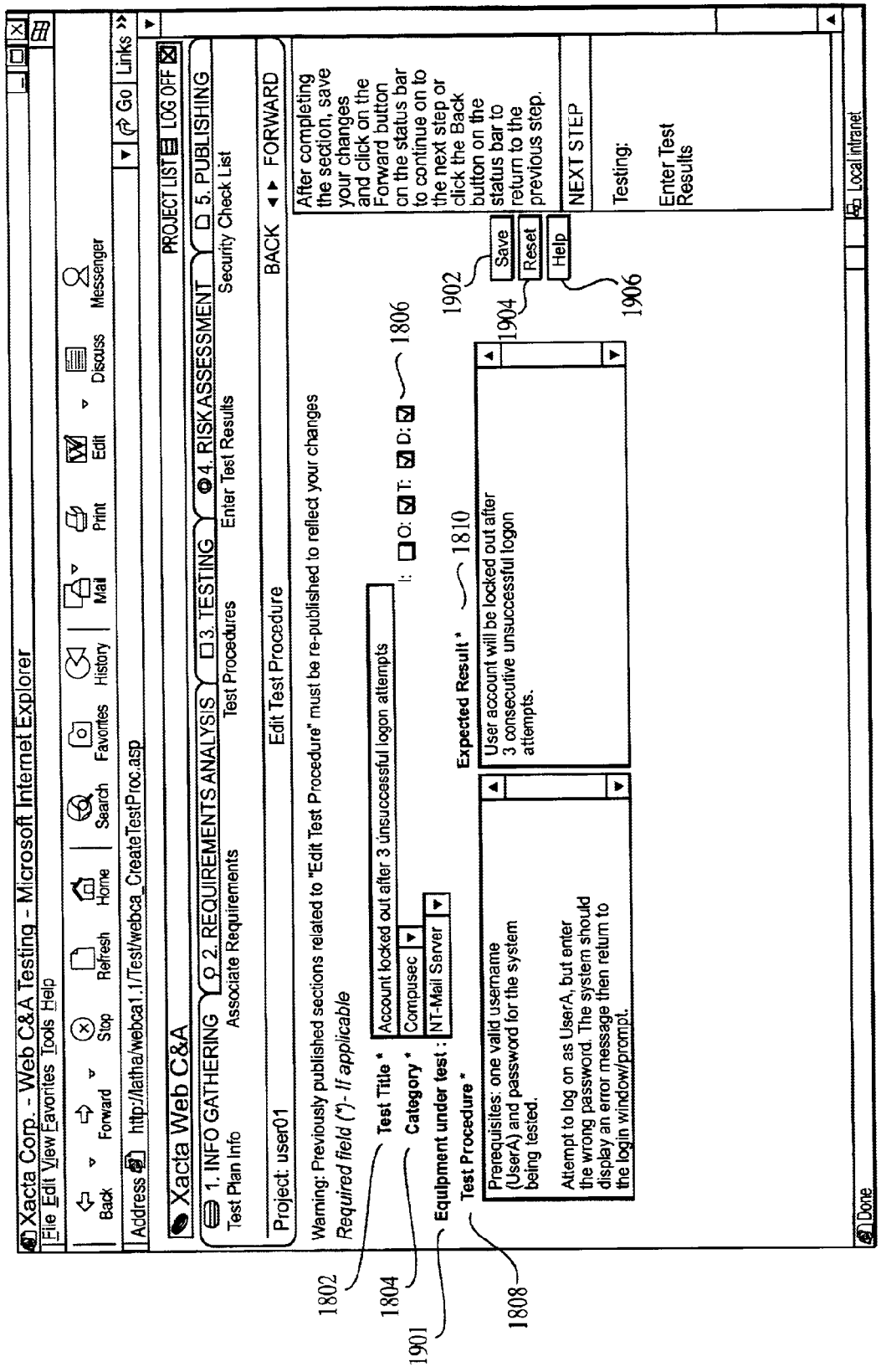
FIG. 19 is an exemplary screen shot showing how a user can edit a test procedure.

As previously discussed, the certification and accreditation engine 604 contains decision logic whereby test procedures can be intelligently selected for the C&A at hand by using the system information specified in step 100 and the requirements analysis step 102. As discussed above in the context of the SRTM, one or more test procedures within the test procedure database can be mapped to, linked with, and/or otherwise associated with each of the individual requirements within each respective requirements document (FIG. 12). As shown in FIG. 19, one or more of the test procedures intelligently selected by the present invention for the C&A at hand can be edited. In a preferred embodiment, the user will be able to edit any of fields 1802, 1804, 1806, 1808 and/or 1810. As disclosed in application Ser. No. 09/794,386, the user can also edit the test procedure once it has been entered.

Figure 20A:
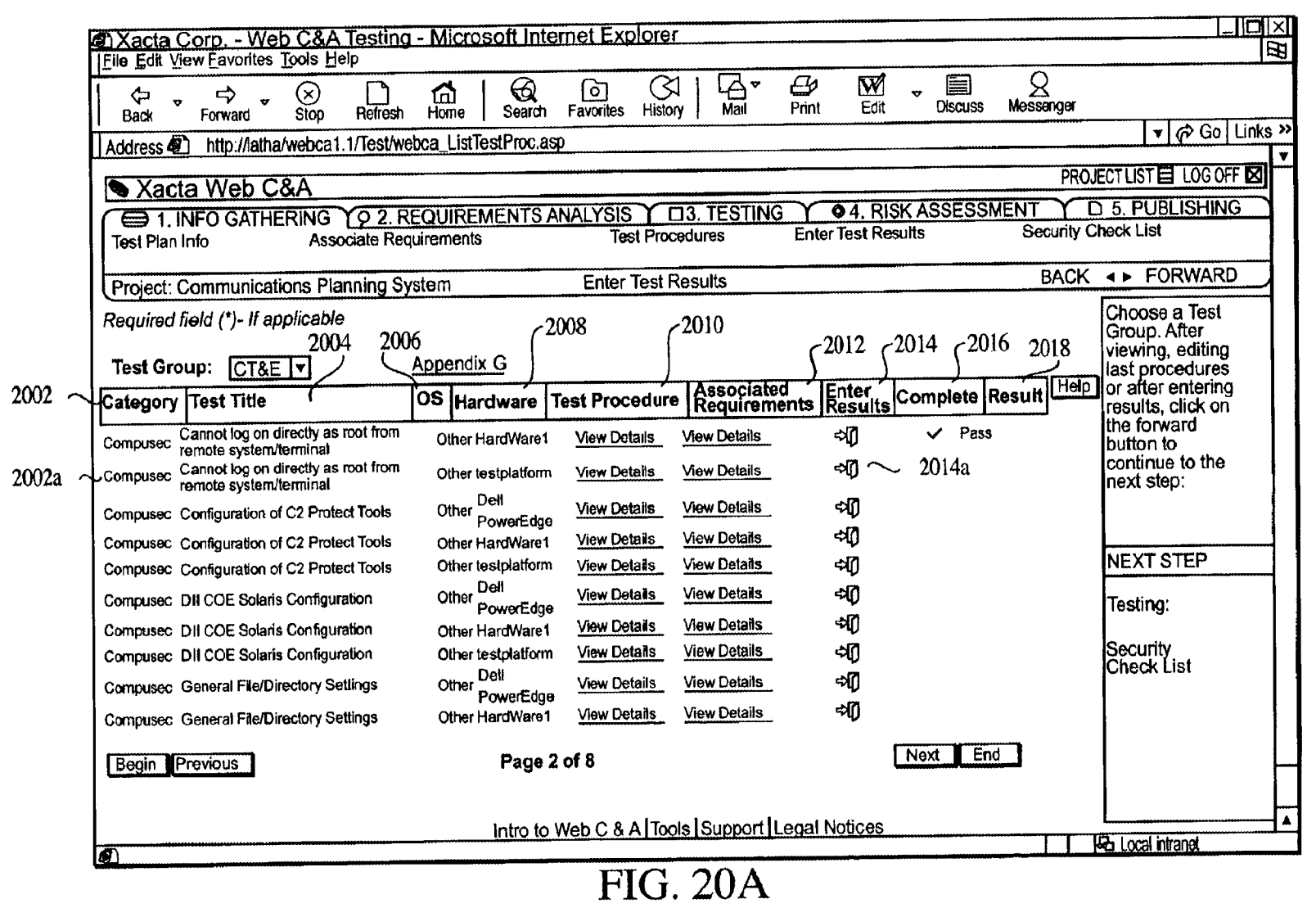

FIG. 20A is a screen that enable a user to enter test results. As shown, at least some embodiment of the present invention contain the following exemplary columns: Category 2002, Test Title 2004, Operating System (OS) 2006, Hardware 2008, Test Procedure 2010 (which enables a user to view the details of the test procedure), Associate Requirements 2012 (which allows the user to view which requirements a particular test procedure is associated with), Enter Results 2014, Complete 2016 (which provides an indication of whether the test procedure has been completed), and Result 2018 (which provides an indication of whether the test procedure has passed or failed). (It should be appreciated, however, that various embodiments of the present invention contemplate that the present invention automatically initiates the test, and obtains the results, without the need for any additional manual entry steps).

Figure 20B:
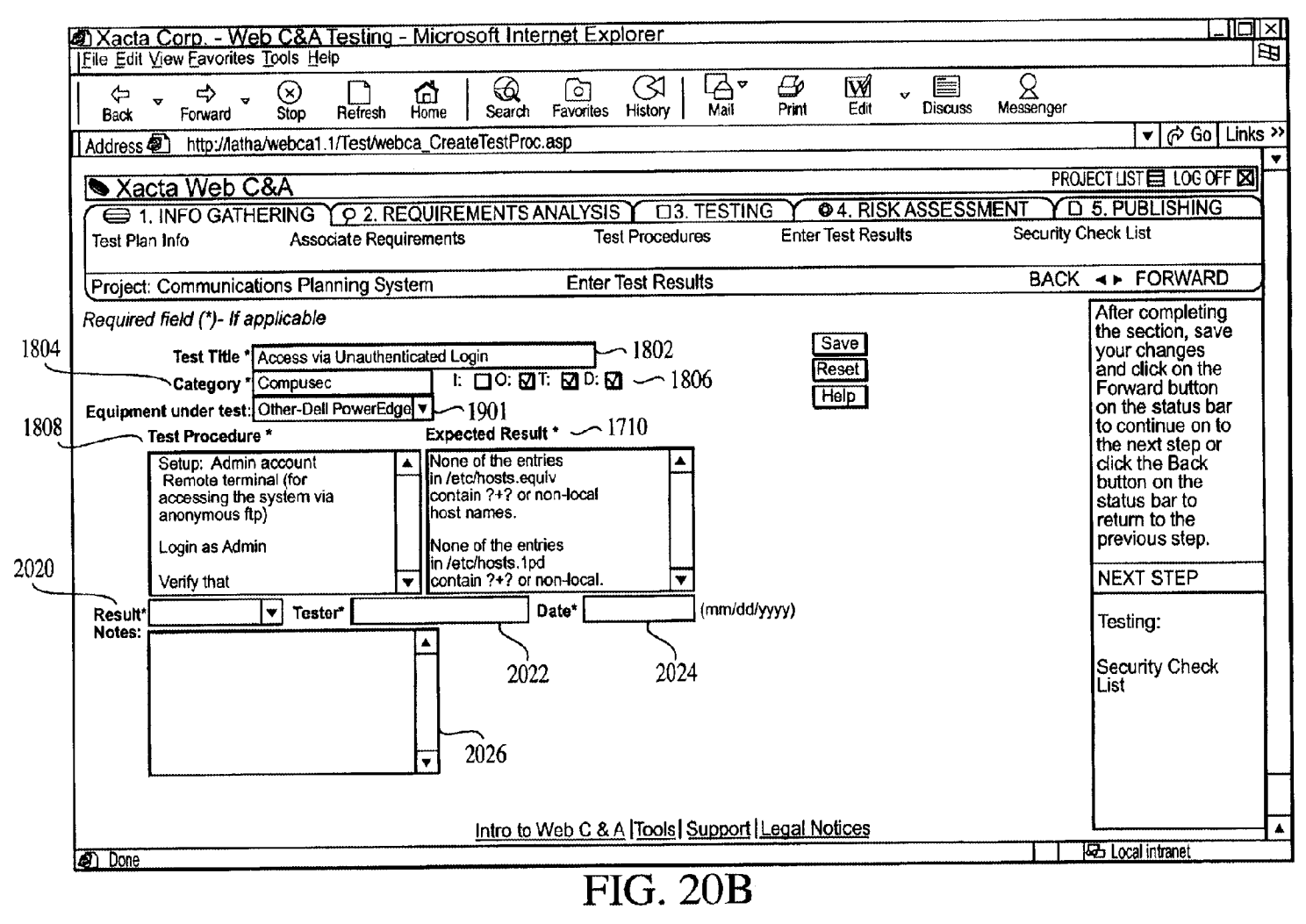

FIG. 20B is an exemplary screen that appears when the Enter Results 2014 icon is pressed that is associated with a particular test procedure. For example, in FIG. 20A, if icon 2014*a* is pressed, the a screen appearing similar in format to FIG. 20B will appear with the Test Title 1802 corresponding to the test contained in row 2002*a* of FIG. 20A (e.g., Cannot Log On Directly as Root from Remote System/Terminal). As shown, the Test Title 1802, Category 1804, Equipment Under Test 1901, I, O, T, D 1806, Test Procedure 1808 and/or Expected Result 1810 and fields also preferably appear within this screen. Also, Result field 2020 appears, which allows the user to enter the test result (e.g., pass or fail). Tester field 2022 enables the tester to provide his name, and Date 2024 that the test was conducted. Finally, the tester is able to enter any Notes pertaining to the test 2026.

Risk Assessment

Once the testing step 104 has been completed and the results recorded, the risk assessment step 106 commences, as indicated by sub-headings a–d below.

a) Generate Project Threat Profile (Step 2102)

Figure 21:
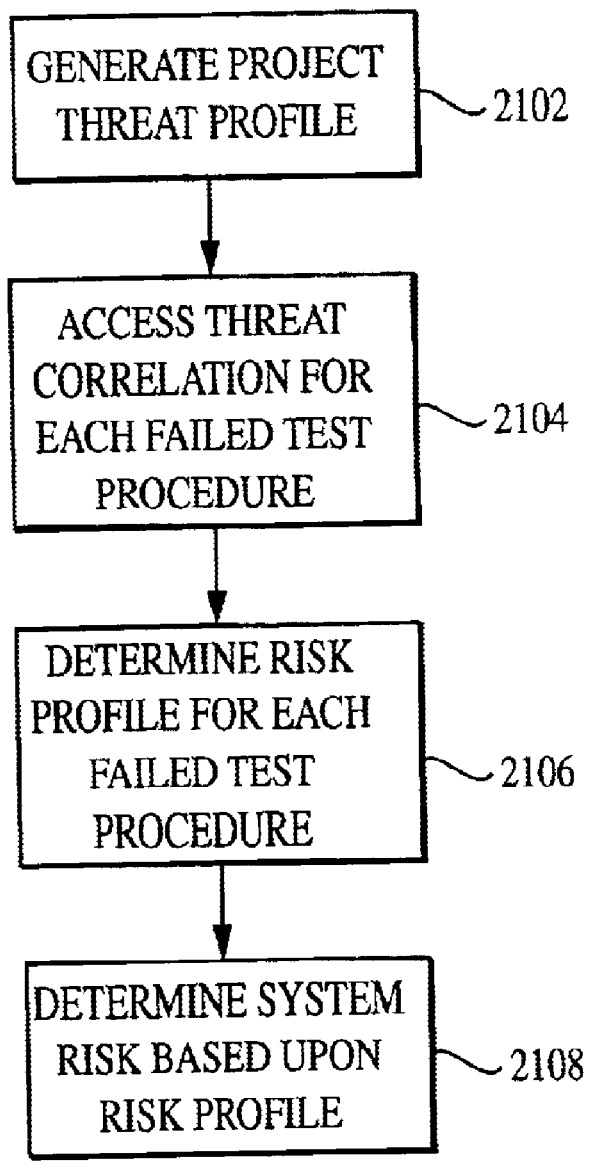
FIG. 21 is an exemplary high level flow diagram of the risk assessment method according to at least some embodiments contemplated by the present invention.

As shown in FIG. 21, at step 2102, at least some embodiments of the present invention generate a project threat profile, which is a score for each of the generic threat elements (e.g., fire, flood, hardware, power, software design error, etc.) as will be discussed in further detail herein. In at least some embodiments, the user performing the C&A is presented with a series of questions pertaining to the environment for which the C&A will be performed. (This information could also be obtained in an automated fashion using any number of known techniques). The present invention will then estimate the threat level based on the operators' answer. The value assigned to each of the generic threat elements is applicable to each test procedure associated with the particular system undergoing C&A. A user can optionally change any of the system determined threat element scores for one or more of the generic threat elements. Exemplary values for generic threat elements are as follows:

| Threat Element Score | Interpretation |
| --- | --- |
| N | Threat element is not applicable to this project or has negligible likelihood of occurrence |
| L | Threat element has low likelihood of occurrence for this project |
| M | Threat element has medium likelihood of occurrence for this project |

-continued

| Threat Element Score | Interpretation |
|---|---|
| H | Threat element has high likelihood of occurrence for this project |

For example, generic threat elements 1–29, as defined in FIG. 22, may have a project threat profile as follows:

MHNLLLLMMMMMLLLMMMMLLLLLLLLNN corresponding, respectively, to elements 1–29. For this project threat profile, the threat of a flood is thus considered high.

Figure 23:
FIG. 23 is an exemplary screen shot showing a portion of the illustrative threat categories of FIG. 22.

FIG. 23 shows an exemplary Threat Environment screen, which shows the calculated level of risk based on the information that was provided in step 100. As per at least some embodiments, the present invention automatically calculates the risk, which is indicated under the Calculated Value 2302 heading. This could be accomplished in any number of ways based upon data obtained during the current and/or testing phase, as indicated above. The User Defined Value 2304 preferably defaults to the corresponding Calculated Value 2302 for a given threat environment element (e.g., 1, 2, 3, etc.). However the user/analyst has the opportunity to optionally override the calculated risk rating by clicking on the User Defined Value 2304 for each corresponding threat element. As previously discussed, exemplary available choices are negligible, low, medium, or high, although they could also be, e.g., numerical in nature.

b) Threat Correlation String (Step 2104)

In step 2104, a threat correlation for each failed test procedure is accessed. Specifically, each test procedure used in the C&A for the system being evaluated is, in at least some embodiments of the present invention, coded with a threat correlation string, with each character in the string representing one of the generic threat elements in the same order as they exist in the project threat profile as shown, for example, in FIG. 22. The test procedure database preferably contains these codes. Each character in the threat correlation string contains a score that indicates the relative potential of a given threat to exploit a vulnerability caused by failure of this particular test. An exemplary scoring system is as follows:

| Threat Correlation Score | Interpretation |
|---|---|
| N | Threat element is not applicable to this vulnerability (or has negligible potential to exploit it) |
| L | Threat element has low potential for exploit of this vulnerability |
| M | Threat element has medium exploit potential for this vulnerability |
| H | Threat element has high exploit potential for this vulnerability |

Thus, for example, failure of a particular test may mean that the system being tested is highly vulnerable to Floods. To indicate this, the character in the threat correlation string corresponding to Floods would contain a score of "H."

c) Determine Risk Profile for Each Failed Test Procedure (Step 2106)

As indicated at step 2106, the risk profile for each test procedure is determined. Specifically, for each test failure, the threat correlation string contained within each test procedure, as determined at step 2104, is applied against the project threat profile as determined at step 2102.

For example, the project threat profile above, given as:

MHNLLLLMMMMMLLLMMMMLLLLLLLLNN may have a test procedure with the following threat correlation sting:

HHNMHLMNHHHMLNNNHLMLHNNLHHLMH

In this case, in accordance with an exemplary process according to at least some embodiments of the present invention, the combined risk profile string as determined in accordance with FIG. 24 would be:

MHNLMLLNMMMMLLLNMLMLMLLMMLNN

For a given row of FIG. 24, and given the first two values contained in the first two columns corresponding to that row, we have discovered and determined that the values contained in the third column of the row can be used a measure or risk.

The highest risk level in the combined string for a given test procedure is preferably used as the risk level for the failure of that test procedure. Thus, for the combined string above, the risk level for a failure of the test procedure is high, since there is an H in the second position. Similarly, if M were the highest risk level that appears in a combined string, then the risk level for a failure of that test procedure would be medium, etc.

d) Determine Overall System Level Risk (Step 2108)

Figure 25:
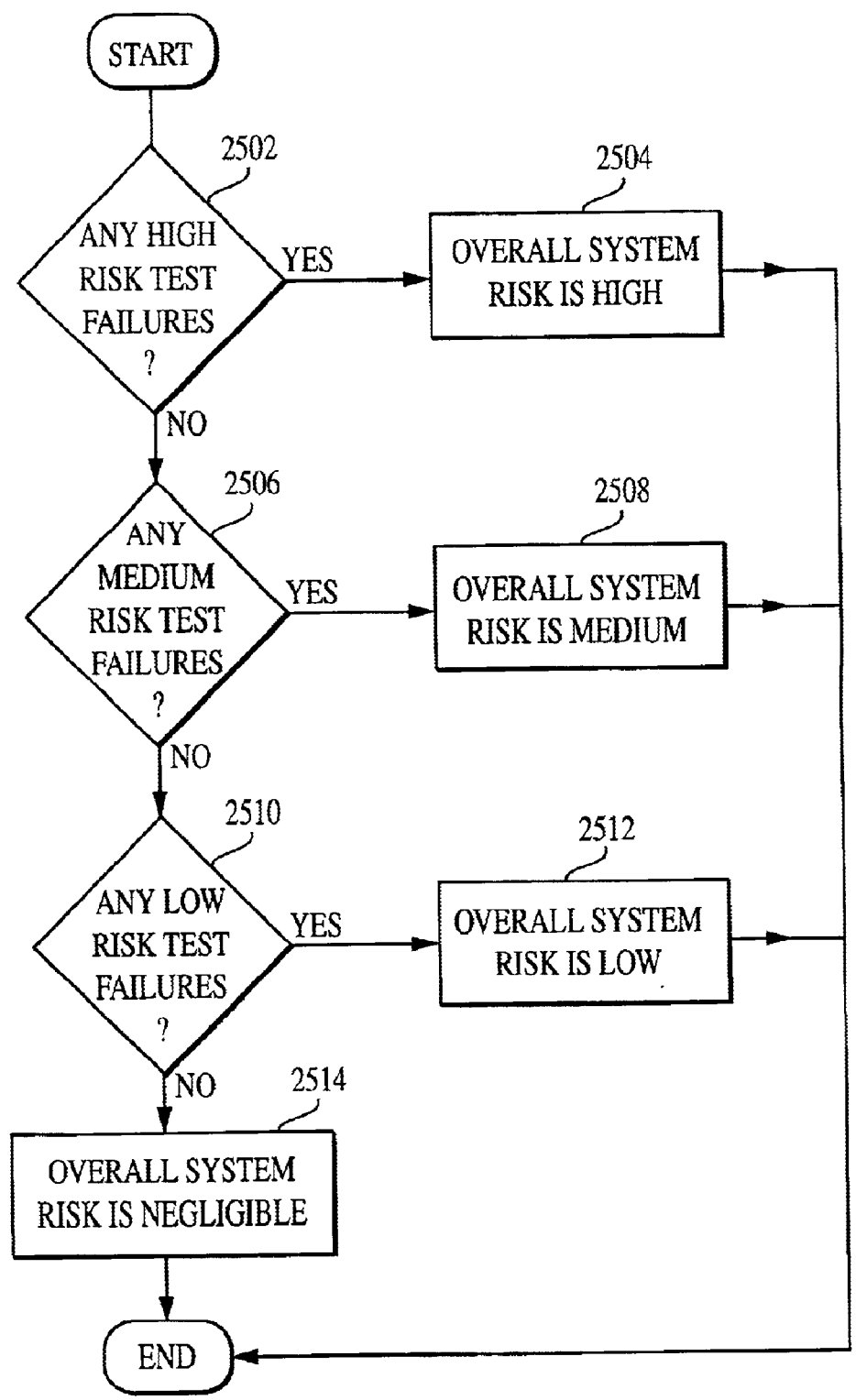
FIG. 25 is an exemplary flow diagram of a method of assessing overall system risk in accordance with at least some embodiments contemplated by the present invention.

In addition to the individual risk level scores for each test failure as determined in step 2106, an overall risk level for the project is also determined as indicated by step 2108. As shown in FIG. 25, in at least some embodiments, of the present invention, the overall system risk level is defined as the highest of the individual risk elements. Thus, if it is determined that any element in the risk profile associated with the failure of any given test procedure is "high" (as indicated by decision block 2502), then the overall risk for the system is high as indicated by a block 2504. If the risk profile associated with the failure of any given test procedure is "medium" (as indicated by decision block 2506), then the overall risk for the system is medium as indicated by a block 2508 when no high risk test failures are present. If the risk profile associated with the failure of any given test procedure is "low " (as indicated by decision block 2510), then the overall risk for the system is low when no high risk or medium risk failures are present, as indicated by a block 2512. If the risk profile associated with the failure of any given test procedure is "negligible" then the overall risk for the system is negligible, as indicated by a block 2514, when no high risk, medium risk, or low risk failures are present. The user also can have the ability to override the overall system risk level as determined in accordance with the above methodology. In such a case, the user will also be able to optionally provide explanatory text to accompany the overall user-defined system risk level.

Publishing

In the publishing step 108, the present invention collates the results of the certification process and optionally generates the documents needed for accreditation. The present invention takes the information gathered during the steps corresponding to blocks 100, 102, 104 and 106, and reformats the information by, for example, organizing it into to appropriate documents, document subsections or subparagraphs, sections and/or appendices, etc.

Figure 26:
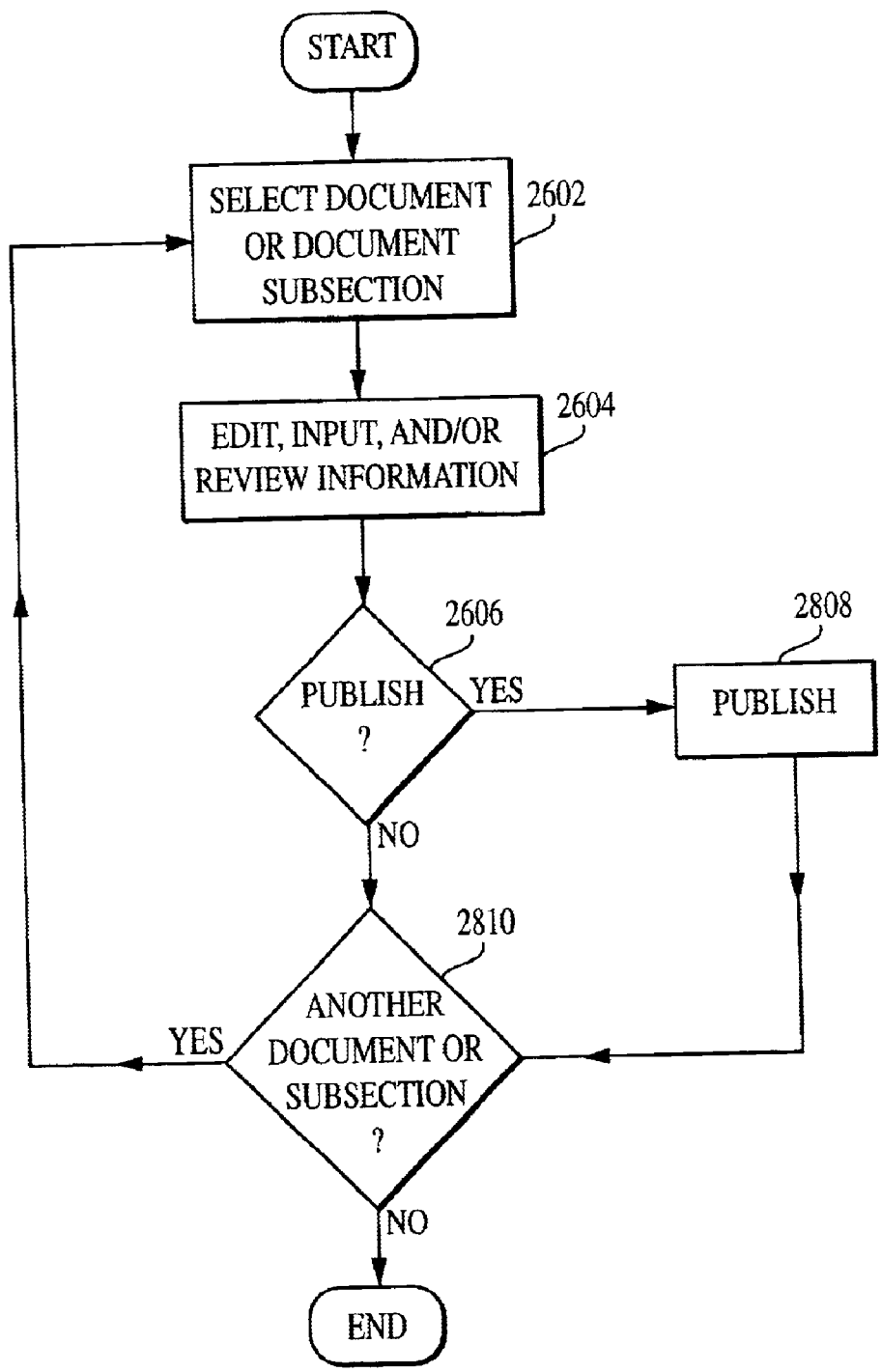
FIG. 26 is an exemplary flow diagram of the publishing process in accordance with at least some embodiments contemplated by the present invention.
Figure 27:
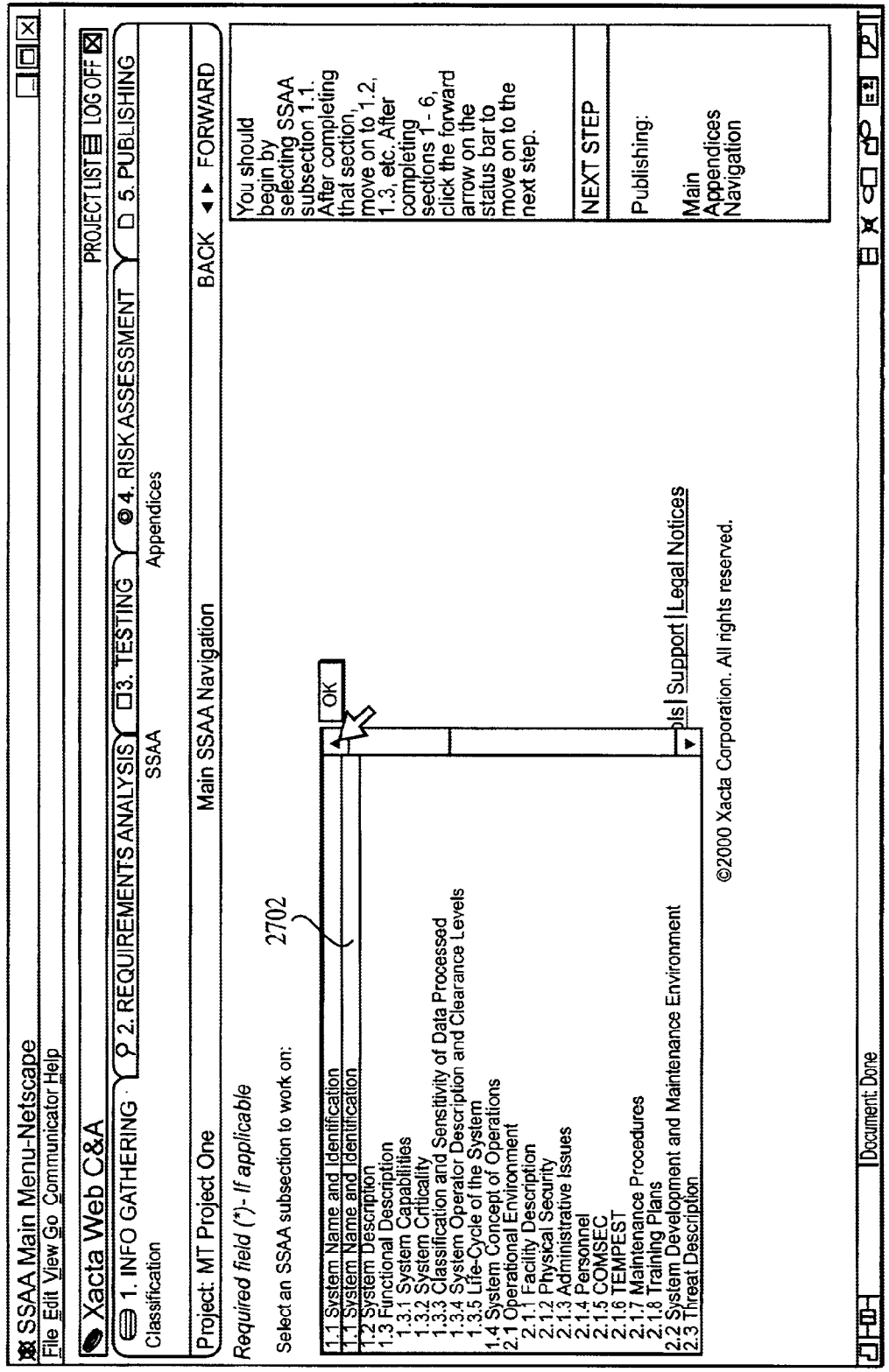
FIG. 27 is an exemplary screen shot showing how a user can select a portion of a document for publishing.
Figure 28:
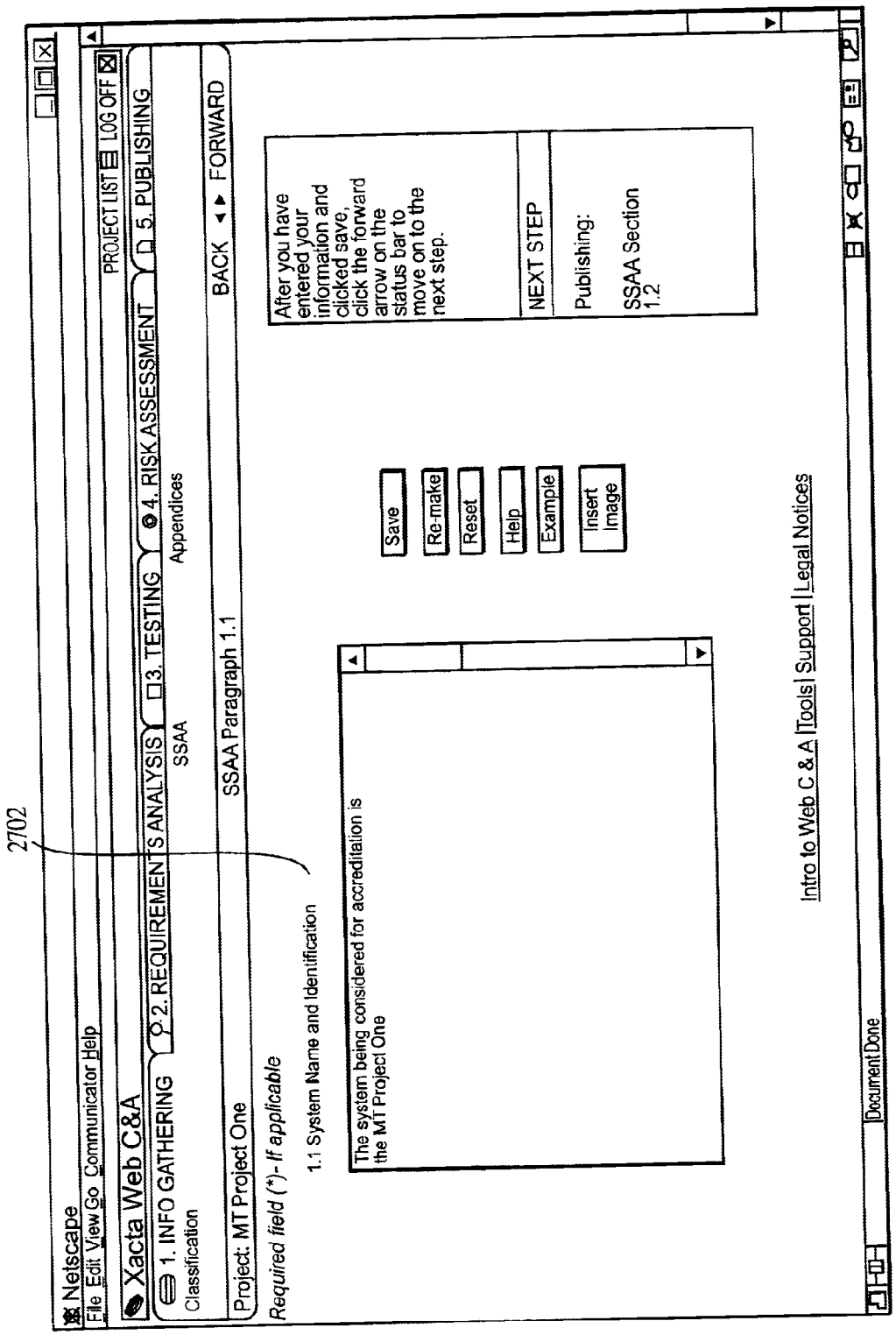
FIG. 28 is an exemplary screen shot that enables a user to edit and/or view a portion of a document prior to publishing.
Figure 29:
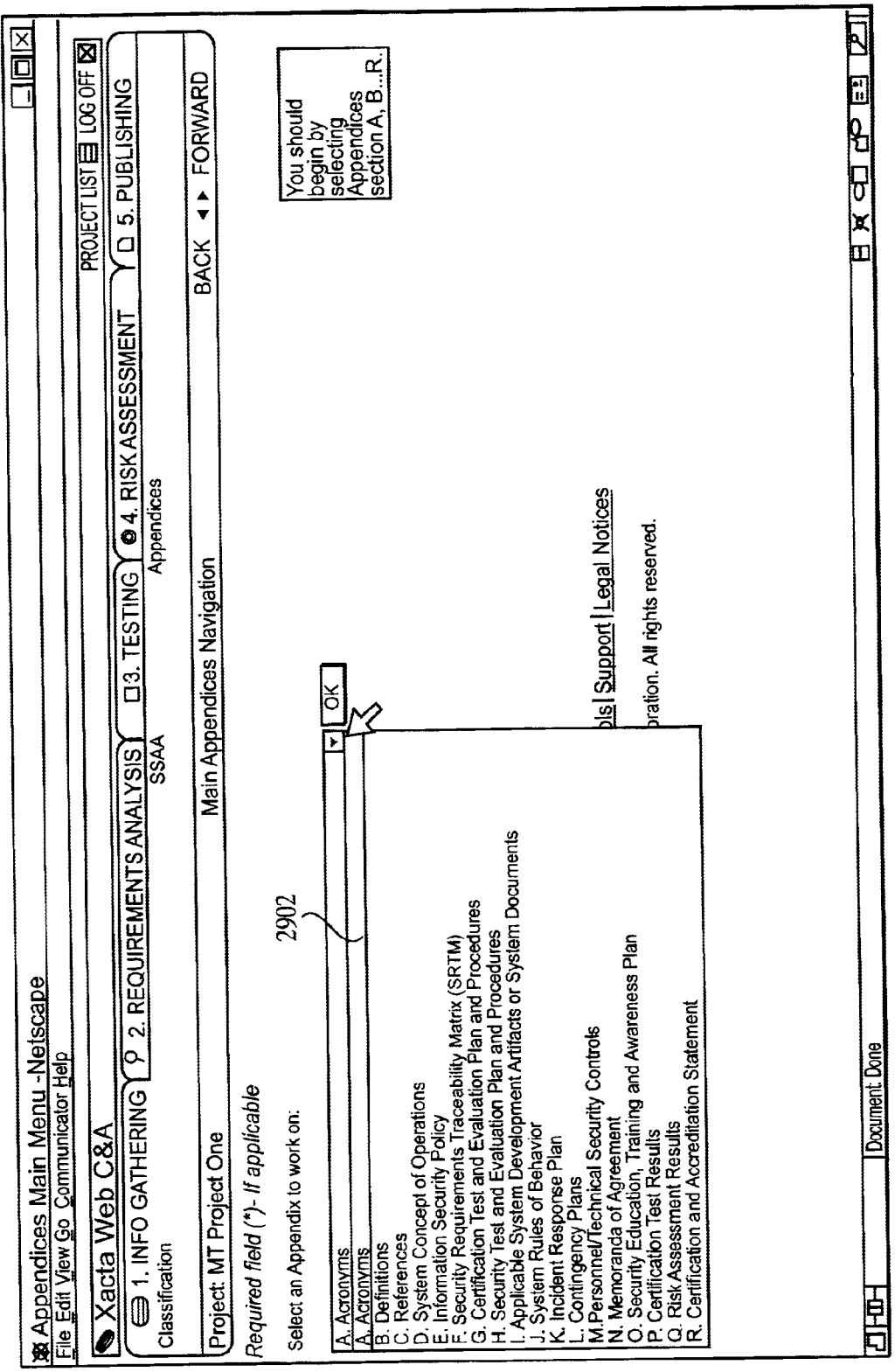
FIG. 29 is an exemplary screen shot showing how a user can select a portion of a document for publishing.
Figure 30:
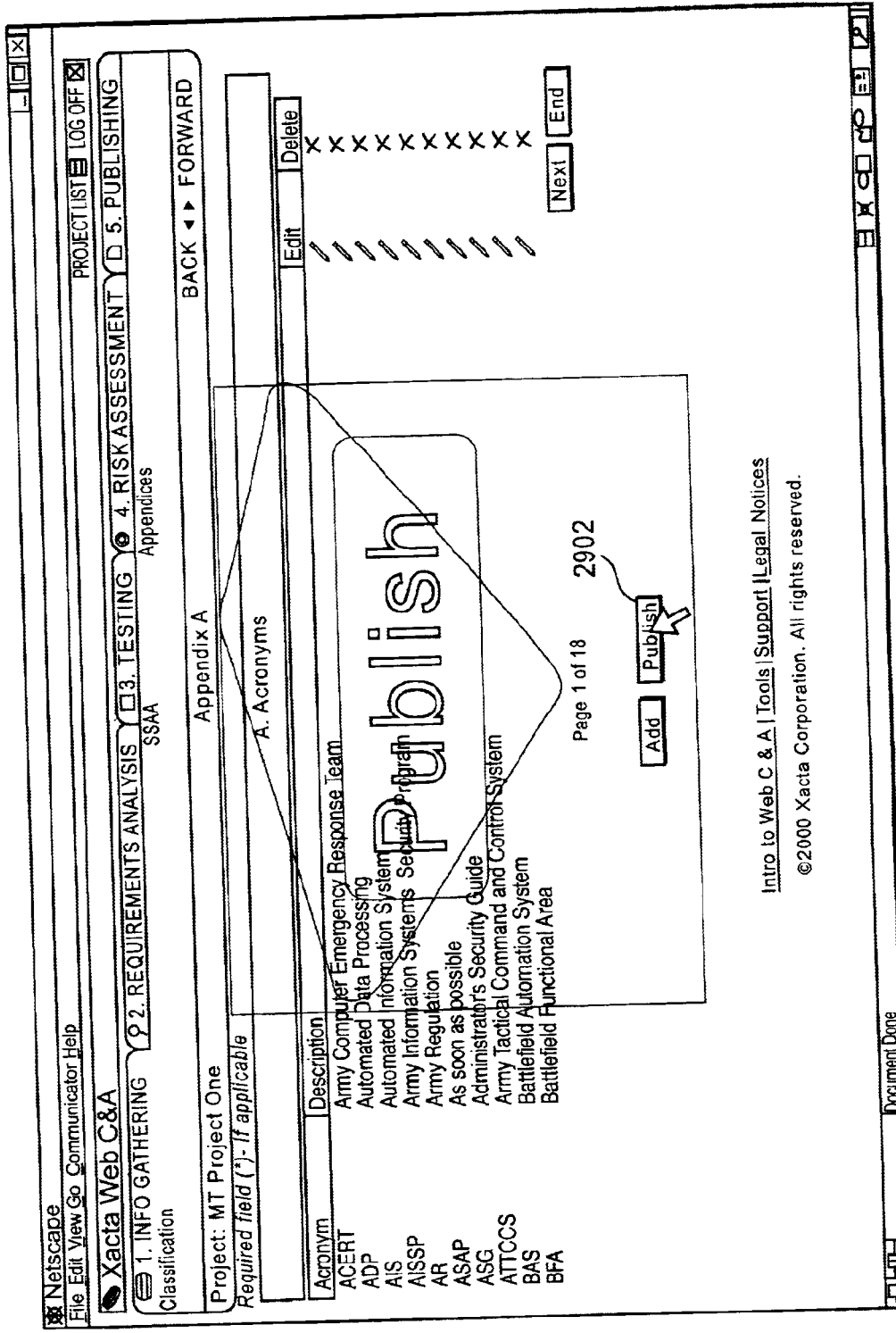
FIG. 30 is an exemplary screen shot illustrating how a user can publish a portion of a document.

As shown in FIG. 26, the invention allows a user to select a document or subsection thereof for publishing 2602, and to optionally input and/or review the information thereof 2604. As shown in FIG. 27, to view the document subsection thereof, the user simply clicks on the section name 2702. As shown in FIG. 28, the user can then edit the selection subsection 2702. The user can optionally edit, input information, or review the existing text 2604 or add to it, or even upload graphics if desired to further customize the final document. If the user chooses to publish the document or subsection under consideration 2606, the publishing function 2808, as shown in FIG. 29, can also, as previously discussed, generate any Appendices desired by the user and/or required by, for example, the DITSCAP (DoD Instruction 5200.40). At decision step 2810, the process can either be repeated for another document or subsection, or terminated. FIG. 30 shows an exemplary screen shot that enables a user to publish 2902 the acronym list 2902 selected in FIG. 29. The present invention also contemplates that accreditation can be automated, so that no accreditation agency is needed. In this embodiment, when sufficient test related results and/or information is provided to the computer 3102, the method according to the present invention can automatically determine that accreditation requirements have been satisfied.

Computer Implementation

Figure 31:
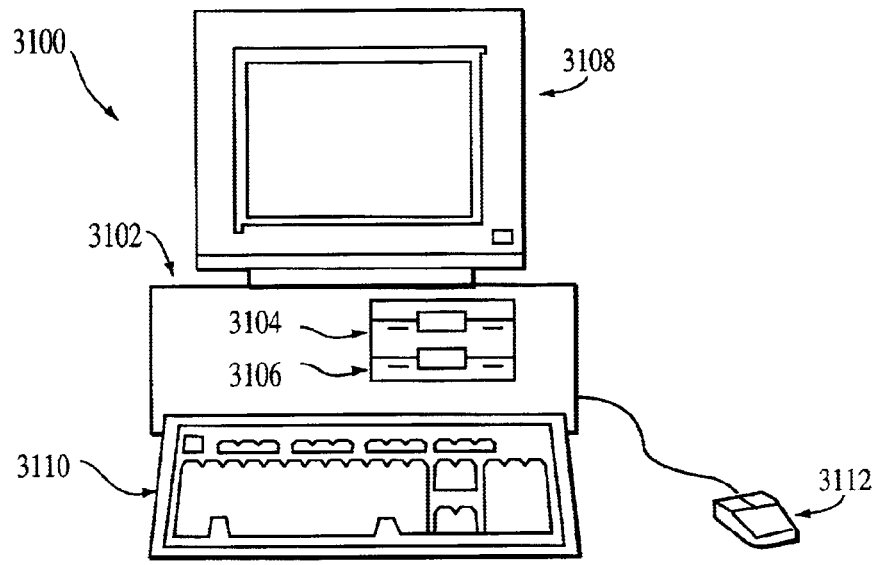
FIG. 31 illustrates one example of a central processing unit for implementing a computer process in accordance with a computer implemented stand-alone embodiment of the present invention.

The techniques of the present invention may be implemented on a computing unit such as that depicted in FIG. 31. In this regard, FIG. 31 is an illustration of a computer system which is also capable of implementing some or all of the computer processing in accordance with computer implemented embodiments of the present invention. The procedures described herein are presented in terms of program procedures executed on, for example, a computer or network of computers.

Viewed externally in FIG. 31, a computer system designated by reference numeral 3100 has a computer portion 3102 having disk drives 3104 and 3106. Disk drive indications 3104 and 3106 are merely symbolic of a number of disk drives which might be accommodated by the computer system. Typically, these could include a floppy disk drive 3104, a hard disk drive (not shown externally) and a CD ROM indicated by slot 3106. The number and type of drives vary, typically with different computer configurations. Disk drives 3104 and 3106 are in fact optional, and for space considerations, are easily omitted from the computer system used in conjunction with the production process/apparatus described herein.

The computer system 3100 also has an optional display 3108 upon which information, such as the screens illustrated in, for example, FIGS. 4–10, etc. may be displayed. In some situations, a keyboard 3110 and a mouse 3112 are provided as input devices through which input may be provided, thus allowing input to interface with the central processing unit 3102. Then again, for enhanced portability, the keyboard 3110 is either a limited function keyboard or omitted in its entirety. In addition, mouse 3112 optionally is a touch pad control device, or a track ball device, or even omitted in its entirety as well, and similarly may be used as an input device. In addition, the computer system 3100 may also optionally include at least one infrared (or radio) transmitter and/or infrared (or radio) receiver for either transmitting and/or receiving infrared signals.

Although computer system 3100 is illustrated having a single processor, a single hard disk drive and a single local memory, the system 3100 is optionally suitably equipped with any multitude or combination of processors or storage devices. Computer system 3100 is, in point of fact, able to be replaced by, or combined with, any suitable processing system operative in accordance with the principles of the present invention, including hand-held, laptop/notebook, mini, mainframe and super computers, as well as processing system network combinations of the same.

Figure 32:
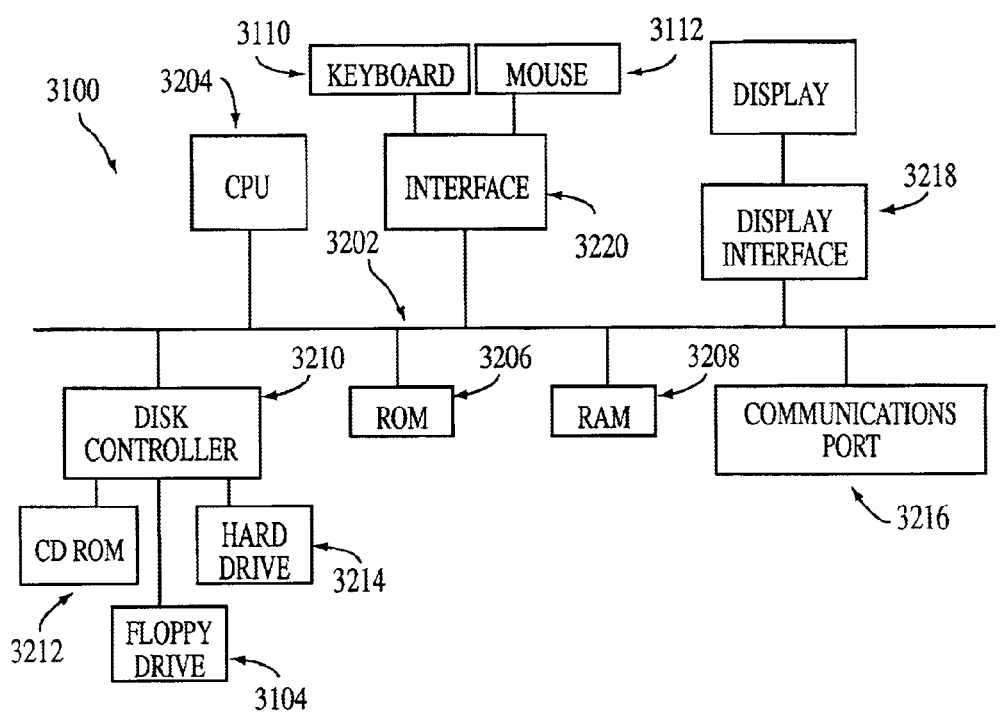
FIG. 32 illustrates one example of a block diagram of internal hardware of the central processing unit of FIG. 31.

FIG. 32 illustrates a block diagram of the internal hardware of the computer system 3100 of FIG. 31. A bus 3202 serves as the main information highway interconnecting the other components of the computer system 3100. CPU 3204 is the central processing unit of the system, performing calculations and logic operations required to execute a program. Read only memory (ROM) 3206 and random access memory (RAM) 3208 constitute the main memory of the computer 3102. Disk controller 3210 interfaces one or more disk drives to the system bus 3202. These disk drives are, for example, floppy disk drives such as 3104 or 3106, or CD ROM or DVD (digital video disks) drive such as 3212, or internal or external hard drives 3214. As indicated previously, these various disk drives and disk controllers are optional devices.

A display interface 3218 interfaces display 3208 and permits information from the bus 3202 to be displayed on the display 3108. Again as indicated, display 3108 is also an optional accessory. For example, display 3108 could be substituted or omitted. Communications with external devices, for example, the other components of the system described herein, occur utilizing communication port 3216. For example, optical fibers and/or electrical cables and/or conductors and/or optical communication (e.g., infrared, and the like) and/or wireless communication (e.g., radio frequency (RF), and the like) can be used as the transport medium between the external devices and communication port 3216. Peripheral interface 3220 interfaces the keyboard 3110 and the mouse 3112, permitting input data to be transmitted to the bus 3202.

In alternate embodiments, the above-identified CPU 3204, may be replaced by or combined with any other suitable processing circuits, including programmable logic devices, such as PALs (programmable array logic) and PLAs (programmable logic arrays). DSPs (digital signal processors), FPGAs (field programmable gate arrays), ASICs (application specific integrated circuits), VLSIs (very large scale integrated circuits) or the like.

Figure 33:
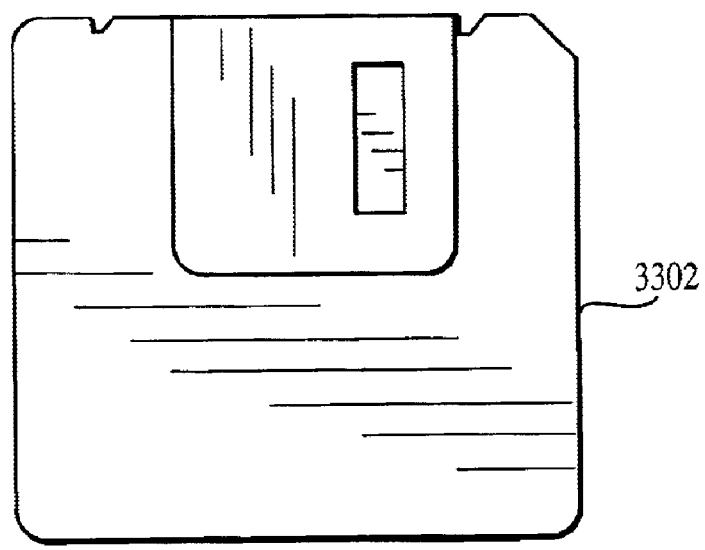
FIG. 33 is an illustrative computer-readable medium upon which computer instructions can be embodied.
Figure 34C:
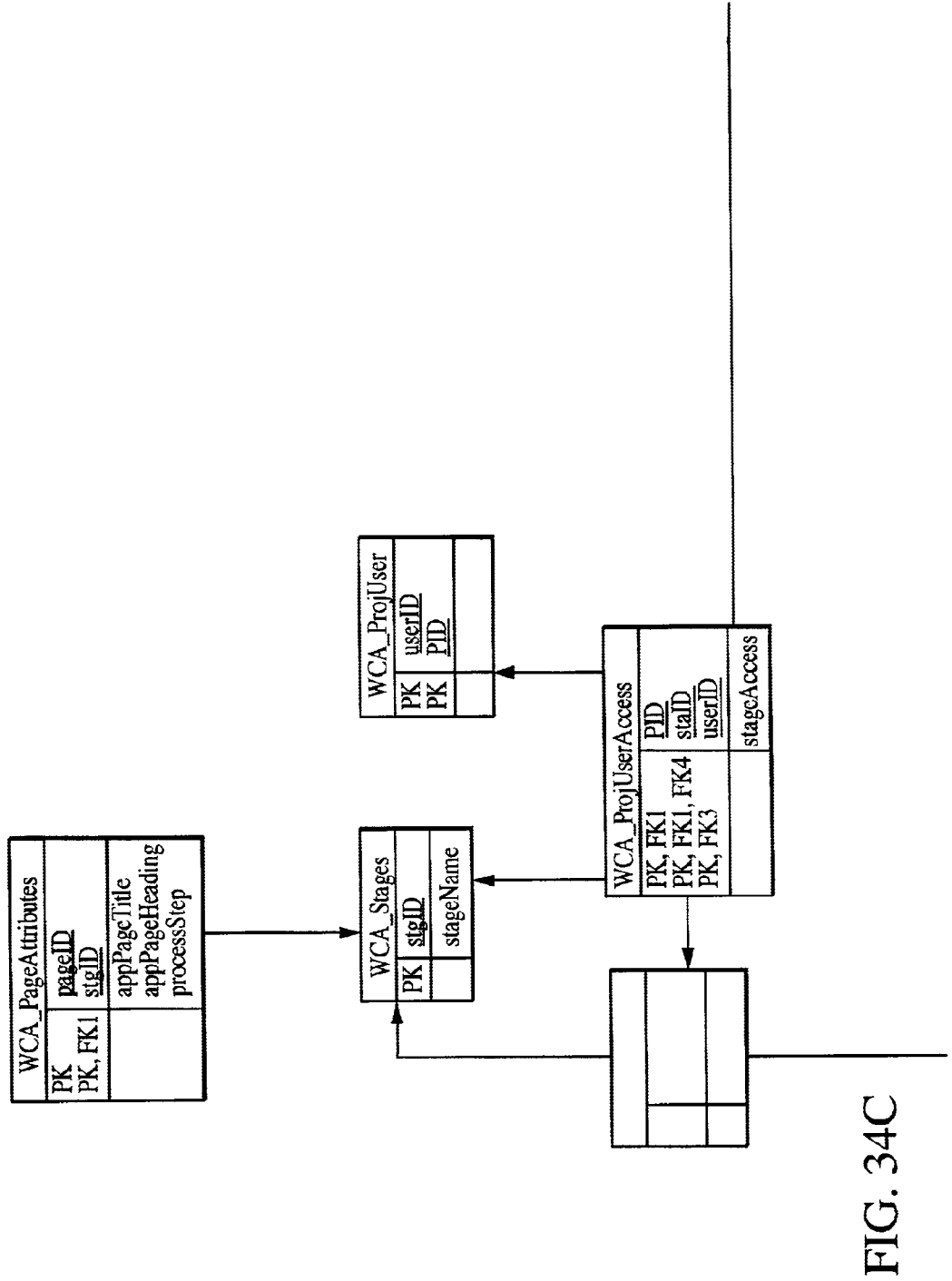
FIG. 34 is an exemplary entity relationship diagram that describes the attributes of entities and the relationship among them.
Figure 34D:
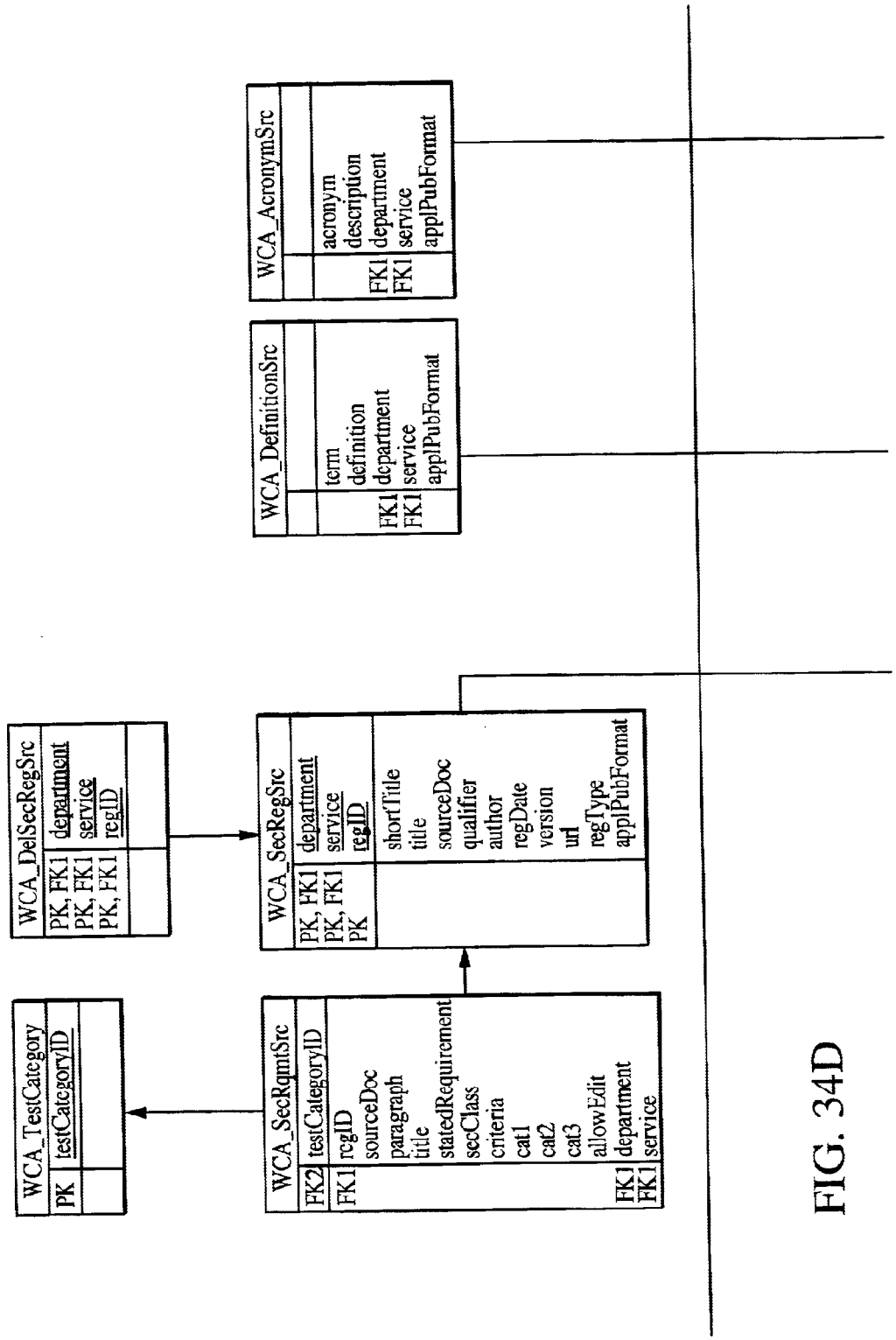
Figure 34E:
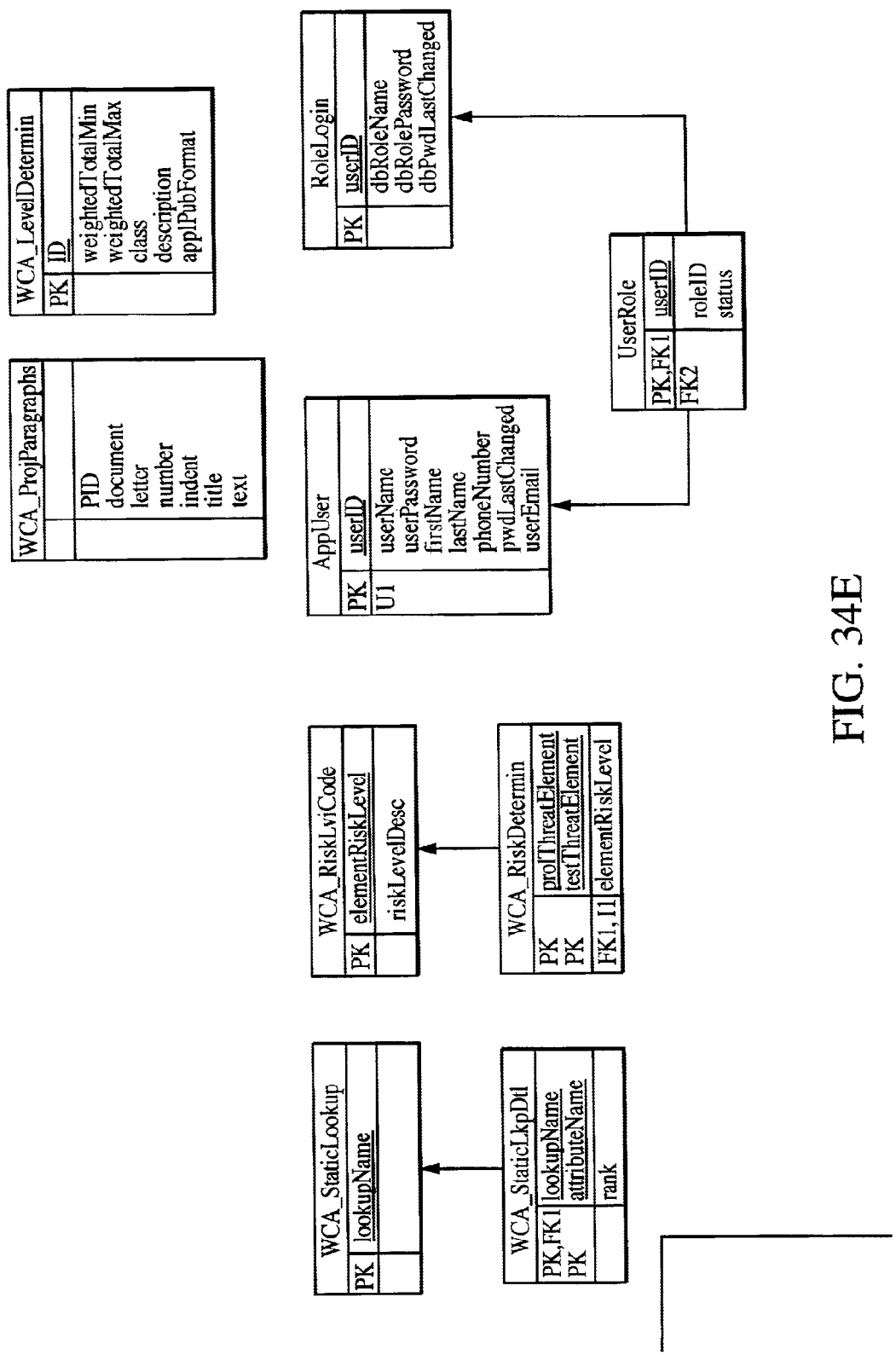
Figure 34F:
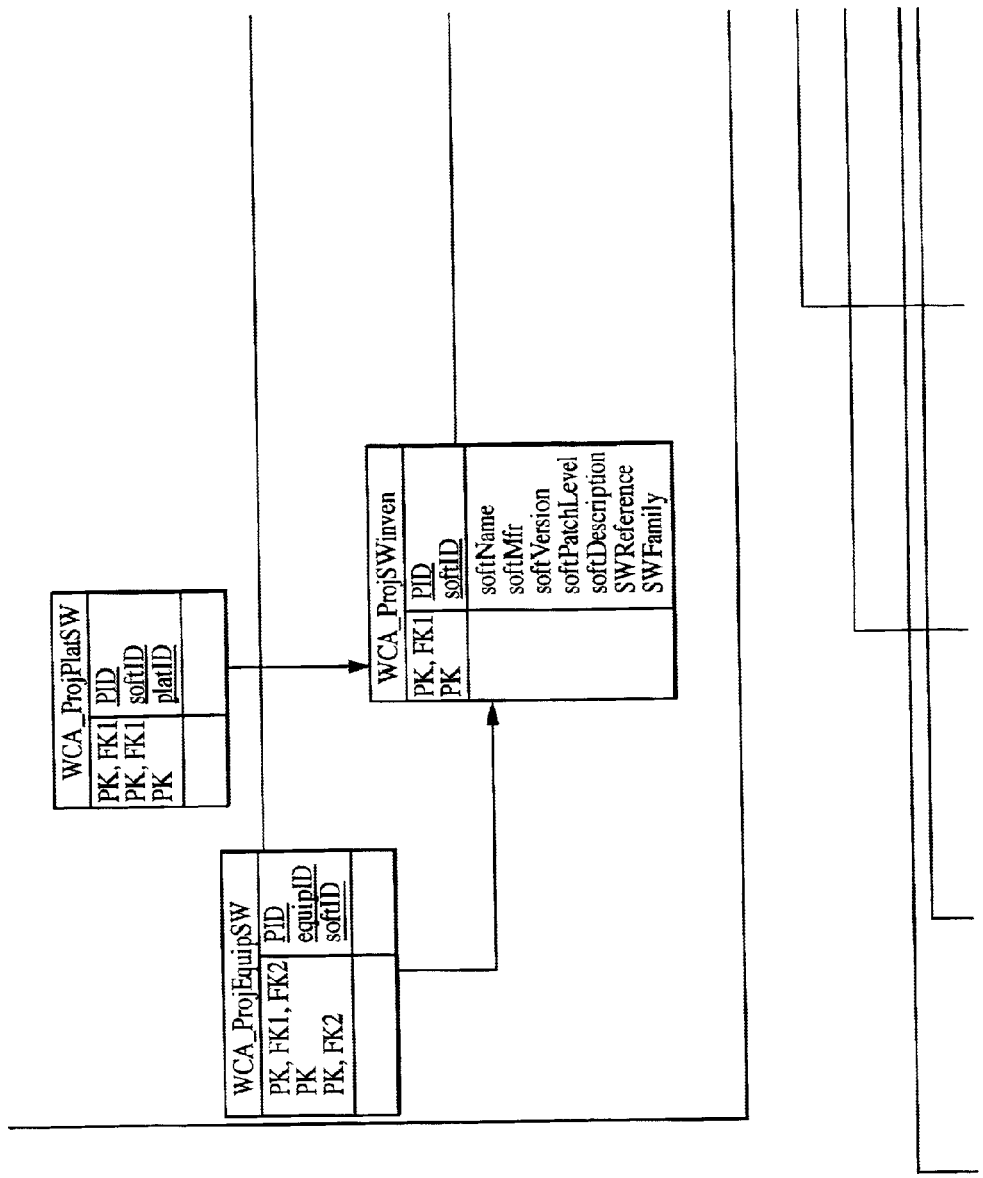
Figure 34G:
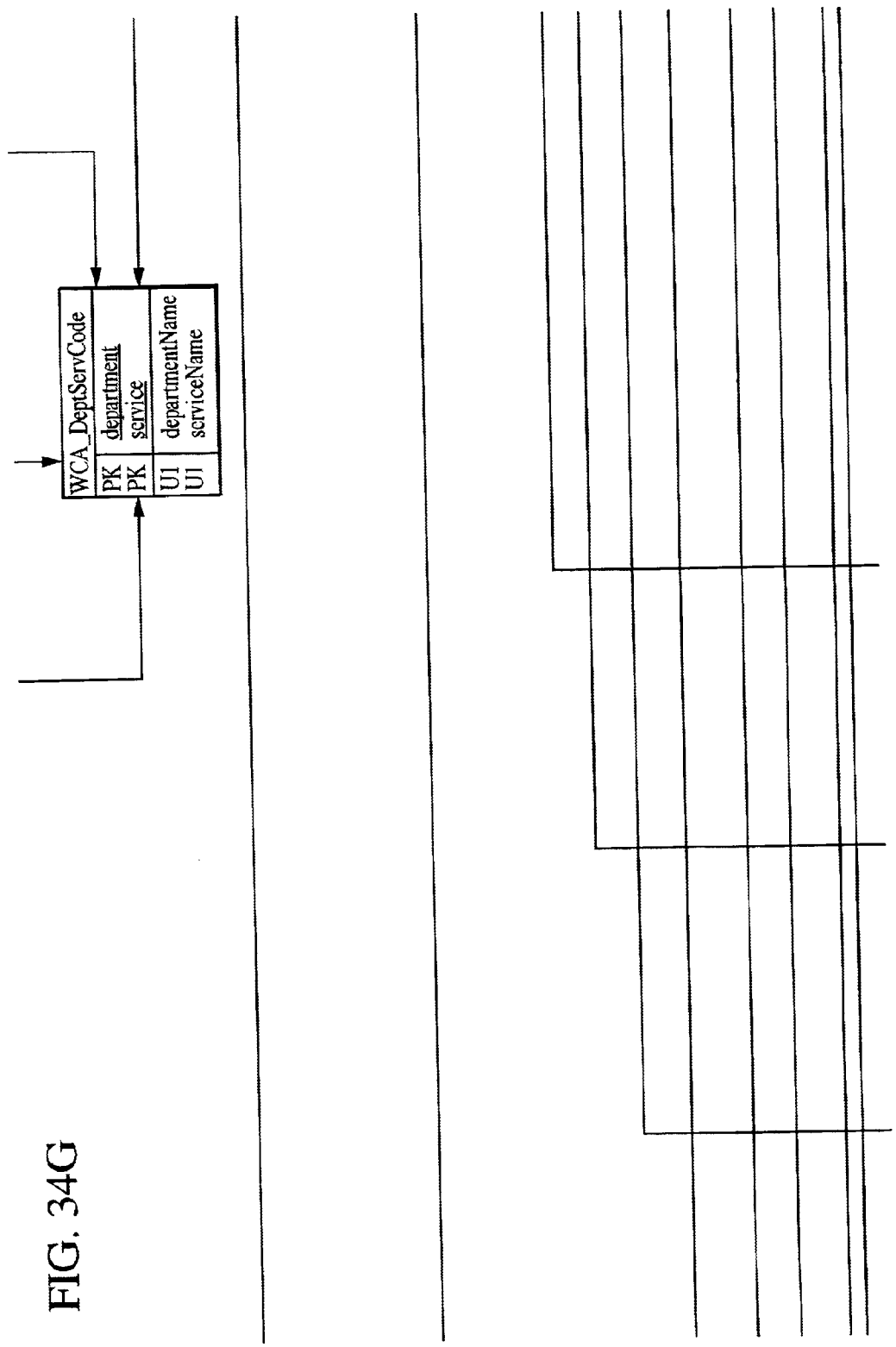
Figure 34H:
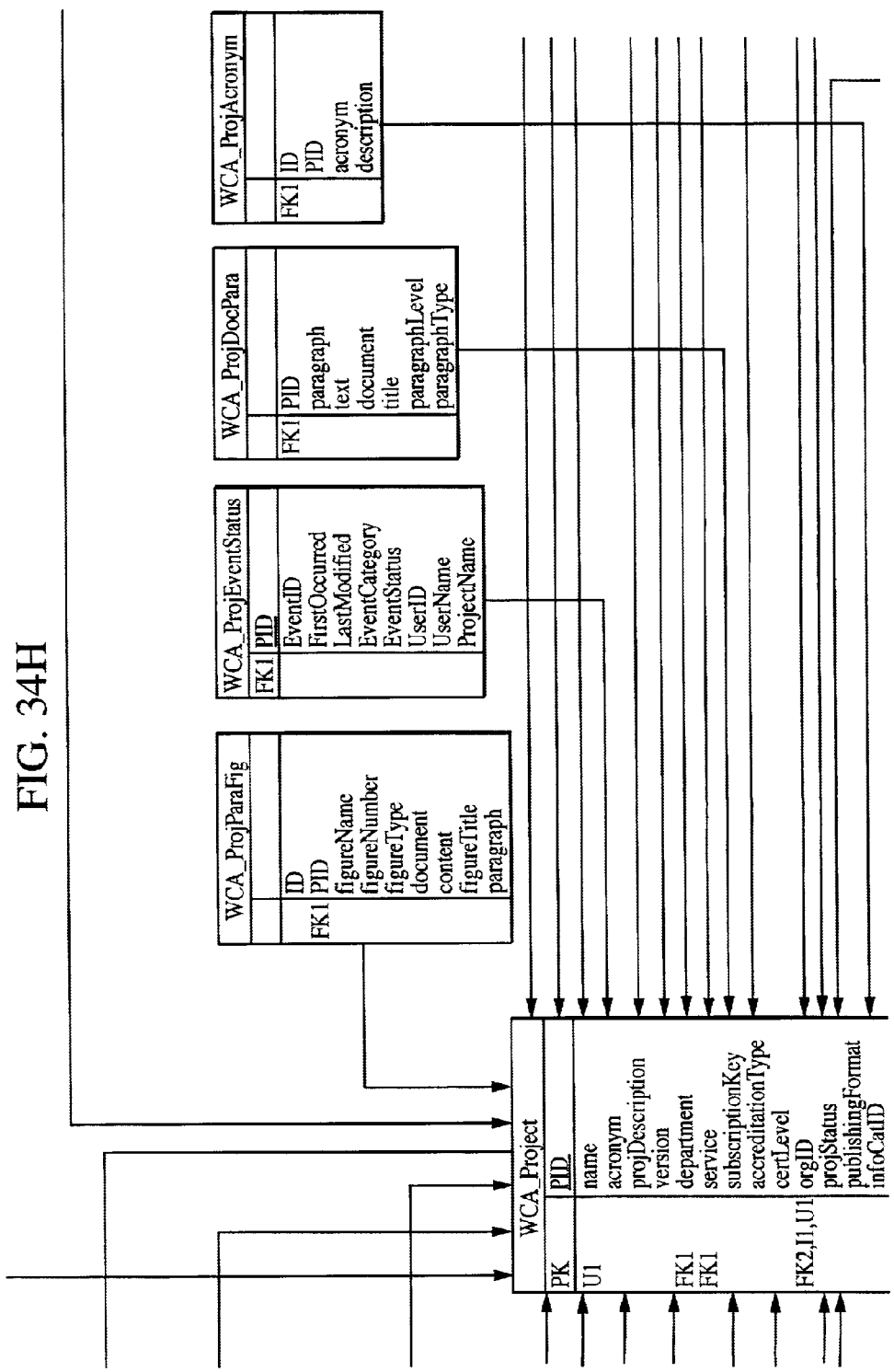
Figure 34I:
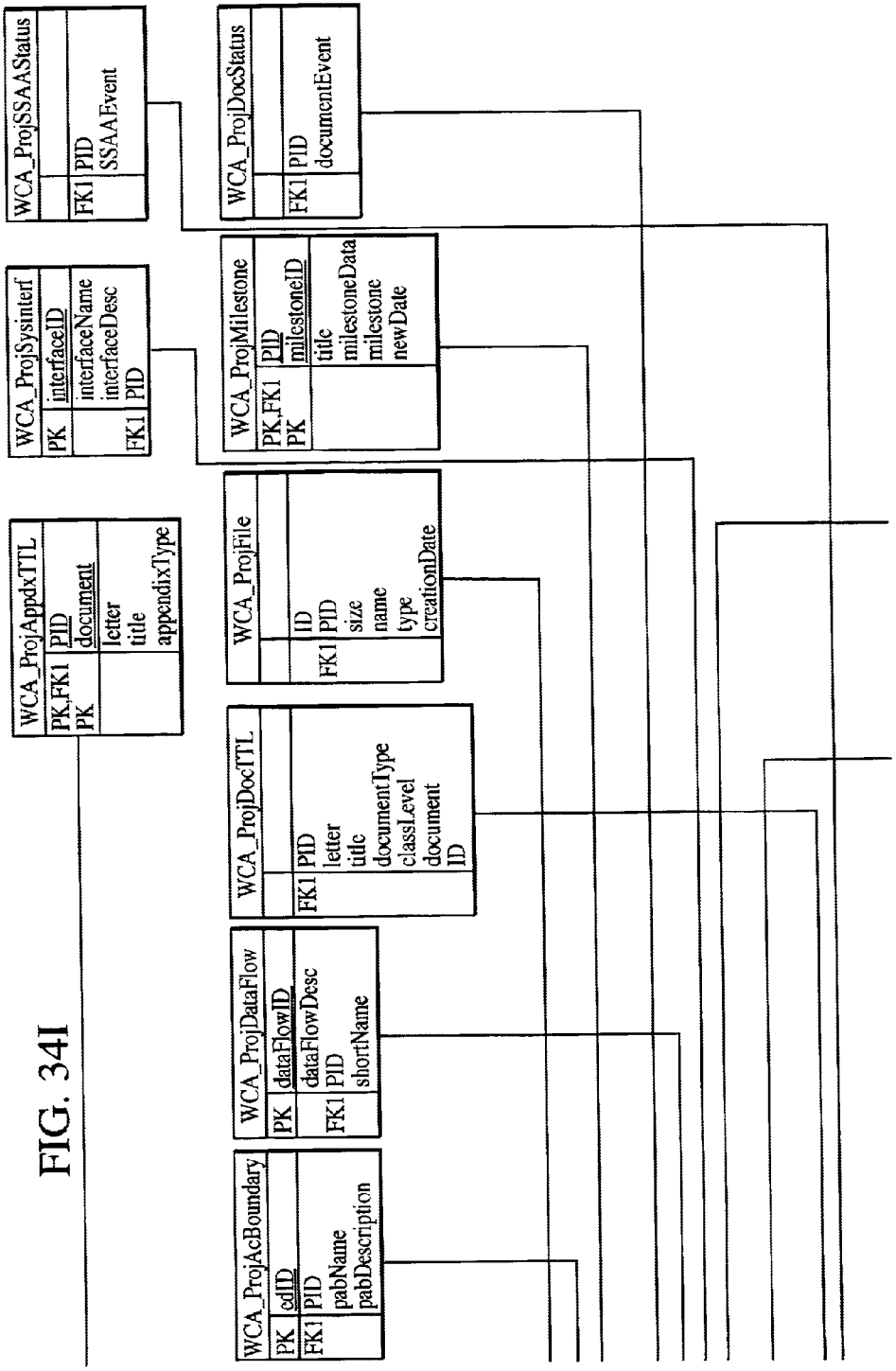
Figure 34J:
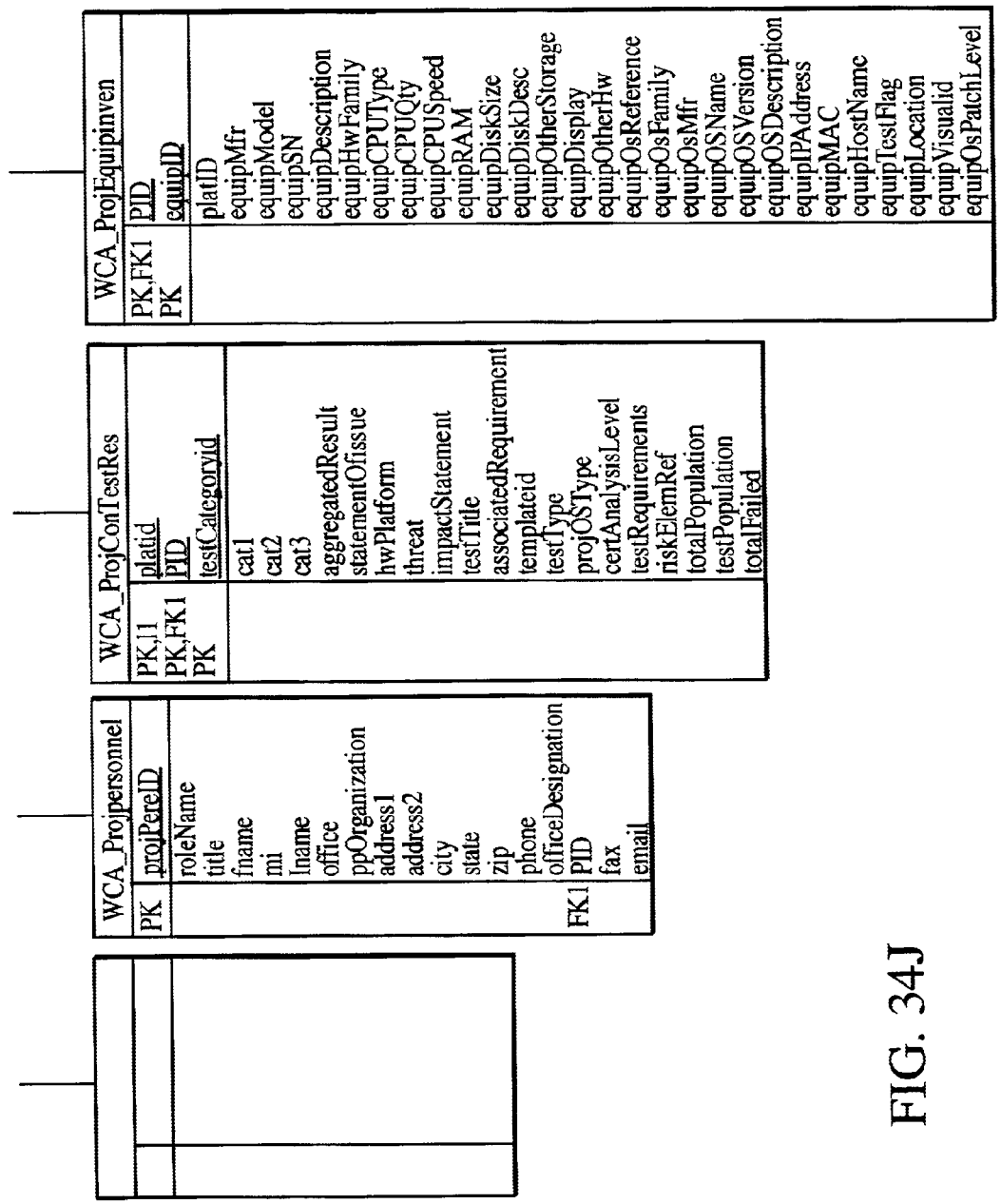
Figure 34K:
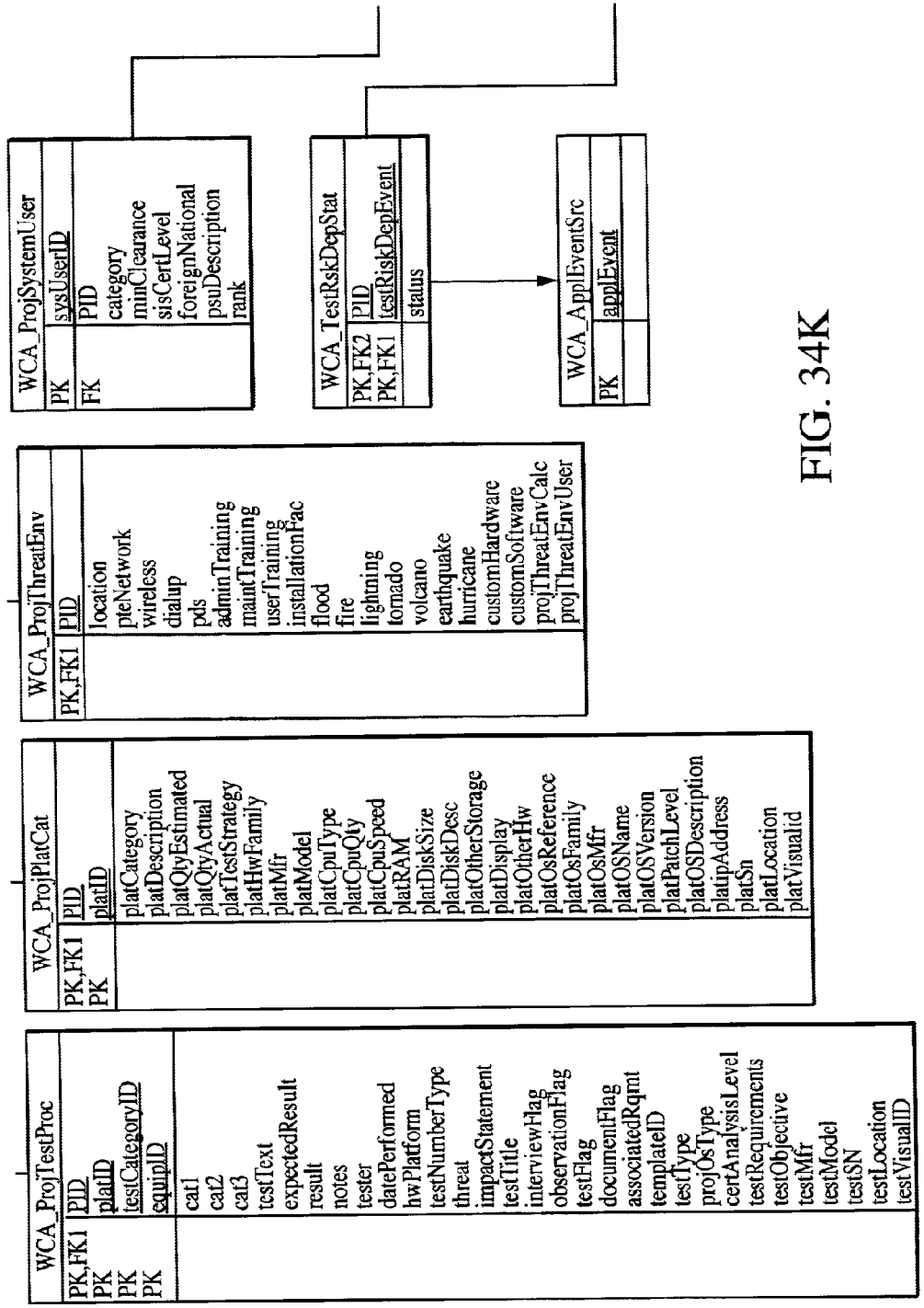
Figure 34L:
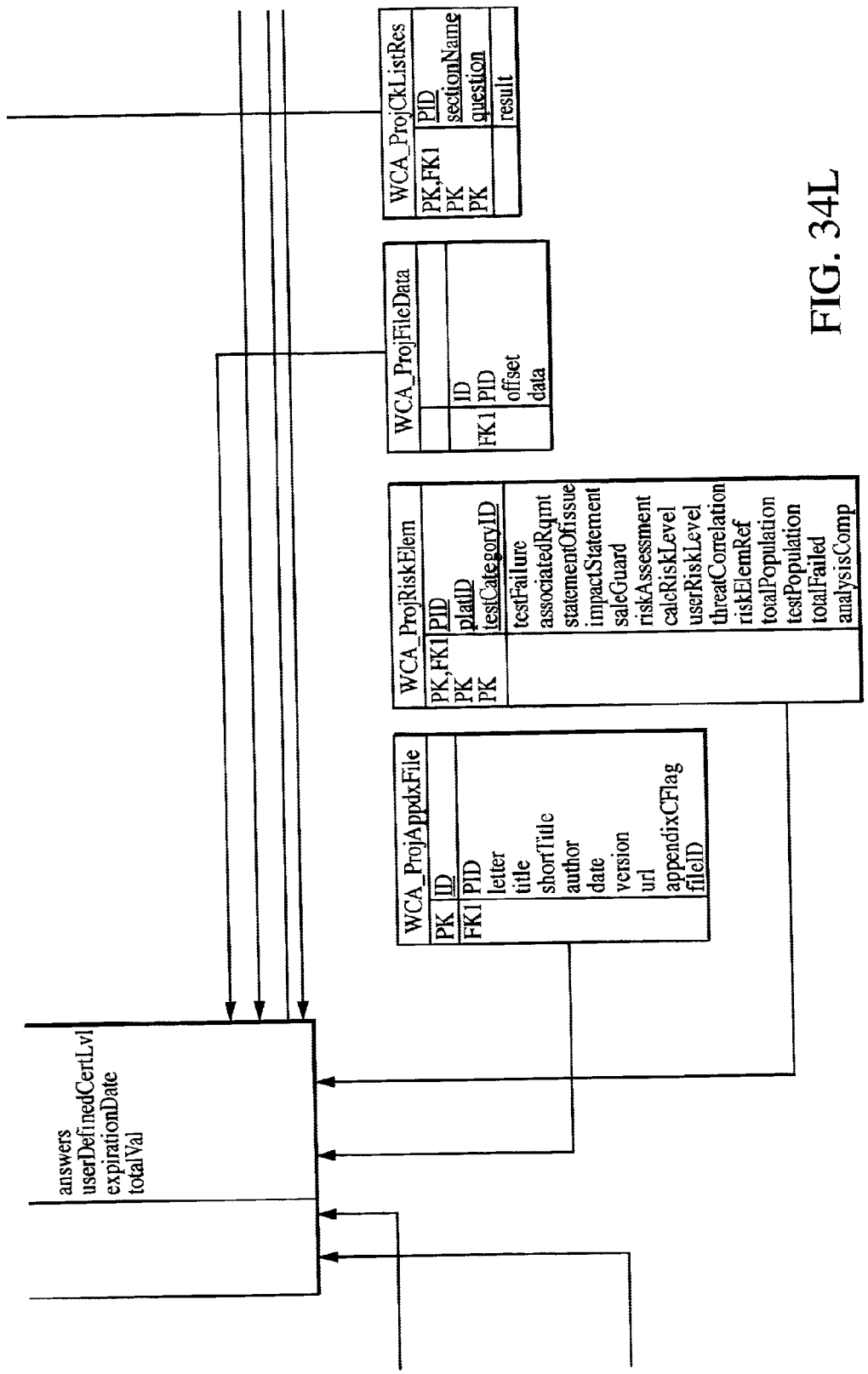
Figure 34M:
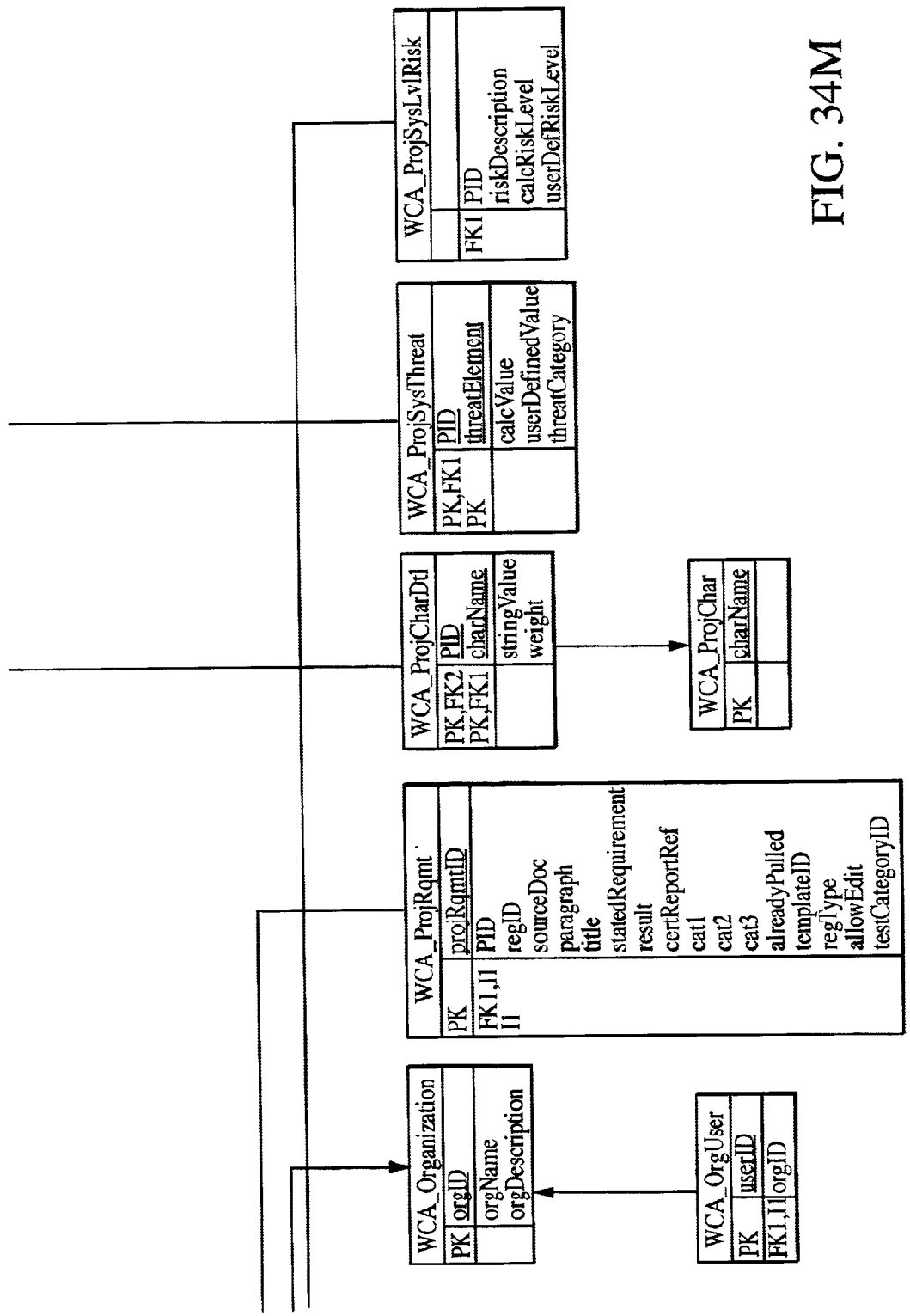

One of the implementations of the invention is as sets of instructions resident in the random access memory 3208 of one or more computer systems 3100 configured generally as described above. Until required by the computer system, the set of instructions may be stored in another computer readable memory, for example, in the hard disk drive 3214, or in a removable memory such as an optical disk for eventual use in the CD-ROM 3212 or in a floppy disk (e.g., floppy disk 3302 of FIG. 33) for eventual use in a floppy disk drive 3104, 3106. Further, the set of instructions (such as those written in the Java programming language) can be stored in the memory of another computer and transmitted via a transmission medium such as a local area network or a wide area network such as the Internet when desired by the user. One skilled in the art knows that storage or transmission of the computer program medium changes the medium electrically, magnetically, or chemically so that the medium carries computer readable information.

FIG. 34 is an entity relationship diagram (ERD) that describes the attributes of entities and the relationships among them, and illustrates the basic data abstraction of an embodiment of the system. As known to those skilled in the art, an ERD is a conceptual representation of real world objects and the relationships between them. It defines information that the systems create, maintain, process, and delete, as well as the inherent relationships that are supported by the database (i.e., data store).

At least some embodiments of the present invention can utilize a relational database to store and organize all information such as, for example, test procedures, standards/regulations, and user entered information. The design of an embodiment of the database is provided in the ERD shown in FIG. 34. The database is initially populated with security requirements, test procedures and related information to facilitate the operation of the system. As information is entered by the user and calculated by the system, it is also recorded in the database. At least some embodiments of the present invention produce output documentation that can be formatted in accordance with, for example, DITSCAP and/or NIACAP standard(s).

The ERD shown in FIG. 34 uses conventional notation. Each entity, as shown in FIG. 34, comprises a rectangular box. A one-to-one (1:1) relationship indicates that each occurrence of entity A is related to only one of entity B and each occurrence of B is related to only one occurrence of A. A 1:1 relationship is indicated by a single line connecting two entities.

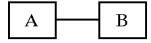

A one-to-many (1:M) relationship indicates that each occurrence of entity A is related to one or more occurrences of entity B, but each occurrence of entity B is related to only one occurrence of entity A. The two vertical lines shown below indicate that entity A is associated only with entity B. If the two vertical lines are not present, entity A can be associated with two or more entities (e.g., B, C and/or D).

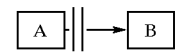

A many-to-many (N:M) relationship shows that each occurrence of entity A is related to one or more occurrences of entity B, and each occurrence of entity B is related to one or more occurrences of entity A.

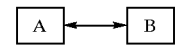

If there can be occurrences of one entity that are not related to at least one occurrence of the other entity, then the relationship is optional and this is shown by the use of a dashed line.

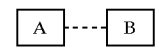

As known to those skilled in the art, a data dictionary, as provided below, defines and specifies the data elements in the system. The data dictionary shown below can be used either as a stand-alone system or as an integral part of the database. Data integrity and accuracy is better ensured in the latter case.

An instance of an entity shown in FIG. 34 will represent one or more lines associated with the Table column in the data dictionary provided below (i.e., an entity shown in FIG. 34 can have many data items/attributes). These data items, representing an attribute of each respective entity to which it belongs, are shown in each line of the data dictionary. The data dictionary also provides the DataType (e.g., varchar, bit, decimal, char, text, int, etc.), and Length (in characters) of the field. The Precision column is applicable only to numerical data and represents the maximum number of significant digits. The Null column indicates whether the field defaults to a null value. FIGS. 34 and the data dictionary can be used to produce, for example, the SQL code required to create the data structures in the database.

The table below provides an exemplary data dictionary that can be used with the ERD of FIG. 34.

| Database Table | Column | DataType | Length | Precision | Null |
|---|---|---|---|---|---|
| SQL SERVER | | | | | |
| AppUser | | | | | |
| userID | numeric | 9 | 18 | NO |
| userName | varchar | 25 | 0 | NO |
| userPassword | varchar | 30 | 0 | NO |
| firstName | varchar | 20 | 0 | YES |
| lastName | varchar | 20 | 0 | YES |
| phoneNumber | varchar | 30 | 0 | YES |
| pwdLastChanged | datetime | 8 | 23 | YES |
| userEmail | varchar | 50 | 0 | YES |
| RoleLogin | | | | | |
| roleID | varchar | 10 | 0 | NO |
| dbRoleName | varchar | 12 | 0 | NO |
| dbRolePassword | varchar | 30 | 0 | NO |
| dbPwdLastChanged | datetime | 8 | 23 | YES |
| UserRole | | | | | |
| userID | numeric | 9 | 18 | NO |

-continued

| Database Table | Column | DataType | Length | Precision | Null |
|---|---|---|---|---|---|
| | roleID | varchar | 10 | 0 | NO |
| | status | char | 1 | 0 | YES |
| WCA_AcronymSrc | | | | | |
| | acronym | varchar | 50 | 0 | NO |
| | description | text | 16 | 0 | YES |
| | department | int | 4 | 10 | NO |
| | service | int | 4 | 10 | NO |
| | applPubFormat | varchar | 50 | 0 | YES |
| WCA_AppdxTTLSrc | | | | | |
| | document | varchar | 50 | 0 | YES |
| | title | varchar | 255 | 0 | YES |
| | letter | varchar | 50 | 0 | YES |
| | applPubFormat | varchar | 50 | 0 | NO |
| | appendixType | varchar | 50 | 0 | NO |
| WCA_ApplEventSrc | | | | | |
| | EventID | varchar | 50 | 0 | NO |
| | StageName | varchar | 50 | 0 | YES |
| | Category | varchar | 50 | 0 | YES |
| | Severity | char | 30 | 0 | YES |
| | PubFormat | varchar | 10 | 0 | YES |
| WCA_ApplicationID | | | | | |
| | applID | varchar | 3 | 0 | NO |
| | applName | varchar | 50 | 0 | NO |
| WCA_AuditLog | | | | | |
| | id | int | 4 | 10 | NO |
| | PID | int | 4 | 10 | YES |
| | ProjectName | varchar | 50 | 0 | YES |
| | TableName | varchar | 25 | 0 | YES |
| | KeyValues | varchar | 250 | 0 | YES |
| | StageName | varchar | 50 | 0 | YES |
| | ProcessStep | varchar | 50 | 0 | YES |
| | PageID | varchar | 50 | 0 | YES |
| | UserID | numeric | 9 | 18 | YES |
| | IPAddress | varchar | 16 | 0 | NO |
| | ActionDesc | text | 16 | 0 | YES |
| | ActionStatus | char | 20 | 0 | YES |
| | ActionTime | datetime | 8 | 23 | YES |
| | EventType | varchar | 50 | 0 | YES |
| | ErrorMessage | text | 16 | 0 | YES |
| | UserName | varchar | 25 | 0 | YES |
| WCA_Class Weight | | | | | |
| | ID | int | 4 | 10 | NO |
| | characteristic | varchar | 255 | 0 | YES |
| | alternative | varchar | 255 | 0 | YES |
| | weight | float | 8 | 53 | YES |
| | applPubFormat | varchar | 50 | 0 | NO |
| WCA_DefinitionSrc | | | | | |
| | term | varchar | 50 | 0 | NO |
| | definition | text | 16 | 0 | YES |
| | department | int | 4 | 10 | NO |
| | service | int | 4 | 10 | NO |
| | applPubFormat | varchar | 50 | 0 | YES |
| WCA_DefSecRegSrc | | | | | |
| | department | int | 4 | 10 | NO |
| | service | int | 4 | 10 | NO |
| | regID | int | 4 | 10 | NO |
| WCA_DeptServCode | | | | | |
| | department | int | 4 | 10 | NO |
| | service | int | 4 | 10 | NO |
| | departmentName | varchar | 50 | 0 | NO |
| | serviceName | varchar | 50 | 0 | NO |
| WCA_DocEventSrc | | | | | |
| | applPubFormat | varchar | 50 | 0 | NO |
| | documentEvent | varchar | 50 | 0 | NO |
| WCA_DocParaTTLSrc | | | | | |
| | title | varchar | 60 | 0 | NO |

-continued

| Database Table | Column | DataType | Length | Precision | Null |
|---|---|---|---|---|---|
| paragraph | varchar | 50 | 0 | NO | |
| document | varchar | 50 | 0 | NO | |
| applPubFormat | varchar | 50 | 0 | NO | |
| paragraphLevel | int | 4 | 10 | NO | |
| paragraphType | varchar | 50 | 0 | YES | |
| WCA_DocTmplSrc | | | | | |
| instance | int | 4 | 10 | NO | |
| text | text | 16 | 0 | YES | |
| notes | varchar | 50 | 0 | YES | |
| document | varchar | 50 | 0 | NO | |
| paragraph | varchar | 255 | 0 | NO | |
| applPubFormat | varchar | 50 | 0 | NO | |
| WCA_HelpExampleSrc | | | | | |
| ID | int | 4 | 10 | NO | |
| page | varchar | 50 | 0 | YES | |
| applPubFormat | varchar | 50 | 0 | NO | |
| type | varchar | 50 | 0 | YES | |
| title | varchar | 50 | 0 | YES | |
| helptext | text | 16 | 0 | YES | |
| height | int | 4 | 10 | NO | |
| width | int | 4 | 10 | NO | |
| seeAlso | int | 4 | 10 | YES | |
| pageID | varchar | 50 | 0 | NO | |
| heading | varchar | 50 | 0 | NO | |
| stgID | numeric | 9 | 18 | YES | |
| WCA_HwFamilyLookup | | | | | |
| hwFamily | varchar | 50 | 0 | NO | |
| rank | int | 4 | 10 | NO | |
| type | char | 10 | 0 | NO | |
| hwID | numeric | 9 | 18 | NO | |
| WCA_InfoCategory | | | | | |
| infoCatID | int | 4 | 10 | NO | |
| infoCatName | varchar | 60 | 0 | YES | |
| infoCatValue | varchar | 5 | 0 | YES | |
| rank | int | 4 | 10 | YES | |
| weight | float | 8 | 53 | NO | |
| WCA_LevelDetermin | | | | | |
| ID | int | 4 | 10 | NO | |
| weightedTotalMin | float | 8 | 53 | YES | |
| weightedTotalMax | float | 8 | 53 | YES | |
| class | int | 4 | 10 | YES | |
| description | varchar | 255 | 0 | YES | |
| applPubFormat | varchar | 50 | 0 | NO | |
| WCA_LookupMgr | | | | | |
| webCaLookupsID | numeric | 9 | 18 | NO | |
| tableName | varchar | 50 | 0 | NO | |
| columnName | varchar | 50 | 0 | NO | |
| lkupDescription | varchar | 50 | 0 | YES | |
| wlSize | numeric | 9 | 18 | YES | |
| WCA_MarkerLookup | | | | | |
| marker | varchar | 50 | 0 | NO | |
| sqlStatement | varchar | 1000 | 0 | NO | |
| retrievalType | varchar | 50 | 0 | NO | |
| errorMessageText | varchar | 255 | 0 | YES | |
| WCA_MinSeCkListSrc | | | | | |
| sectionName | varchar | 255 | 0 | NO | |
| question | varchar | 50 | 0 | NO | |
| testText | text | 16 | 0 | YES | |
| questionSort | numeric | 9 | 18 | YES | |
| applPubFormat | varchar | 50 | 0 | YES | |
| validQuestion | char | 1 | 0 | YES | |
| WCA_MLSecClass | | | | | |
| ID | int | 4 | 10 | YES | |
| maxDateClass | varchar | 255 | 0 | YES | |
| minUserClear | varchar | 255 | 0 | YES | |
| case1 | varchar | 255 | 0 | YES | |
| case2 | varchar | 255 | 0 | YES | |
| case3 | varchar | 255 | 0 | YES | |

| Database Table | Column | DataType | Length | Precision | Null |
|---|---|---|---|---|---|
| WCA_Organization | | | | | |
| orgID | decimal | 9 | 18 | NO | |
| orgName | varchar | 50 | 0 | NO | |
| orgDescription | varchar | 255 | 0 | NO | |
| WCA_OrgUser | | | | | |
| orgID | decimal | 9 | 18 | NO | |
| userID | int | 4 | 10 | NO | |
| WCA_OsFamilyLookup | | | | | |
| osFamily | varchar | 50 | 0 | NO | |
| rank | int | 4 | 10 | NO | |
| type | char | 10 | 0 | NO | |
| osID | numeric | 9 | 18 | NO | |
| WCA_OSSource | | | | | |
| osReference | varchar | 50 | 0 | NO | |
| osFamily | varchar | 20 | 0 | YES | |
| osMfr | varchar | 50 | 0 | YES | |
| osName | varchar | 50 | 0 | YES | |
| osVersion | varchar | 50 | 0 | YES | |
| osPatchLevel | varchar | 50 | 0 | YES | |
| WCA_PageAttributes | | | | | |
| pageID | varchar | 50 | 0 | NO | |
| stgID | numeric | 9 | 18 | NO | |
| appPageTitle | varchar | 50 | 0 | NO | |
| appPageHeading | varchar | 50 | 0 | YES | |
| processStep | varchar | 50 | 0 | NO | |
| WCA_ProjAcBoundary | | | | | |
| PID | numeric | 9 | 18 | NO | |
| pabName | varchar | 50 | 0 | NO | |
| pabDescription | text | 16 | 0 | NO | |
| adID | numeric | 9 | 18 | NO | |
| WCA_ProjAcronym | | | | | |
| ID | int | 4 | 10 | NO | |
| PID | numeric | 9 | 18 | NO | |
| acronym | varchar | 50 | 0 | YES | |
| description | text | 16 | 0 | YES | |
| WCA_ProjAppdxFile | | | | | |
| ID | numeric | 9 | 18 | NO | |
| PID | numeric | 9 | 18 | NO | |
| letter | varchar | 50 | 0 | NO | |
| title | varchar | 255 | 0 | YES | |
| shortTitle | varchar | 255 | 0 | YES | |
| author | varchar | 255 | 0 | YES | |
| date | varchar | 255 | 0 | YES | |
| version | varchar | 50 | 0 | YES | |
| url | varchar | 255 | 0 | YES | |
| appendixCFlag | char | 10 | 0 | YES | |
| fileID | numeric | 9 | 18 | NO | |
| WCA_ProjAppdxTTL | | | | | |
| PID | numeric | 9 | 18 | NO | |
| document | varchar | 50 | 0 | NO | |
| letter | varchar | 50 | 0 | YES | |
| title | varchar | 255 | 0 | YES | |
| appendixType | varchar | 50 | 0 | NO | |
| WCA_ProjChar | | | | | |
| charName | varchar | 50 | 0 | NO | |
| WCA_ProjCharDtl | | | | | |
| PID | numeric | 9 | 18 | NO | |
| charName | varchar | 50 | 0 | NO | |
| stringValue | varchar | 50 | 0 | NO | |
| weight | float | 8 | 53 | YES | |
| WCA_ProjCkListRes | | | | | |
| PID | numeric | 9 | 18 | NO | |
| sectionName | varchar | 255 | 0 | NO | |
| question | varchar | 50 | 0 | NO | |
| result | varchar | 50 | 0 | YES | |

-continued

| Database Table | Column | DataType | Length | Precision | Null |
|---|---|---|---|---|---|
| WCA_ProjConTestRes | | | | | |
| platId | numeric | 9 | 18 | NO | |
| PID | numeric | 9 | 18 | NO | |
| cat1 | varchar | 50 | 0 | YES | |
| cat2 | varchar | 50 | 0 | YES | |
| cat3 | varchar | 50 | 0 | YES | |
| aggregatedResult | varchar | 50 | 0 | YES | |
| statementOfIssue | text | 16 | 0 | YES | |
| hwPlatform | varchar | 50 | 0 | YES | |
| threat | varchar | 50 | 0 | YES | |
| impactStatement | text | 16 | 0 | YES | |
| testTitle | varchar | 100 | 0 | YES | |
| associatedRequiremen | text | 16 | 0 | YES | |
| templateId | numeric | 9 | 18 | NO | |
| testType | varchar | 1 | 0 | YES | |
| projOSType | varchar | 50 | 0 | YES | |
| testCategoryId | numeric | 9 | 18 | NO | |
| certAnalysisLevel | numeric | 9 | 18 | YES | |
| testRequirements | text | 16 | 0 | YES | |
| riskElemRef | numeric | 9 | 18 | YES | |
| totalPopulation | numeric | 9 | 18 | YES | |
| testPopulation | numeric | 9 | 18 | YES | |
| totalFailed | numeric | 9 | 18 | YES | |
| WCA_ProjDataFlow | | | | | |
| dataFlowID | numeric | 9 | 18 | NO | |
| dataFlowDesc | text | 16 | 0 | NO | |
| PID | numeric | 9 | 18 | NO | |
| shortName | varchar | 50 | 0 | NO | |
| WCA_ProjDefAccess | | | | | |
| PID | numeric | 9 | 18 | NO | |
| stgID | numeric | 9 | 18 | NO | |
| stageAccess | char | 1 | 0 | NO | |
| WCA_ProjDefinitions | | | | | |
| ID | int | 4 | 10 | NO | |
| PID | numeric | 9 | 18 | NO | |
| term | varchar | 255 | 0 | YES | |
| definition | text | 16 | 0 | YES | |
| WCA_ProjDocPara | | | | | |
| PID | numeric | 9 | 18 | NO | |
| paragraph | varchar | 255 | 0 | NO | |
| text | text | 16 | 0 | YES | |
| document | varchar | 50 | 0 | NO | |
| title | varchar | 255 | 0 | YES | |
| paragraphLevel | decimal | 9 | 18 | YES | |
| paragraphType | varchar | 50 | 0 | YES | |
| WCA_ProjDocParaTTL | | | | | |
| PID | numeric | 9 | 18 | NO | |
| document | varchar | 50 | 0 | YES | |
| paragraph | varchar | 255 | 0 | YES | |
| title | varchar | 255 | 0 | YES | |
| WCA_ProjDocStatus | | | | | |
| PID | numeric | 9 | 18 | NO | |
| documentEvent | varchar | 50 | 0 | NO | |
| WCA_ProjDocTTL | | | | | |
| PID | numeric | 9 | 18 | NO | |
| letter | varchar | 50 | 0 | NO | |
| title | varchar | 255 | 0 | NO | |
| documentType | varchar | 50 | 0 | NO | |
| classLevel | varchar | 50 | 0 | NO | |
| document | varchar | 50 | 0 | NO | |
| ID | numeric | 9 | 18 | YES | |
| WCA_Project | | | | | |
| PID | numeric | 9 | 18 | NO | |
| name | varchar | 50 | 0 | NO | |
| acronym | varchar | 50 | 0 | YES | |
| projDescription | text | 16 | 0 | NO | |
| version | varchar | 50 | 0 | YES | |
| department | int | 4 | 10 | NO | |

-continued

| Database Table | Column | DataType | Length | Precision | Null |
|---|---|---|---|---|---|
| service | int | 4 | 10 | NO | |
| subDescriptionKey | varchar | 50 | 0 | NO | |
| accreditationType | varchar | 50 | 0 | YES | |
| certLevel | numeric | 9 | 18 | YES | |
| orgID | decimal | 9 | 18 | NO | |
| projStatus | varchar | 10 | 0 | NO | |
| publishingFormat | varchar | 50 | 0 | NO | |
| infoCatID | int | 4 | 10 | YES | |
| answers | varchar | 7 | 0 | YES | |
| userDefinedCertLvl | int | 4 | 10 | YES | |
| expirationDate | datetime | 8 | 23 | NO | |
| totalVal | int | 4 | 10 | YES | |
| WCA_ProjEquipInven | | | | | |
| PID | numeric | 9 | 18 | NO | |
| equipID | numeric | 9 | 18 | NO | |
| platID | numeric | 9 | 18 | NO | |
| equipMfr | varchar | 50 | 0 | YES | |
| equipModel | varchar | 50 | 0 | YES | |
| equipSN | varchar | 50 | 0 | YES | |
| equipDescription | text | 16 | 0 | YES | |
| equipHwFamily | varchar | 20 | 0 | YES | |
| equipCPUType | varchar | 50 | 0 | YES | |
| equipCPUQty | varchar | 50 | 0 | YES | |
| equipCPUSpeed | varchar | 50 | 0 | YES | |
| equipRAM | varchar | 50 | 0 | YES | |
| equipDiskSize | varchar | 50 | 0 | YES | |
| equipDiskDesc | text | 16 | 0 | YES | |
| equipOtherStorage | varchar | 50 | 0 | YES | |
| equipDisplay | varchar | 50 | 0 | YES | |
| equipOtherHw | text | 16 | 0 | YES | |
| equipOsReference | varchar | 50 | 0 | YES | |
| equipOsFamily | varchar | 20 | 0 | YES | |
| equipOsMfr | varchar | 50 | 0 | YES | |
| equipOSName | varchar | 50 | 0 | YES | |
| equipOSVersion | varchar | 50 | 0 | YES | |
| equipOSDescription | text | 16 | 0 | YES | |
| equipIPAddress | varchar | 255 | 0 | NO | |
| equipMAC | varchar | 20 | 0 | YES | |
| equipHostName | varchar | 50 | 0 | YES | |
| equipTestFlag | char | 1 | 0 | YES | |
| equipLocation | varchar | 50 | 0 | YES | |
| equipVisualId | varchar | 50 | 0 | YES | |
| equipOsPatchLevel | varchar | 50 | 0 | YES | |
| WCA_ProjEquipSW | | | | | |
| PID | numeric | 9 | 18 | NO | |
| equipID | numeric | 9 | 18 | NO | |
| softID | numeric | 9 | 18 | NO | |
| WCA_ProjEventStat | | | | | |
| PID | numeric | 9 | 18 | NO | |
| applEvent | varchar | 25 | 0 | NO | |
| status | char | 2 | 0 | YES | |
| WCA_ProjEventStatus | | | | | |
| PID | numeric | 9 | 18 | NO | |
| EventID | varchar | 50 | 0 | NO | |
| FirstOccurred | datetime | 8 | 23 | NO | |
| LestModified | datetime | 8 | 23 | YES | |
| EventStatus | varchar | 15 | 0 | NO | |
| UserID | numeric | 9 | 18 | NO | |
| UserName | varchar | 25 | 0 | NO | |
| ProjectName | varchar | 50 | 0 | NO | |
| PublishingTitle | varchar | 50 | 0 | YES | |
| WCA_ProjFile | | | | | |
| ID | int | 4 | 10 | NO | |
| PID | numeric | 9 | 18 | NO | |
| size | int | 4 | 10 | NO | |
| name | varchar | 255 | 0 | NO | |
| type | varchar | 255 | 0 | NO | |
| creationDate | decimal | 9 | 18 | NO | |
| WCA_ProjFileData | | | | | |
| ID | int | 4 | 10 | NO | |
| PID | numeric | 9 | 18 | NO | |

-continued

| Database Table | Column | DataType | Length | Precision | Null |
|---|---|---|---|---|---|
| offset | int | 4 | 10 | NO | |
| data | varchar | 8000 | 0 | YES | |
| WCA_ProjMilestone | | | | | |
| PID | numeric | 9 | 18 | NO | |
| milestoneID | numeric | 9 | 18 | NO | |
| title | varchar | 50 | 0 | NO | |
| milestoneDate | varchar | 50 | 0 | YES | |
| milestone | text | 16 | 0 | YES | |
| newDate | datetime | 8 | 23 | YES | |
| WCA_ProjParaFig | | | | | |
| ID | int | 4 | 10 | NO | |
| fileID | numeric | 9 | 18 | NO | |
| PID | numeric | 9 | 18 | NO | |
| figureName | varchar | 255 | 0 | NO | |
| figureNumber | int | 4 | 10 | YES | |
| figureType | varchar | 50 | 0 | YES | |
| document | varchar | 50 | 0 | YES | |
| figureTitle | varchar | 255 | 0 | YES | |
| paragraph | varchar | 50 | 0 | YES | |
| WCA_ProjParagraphs | | | | | |
| PID | numeric | 9 | 18 | NO | |
| document | varchar | 50 | 0 | NO | |
| letter | varchar | 50 | 0 | NO | |
| number | varchar | 50 | 0 | NO | |
| indent | numeric | 9 | 18 | NO | |
| title | varchar | 50 | 0 | NO | |
| text | text | 16 | 0 | YES | |
| WCA_ProjPersonnel | | | | | |
| projPersID | numeric | 9 | 18 | NO | |
| roleName | varchar | 50 | 0 | NO | |
| title | varchar | 50 | 0 | NO | |
| fname | varchar | 50 | 0 | NO | |
| mi | varchar | 50 | 0 | YES | |
| lname | varchar | 50 | 0 | NO | |
| office | varchar | 50 | 0 | NO | |
| ppOrganization | varchar | 50 | 0 | NO | |
| address1 | varchar | 50 | 0 | YES | |
| address2 | varchar | 50 | 0 | YES | |
| city | varchar | 50 | 0 | NO | |
| state | varchar | 50 | 0 | NO | |
| zip | varchar | 50 | 0 | NO | |
| phone | varchar | 50 | 0 | NO | |
| officeDesignation | varchar | 50 | 0 | YES | |
| PID | numeric | 9 | 18 | NO | |
| fax | varchar | 50 | 0 | YES | |
| email | varchar | 50 | 0 | YES | |
| WCA_ProjPlatCat | | | | | |
| PID | numeric | 9 | 18 | NO | |
| platID | numeric | 9 | 18 | NO | |
| platCategory | varchar | 50 | 0 | NO | |
| platDescription | text | 16 | 0 | YES | |
| platQtyEstimated | numeric | 9 | 18 | YES | |
| platQtyActual | numeric | 9 | 18 | YES | |
| platTestStrategy | char | 5 | 0 | NO | |
| platHwFamily | varchar | 20 | 0 | NO | |
| platMfr | varchar | 50 | 0 | YES | |
| platModel | varchar | 50 | 0 | YES | |
| platCpuType | varchar | 50 | 0 | YES | |
| platCpuQty | varchar | 50 | 0 | YES | |
| platCpuSpeed | varchar | 50 | 0 | YES | |
| platRam | varchar | 50 | 0 | YES | |
| platDiskSize | varchar | 50 | 0 | YES | |
| platDiskDesc | text | 16 | 0 | YES | |
| platOtherStorage | text | 16 | 0 | YES | |
| platDisplay | varchar | 50 | 0 | YES | |
| platOtherHw | text | 16 | 0 | YES | |
| platOsReference | varchar | 50 | 0 | YES | |
| platOsFamily | varchar | 20 | 0 | YES | |
| platOsMfr | varchar | 50 | 0 | YES | |
| platOsName | varchar | 50 | 0 | YES | |
| platOsVersion | varchar | 50 | 0 | YES | |
| platOsPatchLevel | varchar | 50 | 0 | YES | |

-continued

| Database Table | Column | DataType | Length | Precision | Null |
|---|---|---|---|---|---|
| | platOsDescription | text | 16 | 0 | YES |
| | platIpAddress | varchar | 255 | 0 | YES |
| | platSn | varchar | 50 | 0 | YES |
| | platLocation | varchar | 50 | 0 | YES |
| | platVisualId | varchar | 50 | 0 | YES |
| WCA_ProjPlatSW | | | | | |
| | PID | numeric | 9 | 18 | NO |
| | platID | numeric | 9 | 18 | NO |
| | softID | numeric | 9 | 18 | NO |
| WCA_ProjPublishedDoc | | | | | |
| | PID | numeric | 9 | 18 | YES |
| | document | varchar | 50 | 0 | YES |
| | title | varchar | 255 | 0 | YES |
| | filename | varchar | 255 | 0 | YES |
| | contentType | varchar | 255 | 0 | YES |
| | creationDate | datetime | 8 | 23 | YES |
| | content | image | 16 | 0 | NO |
| WCA_ProjReference | | | | | |
| | projRefID | numeric | 9 | 18 | NO |
| | PID | numeric | 9 | 18 | NO |
| | title | varchar | 255 | 0 | NO |
| | shortTitle | varchar | 255 | 0 | YES |
| | author | varchar | 50 | 0 | YES |
| | refDate | varchar | 50 | 0 | YES |
| | version | varchar | 50 | 0 | YES |
| | url | varchar | 255 | 0 | YES |
| | refType | char | 1 | 0 | YES |
| | regID | numeric | 9 | 18 | NO |
| | appendix | varchar | 50 | 0 | YES |
| | refInstance | numeric | 9 | 18 | YES |
| WCA_ProjRiskElem | | | | | |
| | PID | numeric | 9 | 18 | NO |
| | testFailure | varchar | 100 | 0 | NO |
| | associatedRqmt | text | 16 | 0 | YES |
| | statementOfIssue | text | 16 | 0 | YES |
| | impactStatement | text | 16 | 0 | YES |
| | safeGuard | text | 16 | 0 | YES |
| | riskAssessnent | text | 16 | 0 | YES |
| | calcRiskLevel | varchar | 50 | 0 | YES |
| | userRickLevel | varchar | 50 | 0 | YES |
| | threatCorrelation | varchar | 50 | 0 | YES |
| | riskElemRef | numeric | 9 | 18 | YES |
| | totalPopulation | numeric | 9 | 18 | YES |
| | testPopulation | numeric | 9 | 18 | YES |
| | totalFailed | numeric | 9 | 18 | YES |
| | platID | numeric | 9 | 18 | NO |
| | testCategoryID | numeric | 9 | 18 | NO |
| | analysisComp | char | 3 | 0 | YES |
| WCA_ProjRqmt | | | | | |
| | projRqmtID | numeric | 9 | 18 | NO |
| | PID | numeric | 9 | 18 | NO |
| | regID | numeric | 9 | 18 | YES |
| | sourceDoc | varchar | 50 | 0 | NO |
| | paragraph | varchar | 255 | 0 | NO |
| | title | varchar | 255 | 0 | NO |
| | statedRequirement | varchar | 4000 | 0 | NO |
| | result | varchar | 50 | 0 | YES |
| | certReportRef | varchar | 255 | 0 | YES |
| | cat1 | varchar | 50 | 0 | YES |
| | cat2 | varchar | 50 | 0 | YES |
| | cat3 | varchar | 50 | 0 | YES |
| | alreadyPulled | char | 1 | 0 | YES |
| | templateID | numeric | 9 | 18 | YES |
| | regType | char | 1 | 0 | YES |
| | allowEdit | numeric | 9 | 18 | NO |
| | testCetegoryId | numeric | 9 | 18 | YES |
| | interviewFlag | char | 1 | 0 | YES |
| | observationFlag | char | 1 | 0 | YES |
| | documentFlag | char | 1 | 0 | YES |
| | testFlag | char | 1 | 0 | YES |
| | srtmResult | varchar | 50 | 0 | YES |

-continued

| Database Table | Column | DataType | Length | Precision | Null |
|---|---|---|---|---|---|
| WCA__ProjSSAAStatus | | | | | |
| PID | numeric | 9 | 18 | NO | |
| SSAAEvent | varchar | 50 | 0 | NO | |
| WCA__ProjSWInven | | | | | |
| PID | numeric | 9 | 18 | NO | |
| softID | numeric | 9 | 18 | NO | |
| softName | varchar | 50 | 0 | NO | |
| softMfr | varchar | 50 | 0 | NO | |
| softVersion | varchar | 50 | 0 | NO | |
| softPatchLevel | varchar | 255 | 0 | YES | |
| softDescription | text | 16 | 0 | YES | |
| SWReference | varchar | 50 | 0 | YES | |
| SWFamily | varchar | 20 | 0 | YES | |
| WCA__ProjSysInterf | | | | | |
| interfaceID | numeric | 9 | 18 | NO | |
| interfaceName | varchar | 50 | 0 | YES | |
| interfaceDesc | text | 16 | 0 | YES | |
| PID | numeric | 9 | 18 | NO | |
| WCA__ProjSysLvlRisk | | | | | |
| PID | numeric | 9 | 18 | NO | |
| riskDescription | text | 16 | 0 | YES | |
| calcRiskLevel | varchar | 50 | 0 | YES | |
| userDefRiskLevel | varchar | 50 | 0 | YES | |
| WCA__ProjSystemUser | | | | | |
| sysUserID | numeric | 9 | 18 | NO | |
| PID | numeric | 9 | 18 | NO | |
| category | varchar | 50 | 0 | NO | |
| minClearance | varchar | 50 | 0 | NO | |
| aisCertLevel | varchar | 50 | 0 | NO | |
| foreignNational | varchar | 50 | 0 | NO | |
| psuDescription | text | 16 | 0 | YES | |
| rank | int | 4 | 10 | NO | |
| WCA__ProjSysThreat | | | | | |
| PID | numeric | 9 | 18 | NO | |
| threatElement | varchar | 50 | 0 | NO | |
| calcValue | varchar | 50 | 0 | YES | |
| userDefinedValue | varchar | 50 | 0 | YES | |
| threatCategory | varchar | 50 | 0 | YES | |
| WCA__ProjTestProc | | | | | |
| PID | numeric | 9 | 18 | NO | |
| cat1 | varchar | 50 | 0 | YES | |
| cat2 | varchar | 50 | 0 | YES | |
| cat3 | varchar | 50 | 0 | YES | |
| testText | text | 16 | 0 | YES | |
| expectedResult | text | 16 | 0 | YES | |
| result | varchar | 50 | 0 | YES | |
| notes | text | 16 | 0 | YES | |
| tester | varchar | 50 | 0 | YES | |
| datePerformed | datetime | 8 | 23 | YES | |
| hwPlatform | varchar | 50 | 0 | YES | |
| teetNumberType | varchar | 50 | 0 | YES | |
| threat | varchar | 50 | 0 | YES | |
| impactStatement | text | 16 | 0 | YES | |
| testTitle | varchar | 100 | 0 | YES | |
| interviewFlag | char | 1 | 0 | YES | |
| observationFlag | char | 1 | 0 | YES | |
| testFlag | char | 1 | 0 | YES | |
| documentFlag | char | 1 | 0 | YES | |
| platID | numeric | 9 | 18 | NO | |
| associatedRgmt | text | 16 | 0 | YES | |
| templateID | numeric | 9 | 18 | NO | |
| testType | char | 1 | 0 | NO | |
| projOsType | varchar | 50 | 0 | YES | |
| testCategoryID | numeric | 9 | 18 | NO | |
| certAnalysisLevel | numeric | 9 | 18 | YES | |
| testRequirements | text | 16 | 0 | YES | |
| testObjective | varchar | 1000 | 0 | YES | |
| testMfr | varchar | 50 | 0 | YES | |
| testModel | varchar | 50 | 0 | YES | |
| testSN | varchar | 50 | 0 | YES | |

-continued

| Database Table | Column | DataType | Length | Precision | Null |
|---|---|---|---|---|---|
| | testLocation | varchar | 50 | 0 | YES |
| | testVisualID | varchar | 50 | 0 | YES |
| | equipID | numeric | 9 | 18 | NO |
| WCA_ProjThreatEnv | | | | | |
| | PID | numeric | 9 | 18 | NO |
| | location | varchar | 50 | 0 | YES |
| | pteNetwork | varchar | 50 | 0 | YES |
| | wireless | char | 1 | 0 | YES |
| | dialup | char | 1 | 0 | YES |
| | pds | char | 1 | 0 | YES |
| | adminTraining | varchar | 50 | 0 | YES |
| | maintTraining | varchar | 50 | 0 | YES |
| | userTraining | varchar | 50 | 0 | YES |
| | installationFac | varchar | 50 | 0 | YES |
| | flood | char | 1 | 0 | YES |
| | fire | char | 1 | 0 | YES |
| | lightning | char | 1 | 0 | YES |
| | tornado | char | 1 | 0 | YES |
| | volcano | char | 1 | 0 | YES |
| | earthquake | char | 1 | 0 | YES |
| | hurricane | char | 1 | 0 | YES |
| | customHardware | char | 1 | 0 | YES |
| | customSoftware | char | 1 | 0 | YES |
| | projThreatEnvCalc | varchar | 50 | 0 | YES |
| | projThreatEnvUser | varchar | 50 | 0 | YES |
| WCA_ProjUser | | | | | |
| | userID | numeric | 9 | 18 | NO |
| | PID | numeric | 9 | 18 | NO |
| WCA_ProjUserAccess | | | | | |
| | PID | numeric | 9 | 18 | NO |
| | userID | numeric | 9 | 18 | NO |
| | stgID | numeric | 9 | 18 | NO |
| | stageAccess | char | 1 | 0 | NO |
| WCA_PublishFmt | | | | | |
| | publishingCode | char | 2 | 0 | NO |
| | pfDescription | varchar | 50 | 0 | NO |
| WCA_RiskDetermin | | | | | |
| | projThreatElement | char | 1 | 0 | NO |
| | testThreatElement | char | 1 | 0 | NO |
| | elementRiskLevel | char | 2 | 0 | NO |
| WCA_RiskLvlCode | | | | | |
| | elementRiskLevel | char | 2 | 0 | NO |
| | riskLevelDesc | varchar | 50 | 0 | NO |
| WCA_SecRegSrc | | | | | |
| | regID | int | 4 | 10 | NO |
| | shortTitle | varchar | 255 | 0 | YES |
| | title | varchar | 255 | 0 | NO |
| | sourceDoc | varchar | 50 | 0 | YES |
| | service | int | 4 | 10 | YES |
| | qualifier | varchar | 50 | 0 | YES |
| | author | varchar | 50 | 0 | YES |
| | regDate | varchar | 50 | 0 | YES |
| | version | varchar | 50 | 0 | YES |
| | url | varchar | 255 | 0 | YES |
| | repType | char | 1 | 0 | YES |
| | department | int | 4 | 10 | NO |
| | applPubFormat | varchar | 50 | 0 | NO |
| WCA_SecReqCritQ | | | | | |
| | secRegCritQID | int | 4 | 10 | NO |
| | code | varchar | 255 | 0 | NO |
| | message | varchar | 255 | 0 | NO |
| WCA_SecRqmtSrc | | | | | |
| | regID | int | 4 | 10 | NO |
| | sourceDoc | varchar | 50 | 0 | NO |
| | paragraph | varchar | 255 | 0 | NO |
| | title | varchar | 255 | 0 | NO |
| | statedRequirement | varchar | 4000 | 0 | NO |
| | secClass | varchar | 255 | 0 | YES |

-continued

| Database Table | Column | DataType | Length | Precision | Null |
|---|---|---|---|---|---|
| criteria | varchar | 50 | 0 | YES | |
| cat1 | varchar | 50 | 0 | YES | |
| cat2 | varchar | 50 | 0 | YES | |
| cat3 | varchar | 50 | 0 | YES | |
| allowEdit | numeric | 9 | 18 | NO | |
| testCategoryID | numeric | 9 | 18 | YES | |
| WCA__SSAAEventSrc | | | | | |
| applPubFormat | varchar | 50 | 0 | NO | |
| SSAAEvent | varchar | 50 | 0 | NO | |
| WCA__Stages | | | | | |
| stgID | numeric | 9 | 18 | NO | |
| stageName | varchar | 50 | 0 | NO | |
| WCA__StaticLkpDtl | | | | | |
| lookupName | varchar | 50 | 0 | NO | |
| attributeName | varchar | 50 | 0 | NO | |
| rank | int | 4 | 10 | YES | |
| WCA__StaticLookup | | | | | |
| lookupName | varchar | 50 | 0 | NO | |
| WCA__SwFamilyLookup | | | | | |
| swFamily | varchar | 50 | 0 | NO | |
| rank | int | 4 | 10 | NO | |
| type | char | 10 | 0 | NO | |
| swID | numeric | 9 | 18 | NO | |
| WCA__SWSource | | | | | |
| swReference | varchar | 50 | 0 | NO | |
| swFamily | varchar | 20 | 0 | YES | |
| swMfr | varchar | 50 | 0 | YES | |
| swName | varchar | 50 | 0 | YES | |
| swVersion | varchar | 50 | 0 | YES | |
| swPatchLevel | varchar | 50 | 0 | YES | |
| WCA__SysUserCategory | | | | | |
| sysUserCategoryID | int | 4 | 10 | NO | |
| category | varchar | 50 | 0 | NO | |
| catagoryType | char | 1 | 0 | YES | |
| WCA__TestCategory | | | | | |
| testCatagoryID | numeric | 9 | 18 | NO | |
| WCA__TestProcSrc | | | | | |
| templateID | numeric | 9 | 18 | NO | |
| cat1 | varchar | 50 | 0 | YES | |
| cat2 | varchar | 50 | 0 | YES | |
| cat3 | varchar | 50 | 0 | YES | |
| osType | varchar | 50 | 0 | YES | |
| testText | text | 16 | 0 | YES | |
| expectedResult | text | 16 | 0 | YES | |
| testInstance | varchar | 50 | 0 | YES | |
| testTitle | varchar | 100 | 0 | YES | |
| certAnalysisLevel | numeric | 9 | 18 | YES | |
| threat | varchar | 50 | 0 | YES | |
| impactStatement | text | 16 | 0 | YES | |
| interviewFlag | char | 1 | 0 | YES | |
| observationFlag | char | 1 | 0 | YES | |
| testFlag | char | 1 | 0 | YES | |
| documentFlag | char | 1 | 0 | YES | |
| testCategoryID | numeric | 9 | 18 | NO | |
| WCA__TestRskDepStat | | | | | |
| PID | numeric | 9 | 18 | NO | |
| baselineMod | char | 1 | 0 | NO | |
| platCatMod | char | 1 | 0 | NO | |
| equipInvenMod | char | 1 | 0 | NO | |
| conTestResultMod | char | 1 | 0 | NO | |
| WCA__ThreatCategory | | | | | |
| categoryRank | int | 4 | 10 | NO | |
| rank | int | 4 | 10 | NO | |
| threatcategory | varchar | 50 | 0 | NO | |
| threatElement | varchar | 50 | 0 | NO | |

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention. While the foregoing invention has been described in detail by way of illustration and example of preferred embodiments, numerous modifications, substitutions, and alterations are possible without departing from the scope of the invention defined in the following claims.

Having thus described our invention, what we claim as new and desire to secure by Letters Patent is as follows:

1. A computer-assisted method of generating at least one test procedure for a target system having at least one device capable of being identified, each of the at least one device having hardware and/or software, said method comprising the steps of:
   a) collecting information descriptive of at least a hardware and/or software specification for the at least one device;
   b) selecting at least one predefined standard, regulation and/or requirement with which the target system is to comply;
   c) associating hardware and/or software information pertaining to the at least one device, collected in said step a), with at least one pre-defined platform category;
   d) for each of said at least one platform category, determining which of one or more test procedures will be used to test hardware and/or software associated with said at least one platform category based on a mapping between the test procedures and the at least one pre-defined standard, regulation and/or requirement; and
   e) generating one or more test procedures as determined in said step d) for each platform category.

2. The method according to claim 1 further comprising the step of associating at least one application software program with at least one platform category, the association indicating that the application program is typically installed on devices belonging to the platform category.

3. The method according to claim 1 wherein said step a) information is collected, for the target system comprising a plurality of devices within a network, by at least one of electronic discovery via a network and manual entry.

4. The method according to claim 3 wherein electronic discovery comprises an enterprise management system.

5. The method according to claim 3 wherein the information collected in said step a) pertains to at least one of: an internet protocol address, a hostname, a media access control address, an operating system name, and an operating system version.

6. The method according to claim 1 further comprising the step of editing said step a) information descriptive of at least the hardware specification and the operating system of each device.

7. The method according to claim 1 wherein the platform categories comprise at least one of desktop computer, laptop computer, mainframe computer, hub, handheld device, and other.

8. The method according to claim 1 further comprising the step of printing at least one test procedure generated in said step e).

9. The method according to claim 1 wherein said step e) generates one test procedure for a platform category when there are no devices associated therewith, and generates one test procedure for each device associated with a platform category having an indication that such device is to be tested.

10. The method according to claim 1 further comprising the steps of:
   f) performing the steps associated with the test procedures generated in said step e) to determine whether the target system passes or fails the at least one the test procedure;
   g) generating a score for each of a plurality of threat elements, each score indicating a likelihood of that threat element affecting and/or impacting the target system; and
   h) (1) obtaining a threat correlation indication associated with said at least one test procedure, wherein said threat correlation indication indicates a relative potential of one or more given threats to exploit a vulnerability caused by a failure of the at least one test procedure, and
   (2) determining a risk assessment by comparing each score generated in said step g) with a corresponding threat correlation indication of said step h) (1).

11. The method according to claim 10 wherein said scores for said step g) comprise at least one of:
   i) negligible, wherein negligible indicates that the threat element is not applicable or has negligible likelihood of occurrence;
   ii) low, wherein low indicates that the threat element has a relatively low likelihood of occurrence;
   iii) medium, wherein medium indicates that the threat element has a medium likelihood of occurrence; and
   iv) high, wherein high indicates that the threat element has a relatively high likelihood of occurrence.

12. The method according to claim 10 wherein said step g) threat elements comprise at least one of natural disaster elements, system failure elements, environmental failure elements, unintentional human elements, and intentional human elements.

13. The method according to claim 12 wherein the natural disaster threat elements comprise at least one of fire, flood, earthquake, volcano, tornado and lighting elements.

14. The method according to claim 12 wherein the system failure threat elements comprise at least one of a hardware failure, a power failure, and a communication link failure.

15. The method according to claim 12 wherein the environmental failure threat elements comprise at least one of temperature, power, humidity, sand, dust, shock, and vibration.

16. The method according to claim 12 wherein the human unintentional threat element comprises at least one of a software design error, a system design error, and an operator error.

17. The method according to claim 12 wherein the human intentional threat elements comprise at least one of an authorized system administrator, an authorized maintenance personnel, an authorized user, a terrorist, a hacker, a saboteur, a thief, and a vandal.

18. The method according to claim 10 wherein said step h) (1) threat correlation indication comprises at least one of the following scores:
   i) negligible, wherein negligible indicates that the threat is not applicable to the vulnerability;
   ii) low, wherein low indicates that the threat has a low potential to exploit the vulnerability;
   iii) medium, wherein medium indicates that the threat has a potential to exploit the vulnerability; and iv) high, wherein high indicates that the threat has a relatively high potential to exploit the vulnerability.

19. The method according to claim 18 wherein the risk assessment in said step h) (2) is determined in accordance with the following steps:
  a) for each element in the project threat profile and corresponding element in the threat correlation pattern;
    1) if a threat element as determined in said step g) is negligible and a corresponding element in the threat correlation indication as determined in said step h) is anything, then the overall risk of the element is negligible;
    2) if a threat element score as determined in said step g) is low and the corresponding element in the threat correlation indication as determined in said step h) is negligible, then the overall risk of the element is low;
    3) if a threat element score as determined in said step g) is low and the corresponding element in the threat correlation indication as determined in said step h) is low, then the overall risk of the element is low;
    4) if a threat element score as determined in said step g) is low and the corresponding element in the threat correlation indication as determined in said step h) is medium, then the overall risk of the element is low;
    5) if a threat element score as determined in said step g) is low and the corresponding element in the threat correlation indication as determined in said step h) is high, then the overall risk of the element is medium;
    6) if a threat element score as determined in said step g) is medium and the corresponding element in the threat correlation indication as determined in said step h) is negligible, then the overall risk of the element is negligible;
    7) if a threat element score as determined in said step g) is medium and the corresponding element in the threat correlation indication as determined in said step h) is low, then the overall risk of the element is low;
    8) if a threat element score as determined in said step g) is medium and the corresponding element in the threat correlation indication as determined in said step h) is medium, then the overall risk of the element is medium;
    9) if a threat element score as determined in said step g) is medium and the corresponding element in the threat correlation indication as determined in said step h) is high, then the overall risk of the element is medium;
    10) if a threat element score as determined in said step g) is high and the corresponding element in the threat correlation indication as determined in said step h) is negligible, then the overall risk of the element is negligible;
    11) if a threat element score as determined in said step g) is high and the corresponding element in the threat correlation indication as determined in said step h) is low, then the overall risk of the element is medium;
    12) if a threat element score as determined in said step g) is high and the corresponding element in the threat correlation indication as determined in said step h) is medium, then the overall risk of the element is high; and
    13) if a threat element score as determined in said step g) is high and the corresponding element in the threat correlation indication as determined in said step h) is high, then the overall risk of the element is high; and
  b) selecting the risk profile for the failed test procedure as being the highest overall risk element.

20. The method according to claim 19 further comprising the step of determining an overall system risk.

21. The method according to claim 20 wherein the overall target system risk is the highest overall risk element of each of one or more failed test procedures.

22. The method according to claim 20 further comprising the step of printing a documentation package that will enable a determination to be made whether the target system complies with the at least one predefined standard, regulation and/or requirement selected in said step b).

23. The method according to claim 22 wherein the documentation package includes a risk assessment for at least one failed test procedure.

24. The method according to claim 22 wherein the documentation package includes an overall target system risk.

25. In a general purpose computing system, a computer-assisted method of generating at least one test procedure for a target system having at least one device capable of being identified, each of the at least one device having hardware and/or software, said method comprising the steps of:
  a) collecting information descriptive of at least a hardware and/or software specification for the at least one device;
  b) selecting at least one predefined standard, regulation and/or requirement with which the target system is to comply;
  c) associating hardware and/or software information pertaining to the at least one device, collected in said step a), with at least one pre-defined platform category;
  d) for each of said at least one platform category, determining which of one or more test procedures will be used to test hardware and/or software associated with said at least one platform category based on a mapping between the test procedures and the at least one pre-defined standard, regulation and/or requirement; and
  e) generating one or more test procedures as determined in said step d) for each platform category.

26. The system according to claim 25 further comprising the step of associating at least one application software program with at least one platform category, the association indicating that the application program is typically installed on devices belonging to the platform category.

27. The system according to claim 25 wherein said step a) information is collected, for the target system comprising a plurality of devices within a network, by at least one of electronic discovery via a network and manual entry.

28. The system according to claim 27 wherein electronic discovery comprises an enterprise management system.

29. The system according to claim 27 wherein the information collected in said step a) pertains to at least one of: an internet protocol address, a hostname, a media access control address, an operating system name, and an operating system version.

30. The system according to claim 25 further comprising the step of editing said step a) information descriptive of at least the hardware specification and the operating system of each device.

31. The system according to claim 25 wherein the platform categories comprise at least one of desktop computer, laptop computer, mainframe computer, hub, handheld device, and other.

32. The system according to claim 25 further comprising the step of printing at least one test procedure generated in said step e).

33. The system according to claim 25 wherein said step e) generates one test procedure for a platform category when there are no devices associated therewith, and generates one test procedure for each device associated with a platform category having an indication that such device is to be tested.

34. The system according to claim 25 further performing the steps of:
   f) performing the steps associated with the test procedures generated in said step e) to determine whether the target system passes or fails the at least one the test procedure;
   g) generating a score for each of a plurality of threat elements, each score indicating a likelihood of that threat element affecting and/or impacting the target system; and
   h) (1) obtaining a threat correlation indication associated with said at least one test procedure, wherein said threat correlation indication indicates a relative potential of one or more given threats to exploit a vulnerability caused by a failure of the at least one test procedure, and (2) determining a risk assessment by comparing each score generated in said step g) with a corresponding threat correlation indication of said step h) (1).

35. The system according to claim 34 wherein said scores for said step g) comprise at least one of:
   i) negligible, wherein negligible indicates that the threat element is not applicable or has negligible likelihood of occurrence;
   ii) low, wherein low indicates that the threat element has a relatively low likelihood of occurrence;
   iii) medium, wherein medium indicates that the threat element has a medium likelihood of occurrence; and
   iv) high, wherein high indicates that the threat element has a relatively high likelihood of occurrence.

36. The system according to claim 34 wherein said step g) threat elements comprise at least one of natural disaster elements, system failure elements, environmental failure elements, unintentional human elements, and intentional human elements.

37. The system according to claim 36 wherein the natural disaster threat elements comprise at least one of fire, flood, earthquake, volcano, tornado and lighting elements.

38. The system according to claim 36 wherein the system failure threat elements comprise at least one of a hardware failure, a power failure, and a communication link failure.

39. The system according to claim 36 wherein the environmental failure threat elements comprise at least one of temperature, power, humidity, sand, dust, shock, and vibration.

40. The system according to claim 36 wherein the human unintentional threat element comprises at least one of a software design error, a system design error, and an operator error.

41. The system according to claim 36 wherein the human intentional threat elements comprise at least one of an authorized system administrator, an authorized maintenance personnel, an authorized user, a terrorist, a hacker, a saboteur, a thief, and a vandal.

42. The system according to claim 34 wherein said step h) (1) threat correlation indication comprises at least one of the following scores:
   i) negligible, wherein negligible indicates that the threat is not applicable to the vulnerability;
   ii) low, wherein low indicates that the threat has a low potential to exploit the vulnerability;
   iii) medium, wherein medium indicates that the threat has a potential to exploit the vulnerability; and
   iv) high, wherein high indicates that the threat has a relatively high potential to exploit the vulnerability.

43. The system according to claim 42 wherein the risk assessment in said step h) (2) is determined in accordance with the following steps:
   a) for each element in the project threat profile and corresponding element in the threat correlation pattern:
      1) if a threat element as determined in said step g) is negligible and a corresponding element in the threat correlation indication as determined in said step h) (2) is anything, then the overall risk of the element is negligible;
      2) if a threat element as determined in said step g) is low and the corresponding element in the threat correlation indication as determined in said step h) (2) is negligible, then the overall risk of the element is low;
      3) if a threat element as determined in said step g) is low and the corresponding element in the threat correlation indication as determined in said step h) (2) is low, then the overall risk of the element is low;
      4) if a threat element as determined in said step g) is low and the corresponding element in the threat correlation indication as determined in said step h) (2) is medium, then the overall risk of the element is low;
      5) if a threat element as determined in said step g) is low and the corresponding element in the threat correlation indication as determined in said step h) (2) is high, then the overall risk of the element is medium;
      6) if a threat element as determined in said step g) is medium and the corresponding element in the threat correlation indication as determined in said step h) (2) is negligible, then the overall risk of the element is negligible;
      7) if a threat element as determined in said step g) is medium and the corresponding element in the threat correlation indication as determined in said step h) (2) is low, then the overall risk of the element is low;
      8) if a threat element as determined in said step g) is medium and the corresponding element in the threat correlation indication as determined in said step h) (2) is medium, then the overall risk of the element is medium;
      9) if a threat element as determined in said step g) is medium and the corresponding element in the threat correlation indication as determined in said step h) (2) is high, then the overall risk of the element is medium;
      10) if a threat element as determined in said step g) is high and the corresponding element in the threat correlation indication as determined in said step h) (2) is negligible, then the overall risk of the element is negligible;
      11) if a threat element as determined in said step g) is high and the corresponding element in the threat correlation indication as determined in said step h) (2) is low, then the overall risk of the element is medium;
      12) if a threat element as determined in said step g) is high and the corresponding element in the threat correlation indication as determined in said step h) (2) is medium, then the overall risk of the element is high; and
      13) if a threat element as determined in said step g) is high and the corresponding element in the threat correlation indication as determined in said step h) (2) is high, then the overall risk of the element is high; and b) selecting the risk profile for the failed test procedure as being the highest overall risk element.

44. The system according to claim 43, further comprising the step of determining an overall system risk.

45. The system according to claim 44 wherein the overall target system risk is the highest overall risk element of each of one or more failed test procedures.

46. The system according to claim 44 further comprising the step of printing a documentation package that will enable a determination to be made whether the target system complies with the at least one predefined standard, regulation and/or requirement selected in said step b).

47. The system according to claim 46 wherein the documentation package includes a risk assessment for at least one failed test procedure.

48. The system according to claim 46 wherein the documentation package includes an overall system risk.

49. A computer program medium storing computer instructions therein for instructing a computer to perform a computer-implemented and user assisted process of generating at least one test procedure for a target system having at least one device capable of being identified, each of the at least one device having hardware and/or software, said program medium comprising the steps of:
   a) collecting information descriptive of at least a hardware and/or software specification for the at least one device;
   b) selecting at least one predefined standard, regulation and/or requirement with which the target system is to comply;
   c) associating hardware and/or software information pertaining to the at least one device, collected in said step a), with at least one pre-defined platform category;
   d) for each of said at least one platform category, determining which of one or more test procedures will be used to test hardware and/or software associated with said at least one platform category based on a mapping between the test procedures and the at least one predefined standard, regulation and/or requirement; and
   e) generating one or more test procedures as determined in said step d) for each platform category.

50. The computer program medium according to claim 49 further comprising the step of associating at least one application software program with at least one platform category, the association indicating that the application program is typically installed on devices belonging to the platform category.

51. The computer program medium according to claim 49 wherein said step a) information is collected, for the target system comprising a plurality of devices within a network, by at least one of electronic discovery via a network and manual entry.

52. The computer program medium according to claim 51 wherein electronic discovery comprises an enterprise management system.

53. The computer program medium according to claim 51 wherein the information collected in said step a) pertains to at least one of: an internet protocol address, a hostname, a media access control address, an operating system name, and an operating system version.

54. The computer program medium according to claim 49 further comprising the step of editing said step a) information descriptive of at least the hardware specification and the operating system of each device.

55. The computer program medium according to claim 49 wherein the platform categories comprise at least one of desktop computer, laptop computer, mainframe computer, hub, handheld device, and other.

56. The computer program medium according to claim 49 further comprising the step of printing at least one test procedure generated in said step e).

57. The computer program medium according to claim 49 wherein said step e) generates one test procedure for a platform category when there are no devices associated therewith, and generates one test procedure for each device associated with a platform category having an indication that such device is to be tested.

58. The computer program medium according to claim 49 further comprising the steps of:
   f) performing the steps associated with the test procedures generated in said step e) to determine whether the target system passes or fails the at least one the test procedure;
   g) generating a score for each of a plurality of threat elements, each score indicating a likelihood of that threat element affecting and/or impacting the target system; and
   h) (1) obtaining a threat correlation indication associated with said at least one test procedure, wherein said threat correlation indication indicates a relative potential of one or more given threats to exploit a vulnerability caused by a failure of the at least one test procedure, and
   (2) determining a risk assessment by comparing each score generated in said step g) with a corresponding threat correlation indication of said step h) (1).

59. The computer program medium according to claim 58 wherein said scores for said step g) comprise at least one of:
   i) negligible, wherein negligible indicates that the threat element is not applicable or has negligible likelihood of occurrence;
   ii) low, wherein low indicates that the threat element has a relatively low likelihood of occurrence;
   iii) medium, wherein medium indicates that the threat element has a medium likelihood of occurrence; and
   iv) high, wherein high indicates that the threat element has a relatively high likelihood of occurrence.

60. The computer program medium according to claim 58 wherein said step g) threat elements comprise at least one of natural disaster elements, system failure elements, environmental failure elements, unintentional human elements, and intentional human elements.

61. The computer program medium according to claim 60 wherein the natural disaster threat elements comprise at least one of fire, flood, earthquake, volcano, tornado and lighting elements.

62. The computer program medium according to claim 60 wherein the system failure threat elements comprise at least one of a hardware failure, a power failure, and a communication link failure.

63. The computer program medium according to claim 60 wherein the environmental failure threat elements comprise at least one of temperature, power, humidity, sand, dust, shock, and vibration.

64. The computer program medium according to claim 60 wherein the human unintentional threat element comprises at least one of a software design error, a system design error, and an operator error.

65. The computer program medium according to claim 60 wherein the human intentional threat elements comprise at least one of an authorized system administrator, an authorized maintenance personnel, an authorized user, a terrorist, a hacker, a saboteur, a thief, and a vandal.

66. The computer program medium according to claim 60 wherein said step h) (1) threat correlation indication comprises at least one of the following scores:

i) negligible, wherein negligible indicates that the threat is not applicable to the vulnerability;
ii) low, wherein low indicates that the threat has a low potential to exploit the vulnerability;
iii) medium, wherein medium indicates that the threat has a potential to exploit the vulnerability; and
iv) high, wherein high indicates that the threat has a relatively high potential to exploit the vulnerability.

67. The computer program medium according to claim 66 wherein the risk assessment in said step h) (2) is determined in accordance with the following steps:
   a) for each element in the project threat profile and corresponding element in the threat correlation pattern:
      1) if a threat element score as determined in said step g) is negligible and a corresponding element in the threat correlation indication as determined in said step h) is anything, then the overall risk of the element is negligible;
      2) if a threat element score as determined in said step g) is low and the corresponding element in the threat correlation indication as determined in said step h) is negligible, then the overall risk of the element is low;
      3) if a threat element score as determined in said step g) is low and the corresponding element in the threat correlation indication as determined in said step h) is low, then the overall risk of the element is low;
      4) if a threat element score as determined in said step g) is low and the corresponding element in the threat correlation indication as determined in said step h) is medium, then the overall risk of the element is low;
      5) if a threat element score as determined in said step g) is low and the corresponding element in the threat correlation indication as determined in said step h) is high, then the overall risk of the element is medium;
      6) if a threat element score as determined in said step g) is medium and the corresponding element in the threat correlation indication as determined in said step h) is negligible, then the overall risk of the element is negligible;
      7) if a threat element score as determined in said step g) is medium and the corresponding element in the threat correlation indication as determined in said step h) is low, then the overall risk of the element is low;
      8) if a threat element score as determined in said step g) is medium and the corresponding element in the threat correlation indication as determined in said step h) is medium, then the overall risk of the element is medium;
      9) if a threat element score as determined in said step g) is medium and the corresponding element in the threat correlation indication as determined in said step h) is high, then the overall risk of the element is medium;
      10) if a threat element score as determined in said step g) is high and the corresponding element in the threat correlation indication as determined in said step h) is negligible, then the overall risk of the element is negligible;
      11) if a threat element score as determined in said step g) is high and the corresponding element in the threat correlation indication as determined in said step h) is low, then the overall risk of the element is medium;
      12) if a threat element score as determined in said step g) is high and the corresponding element in the threat correlation indication as determined in said step h) is medium, then the overall risk of the element is high; and
      13) if a threat element score as determined in said step g) is high and the corresponding element in the threat correlation indication as determined in said step h) is high, then the overall risk of the element is high; and
   b) selecting the risk profile for the failed test procedure as being the highest overall risk element.

68. The computer program medium according to claim 67, further comprising the step of determining an overall system risk.

69. The computer program medium according to claim 68 wherein the overall target system risk is the highest overall risk element of each of one or more failed test procedures.

70. The computer program medium according to claim 68 further comprising the step of printing a documentation package that will enable a determination to be made whether the target system complies with the at least one predefined standard, regulation and/or requirement selected in said step b).

71. The computer program medium according to claim 70 wherein the documentation package includes a risk assessment for at least one failed test procedure.

72. The computer program medium according to claim 70 wherein the documentation package includes an overall system risk.

73. A system for generating at least one test procedure for a target system having at least one device capable of being identified, each of the at least one device having hardware and/or software, said system comprising:
   a) a discovery engine that scans the target system for the hardware configuration, operating system and/or application programs of each of the at least one device;
   b) at least one storage medium for storing thereon at least:
      (i) at least one predefined standard, regulation and/or requirement with which the segment is to comply; and
      (ii) data pertaining to at least one platform category, each platform category having associated therewith one or more devices having at least a hardware specification and an operating system; and
   c) decision logic for determining which of zero or more test procedures will be used to test each of the at least one platform category based on a mapping between the test procedures and the at least one predefined standard, regulation and/or requirement.

74. The system according to claim 73 further comprising a printer for printing the one or more test procedures.

75. The system according to claim 73 wherein the scanner collects for each device information pertaining to at least one of: an IP address, a hostname, a media access control address, operating system name, operating system version.

76. The system according to claim 73 wherein the scanner further collects information pertaining to at least one of application software, hard disk drive capacity, device manufacturer, and device model.

77. A system for generating at least one test procedure for a target system having at least one device capable of being identified, each of the at least one device having hardware and/or software, said system comprising:
   a) a discovery engine that scans the target system information descriptive of at least a hardware and/or software specification for the at least one device;
   b) a storage medium for storing at least one predefined standard, regulation and/or requirement with which the target system is to comply; and
   c) a plurality of information entities, each of said plurality of information entities storing data pertaining to at least one predefined platform category, each platform category defining one or more devices having at least a hardware specification and an operating system; and d) decision logic for determining which of one or more test procedures will be used to test each platform category based on a mapping between the test procedures and the at least one predefined standard, regulation and/or requirement.

78. The system according to claim 77 wherein said plurality of information entities comprise relational database tables.

79. The system according to claim 78 wherein said relational database tables comprise tables for defining: a) each of the at least one platform category; b) each of the at least one device; c) each application program; d) each defined association between an application program and a platform category, wherein each such association indicates that the application program is typically installed on devices belonging to the platform category; e) each defined association between an application program and a device, wherein each such association indicates that the application program is actually installed on the device; and g) each standard operating system.

80. A system for generating at least one test procedure for a target system comprising at least one device, each of the at least one device comprising a combination of hardware and software, said system comprising:
  a) a discovery engine that scans the target system for at least a hardware and/or software specification for the at least one device;
  b) at least one storage medium for storing thereon:
    (i) at least one predefined standard, regulation and/or requirement with which the target system is to comply; and
    (ii) data pertaining to at least one platform category, each platform category having associated therewith one or more devices having at least a hardware specification and an operating system; and
  c) decision logic for:
    i) associating hardware and/or software information pertaining to the at least one device, collected by said discovery engine, with at least one pre-defined platform category;
    ii) for each of said at least one platform category, determining which of one or more test procedures will be used to test hardware and/or software associated with said at least one platform category based on a mapping between the test procedures and the at least one predefined standard, regulation and/or requirement; and
    iii) generating one or more test procedures as determined in said step ii) for each platform category.

81. The system according to claim 80 further comprising a printer for printing the one or more test procedures.

82. The system according to claim 80 wherein said network discovery engine collects for each device information pertaining to at least one of: an IP address, a hostname, a media access control address, operating system name, operating system version.

83. The system according to claim 80 wherein said network discovery engine further collects information pertaining to at least one of application software, hard disk drive capacity, device manufacturer, and device model.

84. A system for generating at least one test procedure for a target system having at least one device capable of being identified, each of the at least one device having hardware and/or software, said system comprising:
  a) means for scanning the target system information descriptive of at least a hardware and/or software specification for the at least one device;
  b) means for storing at least one predefined standard, regulation and/or requirement with which the target system is to comply; and
  c) means for associating hardware and/or software information pertaining to the at least one device, collected by said means for scanning, with at least one pre-defined platform category;
  d) for each of said at least one platform category, means for determining which of one or more test procedures will be used to test hardware and/or software associated with said at least one platform category based on a mapping between the test procedures and the at least one predefined standard, regulation and/or requirement; and
  e) means for generating one or more test procedures as determined in said step d) for each platform category.

85. A system for generating at least one test procedure for a target system comprising at least one device, each of the at least one device comprising a combination of hardware and software, said system comprising:
  a) means for scanning the target system for at least a hardware and/or software specification for the at least one device;
  b) means for storing thereon:
    (i) at least one predefined standard, regulation and/or requirement with which the segment is to comply; and
    (ii) data pertaining to at least one platform category, each platform category having associated therewith one or more devices having at least a hardware specification and an operating system; and
  c) means for associating hardware and/or software information pertaining to the at least one device, collected by said discovery engine, with at least one pre-defined platform category;
  d) for each of said at least one platform category, means for determining which of one or more test procedures will be used to test hardware and/or software associated with said at least one platform category based on a mapping between the test procedures and the at least one predefined standard, regulation and/or requirement; and
  e) means for generating one or more test procedures, as determined by said means for determining, for each platform category.

86. A computer-assisted method of generating at least one test procedure for a target system having at least one device capable of being identified, each of the at least one device having hardware and/or software, said method comprising the steps of:
  a) collecting information descriptive of at least a hardware and/or software specification for the at least one device;
  b) selecting at least one predefined standard, regulation and/or requirement with which the target system is to comply;
  c) associating hardware and/or software information pertaining to the at least one device, collected in said step a), with at least one pre-defined platform category;
  d) for each of said at least one platform category, determining which of one or more test procedures will be used to test hardware and/or software associated with said at least one platform category based on a mapping between the test procedures and the at least one predefined standard, regulation and/or requirement; and e) generating one or more test procedures as determined in said step d) for each platform category;

f) performing the steps associated with the test procedures generated in said step e) to determine whether the target system passes or fails the at least one the test procedure;

g) generating a score for each of a plurality of threat elements, each score indicating a likelihood of that threat element affecting and/or impacting the target system; and h) (1) obtaining a threat correlation indication associated with said at least one test procedure, wherein said threat correlation indication indicates a relative potential of one or more given threats to exploit a vulnerability caused by a failure of the at least one test procedure, and (2) determining a risk assessment by comparing each score generated in said step g) with a corresponding threat correlation indication of said step h) (1).

* * * * *